US012651746B2

(12) United States Patent
Momma et al.

(10) Patent No.: US 12,651,746 B2
(45) Date of Patent: Jun. 9, 2026

(54) POSITIVE ELECTRODE ACTIVE MATERIAL, METHOD FOR MANUFACTURING THE SAME, AND SECONDARY BATTERY

(71) Applicant: SEMICONDUCTOR ENERGY LABORATORY CO., LTD., Atsugi (JP)

(72) Inventors: Yohei Momma, Kanagawa (JP); Jyo Saito, Kanagawa (JP); Teruaki Ochiai, Kanagawa (JP); Kazuhei Narita, Tokyo (JP); Kazuhito Machikawa, Kanagawa (JP); Mayumi Mikami, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 988 days.

(21) Appl. No.: 17/312,082

(22) PCT Filed: Dec. 2, 2019

(86) PCT No.: PCT/IB2019/060344
§ 371 (c)(1),
(2) Date: Jun. 9, 2021

(87) PCT Pub. No.: WO2020/121109
PCT Pub. Date: Jun. 18, 2020

(65) Prior Publication Data
US 2022/0029159 A1 Jan. 27, 2022

(30) Foreign Application Priority Data
Dec. 13, 2018 (JP) ................................ 2018-233928
Dec. 20, 2018 (JP) ................................ 2018-238383
(Continued)

(51) Int. Cl.
*H01M 4/525* (2010.01)
*C01G 53/42* (2025.01)
(Continued)

(52) U.S. Cl.
CPC ............ *H01M 4/525* (2013.01); *C01G 53/42* (2013.01); *H01M 4/364* (2013.01);
(Continued)

(58) Field of Classification Search
None
See application file for complete search history.

(56) References Cited

U.S. PATENT DOCUMENTS 9,048,495 B2 6/2015 Sun et al.
10,333,140 B2 6/2019 Blangero et al.
(Continued)

FOREIGN PATENT DOCUMENTS

CN 101156260 A 4/2008
CN 103855380 A 6/2014
(Continued)

OTHER PUBLICATIONS

Merriam-Webster "Pulverize" 2024 (Year: 2024).*
(Continued)

*Primary Examiner* — Sheng H Davis
(74) *Attorney, Agent, or Firm* — Fish & Richardson P.C.

(57) ABSTRACT

An object is to provide a method for manufacturing a positive electrode active material that achieves high powder properties and high load resistance (e.g., rate performance and output resistance) when used in a lithium-ion secondary battery, within a short manufacturing cycle time and at low cost. To perform heat treatment at temperatures lower than the melting point of magnesium fluorine, lithium fluoride is mixed to melt magnesium fluorine and modify the surface of lithium cobalt oxide powder. By mixing lithium fluoride,
(Continued)

magnesium fluorine can be melted at a temperature lower than its melting point, and a positive electrode active material is formed utilizing this eutectic phenomenon.

9 Claims, 43 Drawing Sheets

(30) Foreign Application Priority Data

Feb. 6, 2019 (JP) ................................ 2019-019437
Feb. 25, 2019 (JP) ................................ 2019-031705

(51) Int. Cl.
*H01M 4/36* (2006.01)
*H01M 10/0525* (2010.01)
*H01M 4/02* (2006.01)

(52) U.S. Cl.
CPC ..... *H01M 10/0525* (2013.01); *C01P 2002/72* (2013.01); *C01P 2002/77* (2013.01); *C01P 2004/03* (2013.01); *C01P 2004/61* (2013.01); *C01P 2006/40* (2013.01); *H01M 2004/028* (2013.01)

(56) References Cited

U.S. PATENT DOCUMENTS

| | | | |
|---|---|---|---|
| 10,741,834 | B2 | 8/2020 | Zhang et al. |
| 2002/0110736 | A1 | 8/2002 | Kweon et al. |
| 2003/0104279 | A1 | 6/2003 | Miyazaki et al. |
| 2004/0142241 | A1 | 7/2004 | Nagayama |
| 2006/0263690 | A1 | 11/2006 | Suhara et al. |
| 2007/0117014 | A1 | 5/2007 | Saito et al. |
| 2008/0241693 | A1 | 10/2008 | Fukuchi et al. |
| 2009/0087362 | A1 | 4/2009 | Sun et al. |
| 2009/0104532 | A1 | 4/2009 | Hosoya |
| 2010/0086854 | A1 | 4/2010 | Kumar et al. |
| 2010/0247986 | A1 | 9/2010 | Toyama et al. |
| 2013/0052534 | A1 | 2/2013 | Fujiki et al. |
| 2013/0323596 | A1 | 12/2013 | Morita et al. |
| 2014/0162127 | A1 | 6/2014 | Kim et al. |
| 2014/0212759 | A1 | 7/2014 | Blangero et al. |
| 2015/0008364 | A1 | 1/2015 | Endo |
| 2015/0210557 | A1 | 7/2015 | Song et al. |
| 2015/0214550 | A1 | 7/2015 | Song et al. |
| 2016/0006032 | A1 | 1/2016 | Paulsen et al. |
| 2016/0013478 | A1 | 1/2016 | Satow et al. |
| 2016/0156032 | A1 | 6/2016 | Lee et al. |
| 2016/0268601 | A1 | 9/2016 | Paulsen et al. |
| 2016/0276658 | A1 | 9/2016 | Choi et al. |
| 2016/0276659 | A1 | 9/2016 | Choi et al. |
| 2016/0336594 | A1 | 11/2016 | Ahn et al. |
| 2017/0207444 | A1 | 7/2017 | Yanagihara et al. |
| 2018/0013130 | A1 | 1/2018 | Ochiai et al. |
| 2018/0145317 | A1 | 5/2018 | Momma et al. |
| 2018/0145368 | A1 | 5/2018 | Ochiai et al. |
| 2019/0245199 | A1 | 8/2019 | Zeng et al. |
| 2020/0176770 | A1 | 6/2020 | Takahashi et al. |
| 2020/0220173 | A1 | 7/2020 | Jo et al. |
| 2021/0020935 | A1 | 1/2021 | Takahashi et al. |
| 2021/0028456 | A1 | 1/2021 | Takahashi et al. |
| 2021/0083281 | A1 | 3/2021 | Mikami et al. |
| 2021/0313571 | A1 | 10/2021 | Momma et al. |
| 2022/0131146 | A1 | 4/2022 | Saito et al. |
| 2022/0359870 | A1 | 11/2022 | Mikami et al. |
| 2025/0105282 | A1 | 3/2025 | Liu et al. |

FOREIGN PATENT DOCUMENTS

| | | | | | |
|---|---|---|---|---|---|
| CN | 105655554 | A | | 6/2016 | |
| CN | 106575755 | A | | 4/2017 | |
| CN | 108023083 | A | | 5/2018 | |
| CN | 108075114 | A | | 5/2018 | |
| CN | 113140726 | A | | 7/2021 | |
| EP | 1880435 | A | | 1/2008 | |
| EP | 2741353 | A | | 6/2014 | |
| EP | 3783707 | | * | 6/2018 | |
| EP | 3783707 | A | | 2/2021 | |
| EP | 3783707 | A1 | * | 2/2021 | ........... C01G 51/006 |
| JP | 2000-203842 | A | | 7/2000 | |
| JP | 2002-216760 | A | | 8/2002 | |
| JP | 2006-261132 | A | | 9/2006 | |
| JP | 2008-536285 | | | 9/2008 | |
| JP | 2010-080407 | A | | 4/2010 | |
| JP | 2014-116308 | A | | 6/2014 | |
| JP | 2015-083900 | A | | 4/2015 | |
| JP | 2015-099722 | A | | 5/2015 | |
| JP | 2016-033902 | A | | 3/2016 | |
| JP | 2016-051610 | A | | 4/2016 | |
| JP | 2017-021942 | A | | 1/2017 | |
| JP | 2017-188466 | A | | 10/2017 | |
| JP | 2018-088400 | A | | 6/2018 | |
| JP | 2018-524776 | | | 8/2018 | |
| JP | 2018-195581 | A | | 12/2018 | |
| JP | 2019-179758 | A | | 10/2019 | |
| KR | 2006-0109305 | A | | 10/2006 | |
| KR | 10-1400593 | | | 5/2014 | |
| KR | 2015-0063956 | A | | 6/2015 | |
| KR | 2017-0038787 | A | | 4/2017 | |
| KR | 2018-0056367 | A | | 5/2018 | |
| TW | 201902012 | | | 1/2019 | |
| WO | WO-2006/109930 | | | 10/2006 | |
| WO | WO-2015/083900 | | | 6/2015 | |
| WO | WO-2016/017077 | | | 2/2016 | |
| WO | WO-2017/002057 | | | 1/2017 | |
| WO | WO-2018/211375 | | | 11/2018 | |
| WO | WO-2019/003025 | | | 1/2019 | |

OTHER PUBLICATIONS

Richardson, J.F. et al. "Chemical Engineering" 5th Ed. vol. 2: Particle Technology and Separation Processes. Chemical Engineering Series. Chapter 2: Particle Size Reduction and Enlargement. vol. 2, p. 95-145 (2002). (Year: 2002).*

Taiwanese Office Action (Application No. 108144461) Dated Sep. 7, 2023.

International Search Report (Application No. PCT/IB2019/060344) Dated Jan. 28, 2020.

Written Opinion (Application No. PCT/IB2019/060344) Dated Jan. 28, 2020.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system LixCoO2 (0.0≤x≤1.0)", Phys. Rev. B (Physical Review. B), Oct. 9, 2009, vol. 80, No. 16, pp. 165114-1-155114-9.

Chen.Z et al., "Staging Phase Transitions in LixCoO2", J. Electrochem. Soc. (Journal of the Electrochemical Society), 2002, vol. 149, No. 12, pp. A1604-A1609.

Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

Zhang.J et al., "Trace doping of multiple elements enables stable battery cycling of LiCoO2 at 4.6 V", Nature Energy, Jun. 17, 2019, vol. 4, pp. 594-603.

Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.

Wang.L et al., "A Novel Bifunctional Self-Stabilized Strategy Enabling 4.6 V LiCoO2 with Excellent Long-Term Cyclability and

(56) References Cited

OTHER PUBLICATIONS

High-Rate Capability", Adv. Sci. (Advanced Science), Apr. 24, 2019, vol. 6, No. 12, pp. 1900355-1-1900355-11.
Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.
Wang.Z et al., "EELS analysis of cation valence states and oxygen vacancies in magnetic oxides", MICRON, Oct. 1, 2000, vol. 31, No. 5, pp. 571-580, Elsevier.
Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.
Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.
Zou.M et al., "Synthesis and Electrochemical Performance of High Voltage Cycling LiMO.05Co0.9502 as Cathode Material for Lithium Rechargeable Cells", Electrochemical and Solid-State Letters, Apr. 26, 2004, vol. 7, No. 7, pp. A176-A179.
Kim.Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.
Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.
Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.
Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.
Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.
Taguchi.N et al., "Characterization of MgO-coated-LiCoO2 particles by analytical transmission electron microscopy", Journal of Power Sources, Aug. 10, 2016, vol. 328, pp. 161-166, Elsevier.
Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.
Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.
Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.
Shao-horn. Y et al., "Probing Lithium and Vacancy Ordering in 03 Layered Lix CoO2 (x = 0.5) : An Electron Diffraction Study", J. Electrochem. Soc. (Journal of the Electrochemical Society), Feb. 6, 2003, vol. 150, No. 3, pp. A366-A373.
Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, p. 1601507-1-1601507-21.

* cited by examiner

Charge depth and crystal structure of positive electrode active material 763
765
753
752
764
762
761
751  766

753
752
750c
750b
750a
751

753
752
750c
750b
750a
751

600

612 601
610 611
608
606 605
605 604 603
607
609
602

615 613

600

614

615 613 617

616

FIG. 14A1
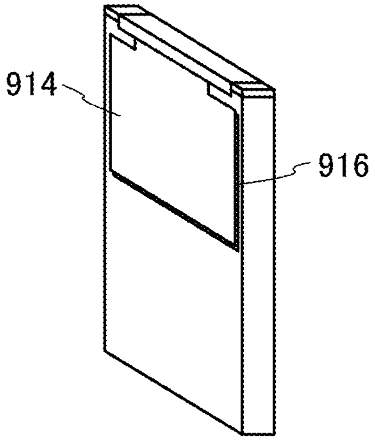
FIG. 14A2
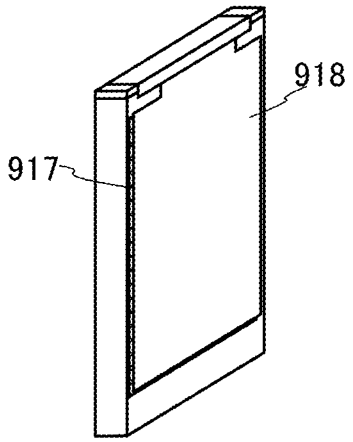
FIG. 14B1
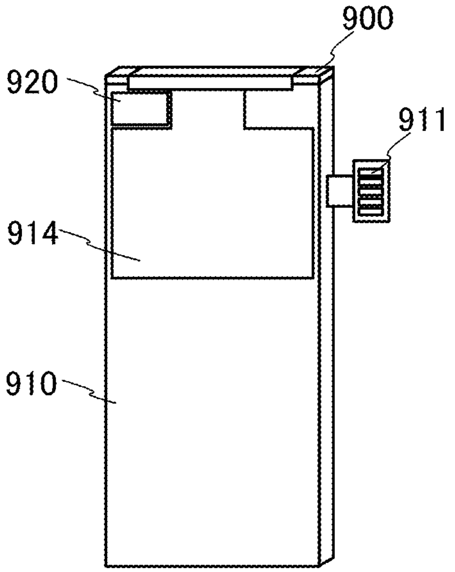
FIG. 14B2
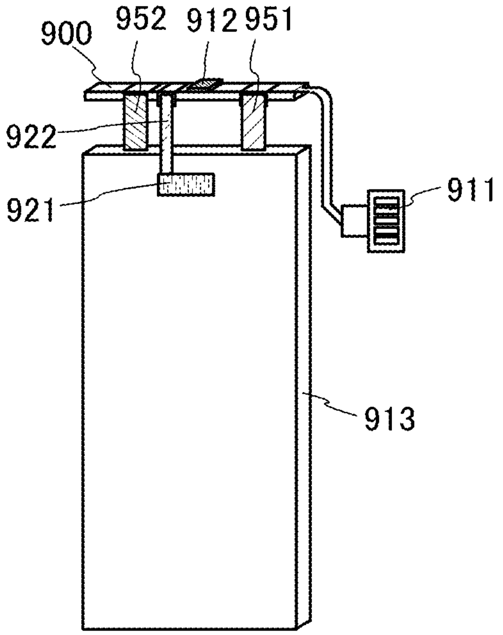

FIG. 22A
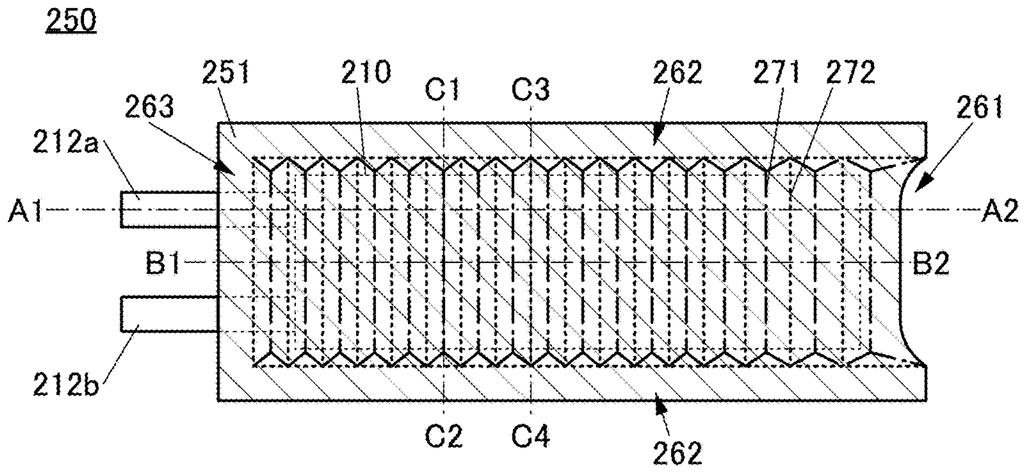
FIG. 22B1
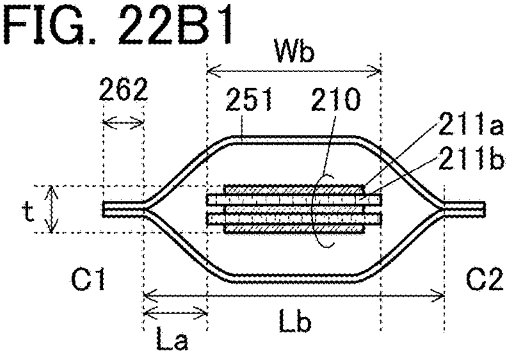
FIG. 22B2
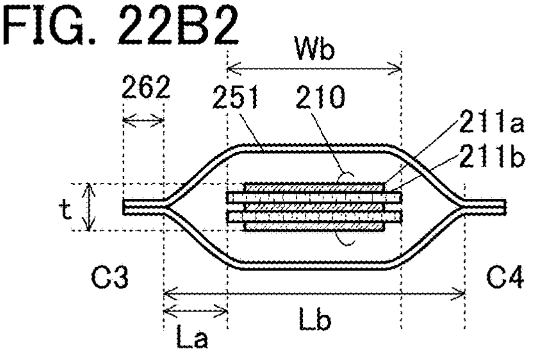
FIG. 22C
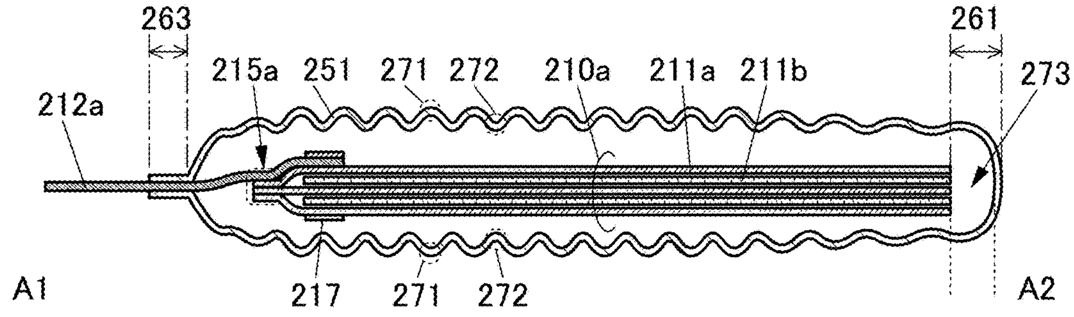
FIG. 22D
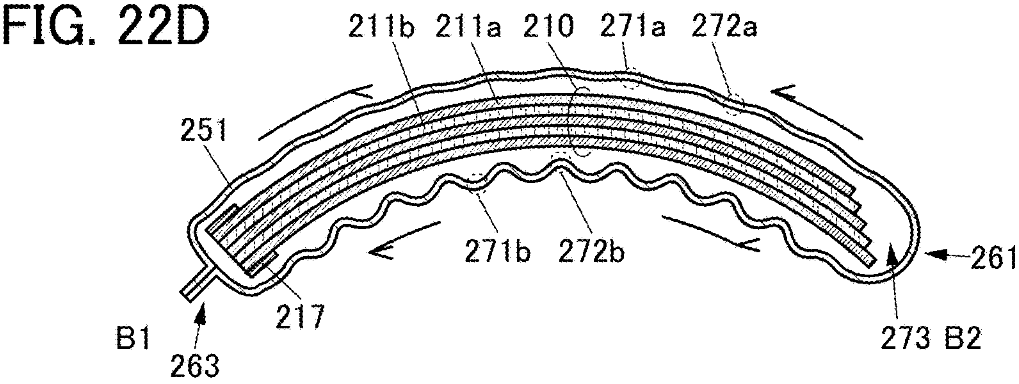

POSITIVE ELECTRODE ACTIVE MATERIAL, METHOD FOR MANUFACTURING THE SAME, AND SECONDARY BATTERY

CROSS REFERENCE TO RELATED APPLICATIONS

This application is a U.S. National Phase Application under 35 U.S.C. § 371 of International Application PCT/IB2019/060344, filed on Dec. 2, 2019, which is incorporated by reference and claims the benefit of foreign priority applications filed in Japan on Dec. 13, 2018, as Application No. 2018-233928, on Dec. 20, 2018, as Application No. 2018-238383, on Feb. 6, 2019, as Application No. 2019-019437, and on Feb. 25, 2019, as Application No. 2019-031705.

TECHNICAL FIELD

One embodiment of the present invention relates to an object, a method, or a manufacturing method. In addition, one embodiment of the present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used in a secondary battery, a secondary battery, and an electronic device including a secondary battery.

Note that a power storage device in this specification refers to every element and device having a function of storing electric power. For example, a storage battery (also referred to as secondary battery) such as a lithium-ion secondary battery, a lithium-ion capacitor, an all-solid-state battery, and an electric double layer capacitor are included in the category of the power storage device.

Note that electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, tablets, and notebook computers; portable music players; digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

The performance required for lithium-ion secondary batteries includes higher energy density, improved cycling performance, safe operation under a variety of environments, and longer-term reliability, for example.

In particular, lithium cobalt oxide ($LiCoO_2$), which can obtain a high voltage on the order of 4 V, is widely available as a positive electrode active material of lithium-ion secondary batteries.

Secondary batteries for driving motors, which are used for electric vehicles and the like, are required to have higher output characteristics, higher energy density, and a smaller change in cycling performance than those for mobile phones and notebook PCs. Secondary batteries for driving motors need to be compatible with fast charging, which achieves a short charge time.

Improvement of positive electrode active materials has been studied with the aim of improving the cycling performance and increasing the capacity of lithium-ion secondary batteries (Patent Documents 1 and 2). Crystal structures of positive electrode active materials have also been studied (Non-Patent Documents 1 to 4).

X-ray diffraction (XRD) is one of methods used for analysis of a crystal structure of a positive electrode active material. With the use of the Inorganic Crystal Structure Database (ICSD) described in Non-Patent Document 5, XRD data can be analyzed.

Patent Document 3 describes the Jahn-Teller effect in nickel-based layered oxide.

Patent Document 4 discloses a positive electrode active material with a small change in the crystal structure between a charge state and a discharge state.

REFERENCES

Patent Documents

[Patent Document 1] Japanese Published Patent Application No. 2002-216760

[Patent Document 2] Japanese Published Patent Application No. 2006-261132

[Patent Document 3] Japanese Published Patent Application No. 2017-188466

[Patent Document 4] PCT International Publication No. 2018/211375

Non-Patent Documents

[Non-Patent Document 1] Toyoki Okumura et al., "Correlation of lithium ion distribution and X-ray absorption near-edge structure in O3- and O2-lithium cobalt oxides from first-principle calculation", *Journal of Materials Chemistry,* 22, 2012, pp. 17340-17348.

[Non-Patent Document 2] T. Motohashi et al., "Electronic phase diagram of the layered cobalt oxide system $Li_xCoO_2$ ($0.0 \leq x \leq 1.0$)", *Physical Review B,* 80 (16), 165114.

[Non-Patent Document 3] Zhaohui Chen et al., "Staging Phase Transitions in $Li_xCoO_2$*", Journal of The Electrochemical Society,* 149 (12), 2002, A1604-A1609.

[Non-Patent Document 4] W. E. Counts et al., "Fluoride Model Systems: II, The Binary Systems $CaF_2$—$BeF_2$2, $MgF_2$—$BeF_2$, and LiF—$MgF_2$*", Journal of the American Ceramic Society* (1953), 36 [1], 12-17. FIG. 01471.

[Non-Patent Document 5] A. Belsky et al., "New developments in the Inorganic Crystal Structure Database (ICSD): accessibility in support of materials research and design", *Acta Cryst.* (2002), B58, 364-369.

DISCLOSURE OF INVENTION

When a charge voltage that is applied to a secondary battery can be increased, the secondary battery can be charged at a high voltage for a longer time, resulting in an increase in the amount of charge per unit time and a reduction in charge time. In the field of electrochemical cells typified by lithium-ion secondary batteries, a high voltage exceeding 4.5 V causes deterioration of batteries.

When the charge voltage that is applied to a secondary battery is increased, a side reaction might occur, contributing to a significant decrease in battery performance. Examples of the side reaction include formation of a reactant caused by a chemical reaction of an active material or an electrolyte solution, and acceleration of oxidation and decomposition of the electrolyte solution. The decomposition of the electrolyte solution might cause gas generation and volume expansion.

An object of one embodiment of the present invention is to provide a high-capacity secondary battery. Another object of one embodiment of the present invention is to provide a secondary battery with excellent charge and discharge performance. Another object of one embodiment of the present invention is to provide a highly safe or highly reliable secondary battery.

Another object is to provide a positive electrode active material having a high capacity retention rate at the time when charge and discharge are repeatedly performed with a charge voltage of 4.5 V or higher, preferably 4.6 V or higher, and to provide a method for manufacturing the positive electrode active material.

Another object of one embodiment of the present invention is to provide a novel material, a novel active material particle, a novel secondary battery, or a manufacturing method thereof.

Specifically, an object of one embodiment of the present invention is to provide a method for manufacturing a positive electrode active material that achieves high powder properties and high load resistance (e.g., rate performance and output resistance) when used in a lithium-ion secondary battery, within a short manufacturing cycle time and at low cost.

Note that the description of these objects does not preclude the existence of other objects. In one embodiment of the present invention, there is no need to achieve all these objects. Other objects can be derived from the description of the specification, the drawings, and the claims.

One embodiment of the present invention is a method for manufacturing a positive electrode active material, including a first step of forming a first mixture by pulverizing magnesium fluoride, lithium fluoride, a nickel source, and an aluminum source and then mixing the pulverized materials with powder of lithium cobalt oxide; and a second step of forming a second mixture by heating the first mixture at a temperature lower than an upper temperature limit of the lithium cobalt oxide.

In this specification, the upper temperature limit of lithium cobalt oxide is regarded as 1000° C. This is because vaporization of Li, cation mixing of Li and Co, and the like are likely to occur at temperatures lower than 1130° C. (the melting point of lithium cobalt oxide), for example, at approximately 1000° C.; hence, annealing performed on $LiCoO_2$ in the subsequent process or the like is desirably conducted at temperatures lower than 1000° C. Since heat treatment is performed at temperatures lower than the melting point of magnesium fluorine (1263° C.), lithium fluoride (melting point: 848° C.) is mixed to melt magnesium fluorine and modify the surface of lithium cobalt oxide powder. By mixing lithium fluoride, magnesium fluorine can be melted at a temperature lower than its melting point, and a positive electrode active material is formed utilizing this eutectic phenomenon. Note that the upper temperature limit and the melting point are measured using differential scanning calorimetry (DSC), differential thermal analysis (DTA), or simultaneous differential scanning calorimetry/thermogravimetric analysis (SDT).

A secondary battery using the positive electrode active material manufactured by utilizing the eutectic phenomenon is less likely to deteriorate even when the charge voltage is 4.5 V or higher, preferably 4.6 V or higher.

Surface modification of the lithium cobalt oxide powder results in a manufacturing process with a low heating temperature. The manufacturing process with a low heating temperature leads to a reduction in manufacturing cost.

To provide the manufacturing process with a low heating temperature, a hydroxide having a low melting point is used as the nickel source and the aluminum source. Specifically, aluminum hydroxide (melting point: 300° C.) and nickel hydroxide (melting point: 230° C.) are used. The use of the hydroxides enables eutectic melting of aluminum and nickel at a temperature close to the eutectic point.

Moreover, a smaller number of heat treatments leads to a reduction in manufacturing cost. The above manufacturing method includes one heat treatment. The heating temperature is preferably lower than 1000° C., further preferably from 700° C. to 950° C., still further preferably approximately 850° C. The heating time ranges preferably from 1 hour to 80 hours.

Although the above manufacturing method includes one heat treatment, there is no particular limitation on the number of heat treatments, and two or more heat treatments may be performed. An embodiment including two heat treatments, disclosed in this specification, is a method for manufacturing a positive electrode active material, including a first step of forming a first mixture by pulverizing magnesium fluoride and lithium fluoride and then mixing the pulverized materials with powder of lithium cobalt oxide; a second step of forming a second mixture by heating the first mixture at a temperature lower than an upper temperature limit of the lithium cobalt oxide; a third step of forming a third mixture by pulverizing a nickel source and then mixing the pulverized nickel source with the second mixture; and a fourth step of forming a fourth mixture by mixing an aluminum source with the third mixture and then heating the resulting mixture at a temperature lower than the upper temperature limit of the lithium cobalt oxide.

In the above two heat treatments, the heating temperature is preferably lower than 1000° C., further preferably higher than or equal to 700° C. and lower than or equal to 950° C., and the heating time ranges preferably from 2 hours to 80 hours.

In the above manufacturing method, for example, the first heat treatment is performed at 900° C. for 20 hours and the second heat treatment is performed at 850° C. for 2 hours, in which case the total time taken for the heat treatments can be shortened. The above manufacturing method can be regarded as a manufacturing procedure in which a mixture is obtained by making sufficient reaction in advance before addition of the nickel source and the aluminum source because the melting point of magnesium fluorine is the highest.

In each of the above manufacturing methods, the aluminum source is not limited to a hydroxide, and aluminum isopropoxide can alternatively be used. Aluminum isopropoxide is a type of aluminum alkoxide and represented as $Al[OCH(CH_3)_2]_3$. Aluminum isopropoxide is soluble in isopropanol and ethanol, and is decomposed by water.

In this specification, the eutectic point refers to a point in a solid-liquid phase curve of two components at which the two components do not form a solid solution but completely melt and mix in the liquid state.

For example, when two metal elements A and B melt, A and B may independently form a solid phase without forming a solid solution, may form a molecular compound, or may melt completely in a liquid phase. A mixture of A and B has a lower melting point than each of A and B, and a mixture having a given concentration ratio of A to B has the lowest melting point. This temperature is referred to as a eutectic point, and the mixture is referred to as a eutectic mixture. The above description applies not only to two components but also to three, four, five, or more components.

The addition of lithium fluoride to magnesium fluoride lowers the melting point of magnesium fluoride; hence, lithium fluoride can be regarded as a eutectic melting agent of magnesium fluoride. The molar ratio of lithium fluoride to magnesium fluoride ($LiF:MgF_2$) is preferably x:1 ($0 \leq x \leq 1.9$), further preferably =x:1 ($0.1 \leq x \leq 0.5$), still further preferably x:1 (x=0.33 or a value close thereto). Note that in this specification and the like, the expression "close to a given value" means greater than 0.9 times and smaller than 1.1 times the value.

Note that the use of a larger amount of the eutectic melting agent than in the above range cannot produce an advantageous effect; the eutectic melting agent remains as an impurity, resulting in deterioration of the battery performance of a secondary battery manufactured using such a positive electrode active material.

The secondary battery using the positive electrode active material obtained by the above manufacturing method is less likely to deteriorate even when the charge voltage is 4.5 V or higher, preferably 4.6 V or higher.

The positive electrode active material obtained by the above manufacturing method is an oxide containing lithium and cobalt. The positive electrode active material of one embodiment of the present invention is represented by a space group R-3m, for example.

The positive electrode active material of one embodiment of the present invention preferably has a pseudo-spinel structure that is described later, particularly when the charge depth is large.

The concentration of halogen such as fluorine in a surface portion of the positive electrode active material is preferably higher than the average concentration in the whole particle. When halogen exists in the surface portion, which is in contact with an electrolyte solution, the corrosion resistance to hydrofluoric acid can be effectively increased.

As described above, the surface portion of the positive electrode active material preferably has a different composition from the inner portion and has a higher fluorine concentration than the inner portion. The composition preferably has a crystal structure stable at normal temperature. Accordingly, the surface portion may have a crystal structure different from that of the inner portion. For example, at least part of the surface portion of the positive electrode active material may have a rock-salt crystal structure. When the surface portion and the inner portion have different crystal structures, the orientations of crystals in the surface portion and the inner portion are preferably substantially aligned with each other.

The surface portion of the positive electrode active material should include at least an element M and also include an element A and a path for insertion and extraction of the element A in a discharge state. Note that the element A is a metal serving as a carrier ion. Examples of the element A include alkaline metals such as lithium, sodium, and potassium and Group 2 elements such as calcium, beryllium, and magnesium.

The element M is a transition metal, for example. As the transition metal, at least one of cobalt, manganese, and nickel can be used, for instance. The positive electrode material of one embodiment of the present invention preferably contains at least one of cobalt, nickel, and manganese, particularly cobalt, as the element M. The positive electrode material may contain, in place of the element M, an element with no valence change that can have the same valence as the element M, such as aluminum, specifically a trivalent main group element, for example.

Another embodiment of the present invention is a secondary battery including a positive electrode in which an positive electrode active material layer including any of the above positive electrode positive materials is positioned over a current collector, and a negative electrode.

In this specification and the like, crystal planes and orientations are indicated by the Miller index. In the crystallography, a bar is placed over a number in the expression of crystal planes and orientations; in this specification and the like, because of application format limitations, crystal planes and orientations are sometimes expressed by placing a minus sign (−) in front of a number instead of placing a bar over the number. Furthermore, an individual direction that shows an orientation in crystal is denoted by "[ ]", a set direction that shows all of the equivalent orientations is denoted by "< >", an individual plane that shows a crystal plane is denoted by "( )", and a set plane having equivalent symmetry is denoted by "{ }".

In this specification and the like, segregation refers to a phenomenon in which in a solid made of a plurality of elements (e.g., A, B, and C), a certain element (e.g., B) is spatially non-uniformly distributed.

In this specification and the like, a surface portion of a particle of an active material or the like refers to a region from the surface to a depth of approximately 10 nm. A plane generated by a crack may can be considered as a surface. A region whose position is deeper than that of the surface portion is referred to as an inner portion.

In this specification and the like, a layered rock-salt crystal structure of a composite oxide containing lithium and a transition metal refers to a crystal structure in which a rock-salt ion arrangement where cations and anions are alternately arranged is included and lithium and the transition metal are regularly arranged to form a two-dimensional plane, so that lithium can diffuse two-dimensionally. Note that a defect such as a cation or anion vacancy may exist. In the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, a pseudo-spinel crystal structure of a composite oxide containing lithium and a transition metal refers to a crystal structure with a space group R-3m, which is not a spinel crystal structure but a crystal structure in which an ion of cobalt, magnesium, or the like is coordinated to six oxygen atoms and the cation arrangement has symmetry similar to that of the spinel crystal structure. Note that in the pseudo-spinel crystal structure, a light element such as lithium is sometimes coordinated to four oxygen atoms. In that case, the ion arrangement also has symmetry like that of the spinel crystal structure.

The pseudo-spinel crystal structure can be regarded as a crystal structure that contains Li between layers randomly and is similar to the $CdCl_2$ crystal structure. The crystal structure similar to the $CdCl_2$ crystal structure is close to a crystal structure of lithium nickel oxide ($Li_{0.06}NiO_2$) that is charged until the charge depth reaches 0.94; however, pure lithium cobalt oxide or a layered rock-salt positive electrode active material containing a large amount of cobalt is known not to have such a crystal structure generally.

Anions of a layered rock-salt crystal and anions of a rock-salt crystal form a cubic close-packed structure (face-centered cubic lattice structure). Anions of a pseudo-spinel crystal are presumed to form a cubic close-packed structure. When a pseudo-spinel crystal is in contact with a layered rock-salt crystal and a rock-salt crystal, there is a crystal plane at which orientations of cubic close-packed structures formed of anions are aligned with each other. A space group of each of the layered rock-salt crystal and the pseudo-spinel crystal is R-3m, which is different from a space group Fm-3m of a general rock-salt crystal and a space group Fd-3m of a rock-salt crystal having the simplest symmetry; thus, the Miller index of the crystal plane satisfying the above conditions in the layered rock-salt crystal and the pseudo-spinel crystal is different from that in the rock-salt crystal. In this specification, a state where the orientations of the cubic close-packed structures formed of anions in the layered rock-salt crystal, the pseudo-spinel crystal, and the rock-salt crystal are aligned with each other is sometimes referred to as a state where crystal orientations are substantially aligned with each other.

Whether the crystal orientations in two regions are substantially aligned with each other or not can be judged from a transmission electron microscope (TEM) image, a scanning transmission electron microscope (STEM) image, a high-angle annular dark field scanning transmission electron microscope (HAADF-STEM) image, an annular bright-field scanning transmission electron microscope (ABF-STEM) image, and the like. X-ray diffraction (XRD), electron diffraction, neutron diffraction, and the like can also be used for judging. In the TEM image and the like, alignment of cations and anions can be observed as repetition of bright lines and dark lines. When the orientations of cubic close-packed structures of the layered rock-salt crystal and the rock-salt crystal are aligned with each other, a state where an angle between the repeated bright lines and dark lines in the crystals is less than or equal to 5°, preferably less than or equal to 2.5° is observed. Note that in the TEM image and the like, a light element such as oxygen or fluorine is not clearly observed in some cases; however, in such a case, alignment of orientations can be judged by arrangement of metal elements.

In this specification and the like, a theoretical capacity of a positive electrode active material refers to the amount of electricity obtained when all lithium that can be inserted into and extracted from the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, the charge depth obtained when all lithium that can be inserted into and extracted from a positive electrode active material is inserted is 0, and the charge depth obtained when all lithium that can be inserted into and extracted from a positive electrode active material is extracted is 1.

In this specification and the like, charging refers to transfer of lithium ions from a positive electrode to a negative electrode in a battery and transfer of electrons from the negative electrode to the positive electrode in an external circuit. Charging of a positive electrode active material refers to extraction of lithium ions. A positive electrode active material with a charge depth of greater than or equal to 0.7 and less than or equal to 0.9 may be referred to as a positive electrode active material charged with a high voltage.

Similarly, discharging refers to transfer of lithium ions from a negative electrode to a positive electrode in a battery and transfer of electrons from the positive electrode to the negative electrode in an external circuit. Discharging of a positive electrode active material refers to insertion of lithium ions. A positive electrode active material with a charge depth of less than or equal to 0.06 or a positive electrode active material discharged at least 90% of the charge capacity from a state of being charged with a high voltage is referred to as a sufficiently discharged positive electrode active material.

In this specification and the like, an unbalanced phase change refers to a phenomenon that causes a nonlinear change in physical quantity. For example, an unbalanced phase change may occur around peaks in a dQ/dV curve obtained by differentiating capacitance (Q) with voltage (V) (dQ/dV), which probably largely changes the crystal structure.

According to one embodiment of the present invention, a positive electrode active material that has high capacity and excellent charge and discharge cycle performance for a lithium-ion secondary battery, and a manufacturing method thereof can be provided. A method for manufacturing a positive electrode active material with high productivity can be provided. A positive electrode active material that suppresses a capacity decrease caused by charge and discharge cycles when used in a lithium-ion secondary battery can be provided. A high-capacity secondary battery can be provided. A secondary battery with excellent charge and discharge performance can be provided. A positive electrode active material in which dissolution of a transition metal such as cobalt is inhibited even when a high-voltage charged state is maintained for a long time can be provided. A highly safe or highly reliable secondary battery can be provided. A novel material, a novel active material particle, a novel storage device, or a manufacturing method thereof can be provided.

BRIEF DESCRIPTION OF DRAWINGS

In the accompanying drawings:

FIGS. 14A1, 14A2, 14B1, and 14B2 illustrate examples of a secondary battery;

FIG. 22A is a top view illustrating a bendable secondary battery, and FIGS. 22B1, 22B2, 22C, and 22D are cross-sectional views of the bendable secondary battery;

BEST MODE FOR CARRYING OUT THE INVENTION

Hereinafter, embodiments of the present invention will be described in detail with reference to the drawings. Note that the present invention is not limited to the description below, and it is easily understood by those skilled in the art that modes and details of the present invention can be modified in various ways. In addition, the present invention should not be construed as being limited to the description in the following embodiments.

Embodiment 1

An example of a method for manufacturing a positive electrode active material of one embodiment of the present invention will be described with reference to FIG. 1.

<Step S11>

First, a halogen source such as a fluorine source or a chlorine source and a magnesium source are prepared as materials of a mixture 902. In addition, a lithium source is preferably prepared.

As the fluorine source, lithium fluoride or magnesium fluoride can be used, for example. In particular, lithium fluoride is preferable because it is easily melted in the annealing process described later owing to its relatively low melting point of 848° C. As the chlorine source, lithium salt or magnesium salt can be used, for example. As the magnesium source, magnesium fluoride, magnesium oxide, magnesium hydroxide, or magnesium carbonate can be used, for example. As the lithium source, lithium fluoride or lithium carbonate can be used, for example. That is, lithium fluoride can be used as both the lithium source and the fluorine source. In addition, magnesium fluoride can be used as both the fluorine source and the magnesium source.

Figure 1:
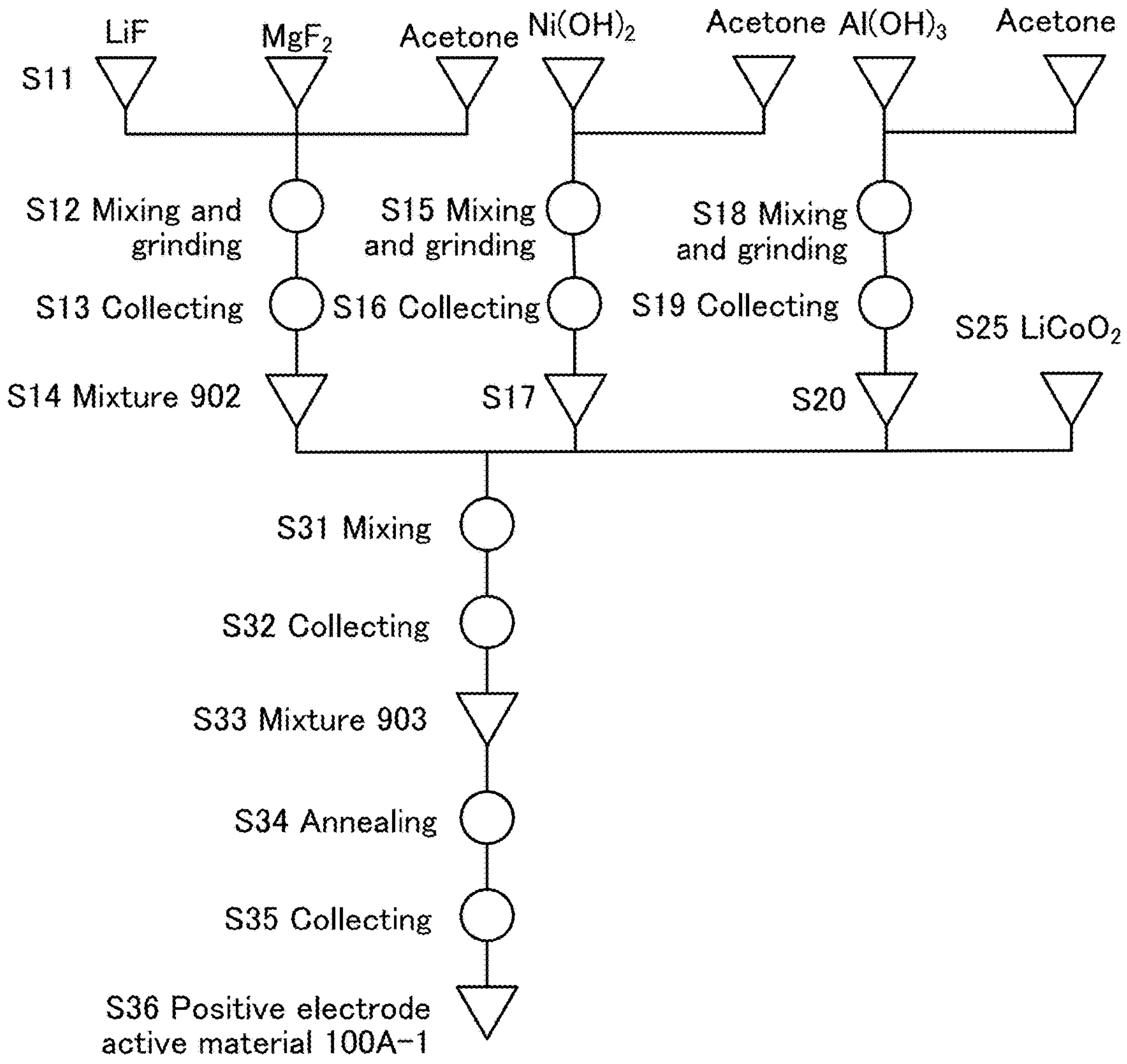
FIG. 1 illustrates an example of a method for manufacturing a positive electrode active material of one embodiment of the present invention.

In this embodiment, lithium fluoride (LiF) is prepared as the fluorine source and the lithium source, and magnesium fluoride ($MgF_2$) is prepared as the fluorine source and the magnesium source (Step S11 in FIG. 1).

When lithium fluoride (LiF) and magnesium fluoride ($MgF_2$) are mixed at a molar ratio of approximately 65:35, the effect of lowering the melting point is maximized (Non-Patent Document 4). Meanwhile, when the proportion of lithium fluoride increases, the cycling performance might deteriorate because of an excessive amount of lithium. Therefore, the molar ratio of lithium fluoride to magnesium fluoride (LiF:$MgF_2$) is preferably x:1 ($0 \le x \le 1.9$), further preferably x:1 ($0.1 \le x \le 0.5$), still further preferably x:1 (x=0.33 or a value close thereto).

In the case where the following mixing and grinding step is performed by a wet method, a solvent is prepared. As the solvent, ketone such as acetone, alcohol such as ethanol or isopropanol, ether, dioxane, acetonitrile, N-methyl-2-pyrrolidone (NMP), or the like can be used. An aprotic solvent, which hardly reacts with lithium, is preferably used. In this embodiment, acetone is used (see Step S11 in FIG. 1).

<Step S12>

Next, the materials of the mixture 902 are mixed and ground (Step S12 in FIG. 1). Although the mixing can be performed by either a dry method or a wet method, a wet method is preferable because the materials can be ground to a smaller size. For example, a ball mill or a bead mill can be used for the mixing. When the ball mill is used, zirconia balls are preferably used as media, for example. The mixing and grinding step is preferably performed enough to pulverize the mixture 902.

The mixing is preferably performed with a blender, a mixer, or a ball mill.

<Step S13 and Step S14>

The materials mixed and ground in the above manner are collected (Step S13 in FIG. 1), whereby the mixture 902 is obtained (Step S14 in FIG. 1).

For example, the mixture 902 preferably has an average particle diameter (D50) of greater than or equal to 600 nm and less than or equal to 20 μm, further preferably greater than or equal to 1 μm and less than or equal to 10 μm. When mixed with a composite oxide containing lithium, a transition metal, and oxygen in a later step, the mixture 902 pulverized to such a small size is easily attached uniformly to the surfaces of the composite oxide particles. The mixture 902 is preferably attached uniformly to the surfaces of the composite oxide particles, in which case halogen and magnesium are easily distributed to the surface portion of the composite oxide particles after heating. If the surface portion has a region that contains neither halogen nor magnesium, the positive electrode active material in a charged state might be less likely to have the aforementioned pseudo-spinel crystal structure.

<Step S15, Step S16, and Step S17>

Pulverized nickel hydroxide ($Ni(OH)_2$) to be added in Step S31 is prepared. The pulverized nickel hydroxide is formed in advance by Step S15 for mixing nickel hydroxide and acetone and Step S16 for collecting the mixture. Through Step S16, the pulverized nickel hydroxide is obtained (Step S17).

<Step S18, Step S19, and Step S20>

Pulverized aluminum hydroxide ($Al(OH)_3$) to be added in Step S31 is prepared. The pulverized aluminum hydroxide is formed in advance by Step S18 for mixing aluminum hydroxide and acetone and Step S19 for collecting the mixture. Through Step S19, the pulverized aluminum hydroxide is obtained (Step S20).

<Step S25>

A lithium source to be added in Step S31 is prepared. A pre-synthesized composite oxide containing lithium, a transition metal, and oxygen is prepared in Step S25.

In the case of using the pre-synthesized composite oxide containing lithium, a transition metal, and oxygen, a composite oxide with few impurities is preferably used. In this specification and the like, the main components of the composite oxide containing lithium, a transition metal, and oxygen and the positive electrode active material are lithium, cobalt, nickel, manganese, aluminum, and oxygen, and elements other than the above main components are regarded as impurities. For example, when glow discharge mass spectrometry is performed, the total impurity concentration is preferably less than or equal to 10,000 ppm wt, further preferably less than or equal to 5,000 ppm wt. In particular, the total impurity concentration of a transition metal such as titanium and arsenic is preferably less than or equal to 3,000 ppm wt, further preferably less than or equal to 1,500 ppm wt.

For example, as pre-synthesized lithium cobalt oxide, a lithium cobalt oxide particle (product name: Cellseed C-10N, manufactured by Nippon Chemical Industrial Co., Ltd.) can be used. This is lithium cobalt oxide in which the average particle diameter (D50) is approximately 12 μm, and in the impurity analysis by glow discharge mass spectrometry (GD-MS), the concentrations of magnesium and fluorine are less than or equal to 50 ppm wt, the concentrations of calcium, aluminum, and silicon are less than or equal to 100 ppm wt, the concentration of nickel is less than or equal to 150 ppm wt, the concentration of sulfur is less than or equal to 500 ppm wt, the concentration of arsenic is less than or equal to 1,100 ppm wt, and the concentrations of elements other than lithium, cobalt, and oxygen are less than or equal to 150 ppm wt.

The composite oxide containing lithium, the transition metal, and oxygen in Step S25 preferably has a layered rock-salt crystal structure with few defects and distortions. Therefore, the composite oxide preferably includes few impurities. If a composite oxide containing lithium, a transition metal, and oxygen includes a large amount of impurities, the crystal structure is highly likely to have a lot of defects and distortions.

<Step S31>

Next, the mixture 902; the composite oxide containing lithium, the transition metal, and oxygen; the pulverized aluminum hydroxide; and the pulverized nickel hydroxide are mixed (Step S31 in FIG. 1). The ratio of the atomic number TM of the transition metal in the composite oxide containing lithium, the transition metal, and oxygen to the atomic number MgMix1 of magnesium in the mixture 902 (TM:MgMix1) is preferably 1:y ($0.005 \leq y \leq 0.05$), further preferably 1:y ($0.007 \leq y \leq 0.04$), still further preferably approximately 1:0.02.

The mixing in Step S31 is preferably performed under milder conditions than those for the mixing in Step S12, in order not to damage the composite oxide particles. For example, a condition with a smaller number of rotations or a shorter time than that for the mixing in Step S12 is preferable. Moreover, a dry method is regarded as a milder condition than a wet method. A ball mill or a bead mill can be used for the mixing, for example. When the ball mill is used, zirconia balls are preferably used as media, for example.

The materials mixed in the above manner are collected (Step S32 in FIG. 1), whereby a mixture 903 is obtained (Step S33 in FIG. 1).

Next, the mixture 903 is heated. This step can be referred to as annealing or baking.

The annealing is preferably performed at an appropriate temperature for an appropriate time. The appropriate temperature and time depend on the conditions such as the particle size and composition of the composite oxide containing lithium, the transition metal, and oxygen in Step S25. The annealing for small particles may be preferably performed at a lower temperature or for a shorter time than the case of the annealing for large particles.

When the average particle diameter (D50) of the particles in Step S25 is approximately 12 μm, the annealing temperature is preferably higher than or equal to 700° C. and lower than or equal to 950° C., for example. The annealing time is preferably longer than or equal to 3 hours, further preferably longer than or equal to 10 hours, still further preferably longer than or equal to 60 hours, for example.

The time for lowering the temperature of the mixture 903 after the annealing is preferably longer than or equal to 10 hours and shorter than or equal to 50 hours, for example.

When the mixture 903 is annealed, it is likely that a material having a low melting point in the mixture 903 (e.g., lithium fluoride with a melting point of 848° C.) is melted first and distributed to the surface portion of the composite oxide particle. Next, the melted material causes a reduction in the melting point of another material, presumably resulting in melting of that material. For example, magnesium fluoride (melting point: 1263° C.) is presumably melted and distributed to the surface portion of the composite oxide particle.

The elements included in the mixture 903 diffuse faster in the surface portion of the composite oxide particle and the vicinity of the grain boundary than in the inner portion. Therefore, the concentrations of magnesium and halogen are higher in the surface portion and the vicinity of the grain boundary than in the inner portion. As will be described later, a higher magnesium concentration in the surface portion and the vicinity of the grain boundary can inhibit the change in the crystal structure more effectively.

The material annealed as above is collected (Step S35 in FIG. 1). Then, the particles are preferably sifted. Through the above process, a positive electrode active material 100A-1 of one embodiment of the present invention can be formed (Step S36 in FIG. 1).

Embodiment 2

An example of a method for manufacturing a positive electrode active material of one embodiment of the present invention will be described with reference to FIG. 2.

This embodiment is the same as Embodiment 1 except for some steps; hence, the description of identical steps is not repeated for simplicity.

<Step S21>

Figure 2:
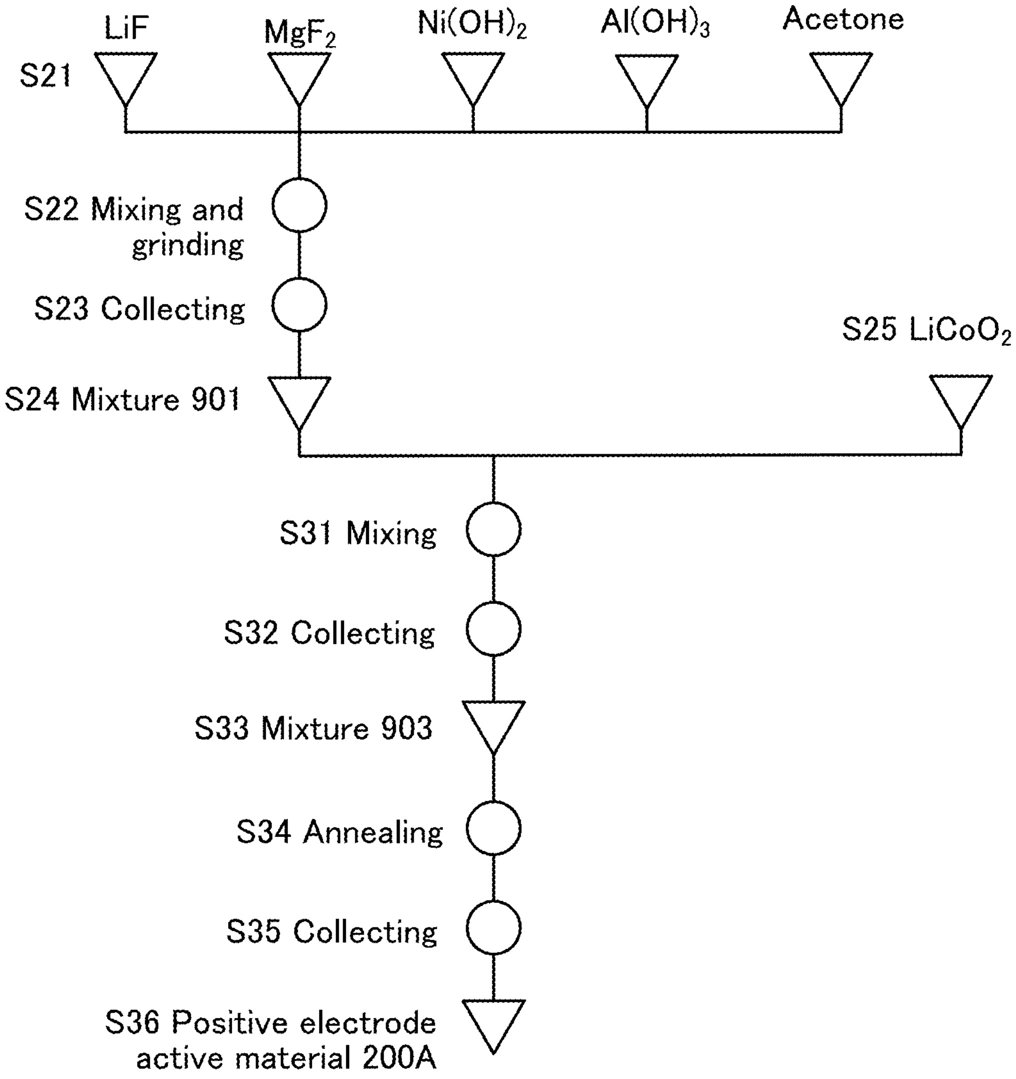
FIG. 2 illustrates an example of a method for manufacturing a positive electrode active material of one embodiment of the present invention.

As shown in Step S21 in FIG. 2, a halogen source such as a fluorine source or a chlorine source, a magnesium source, a nickel source, and an aluminum source are first prepared as materials of a mixture 901. Moreover, a lithium source is preferably prepared.

In this embodiment, lithium fluoride (LiF) is prepared as the fluorine source and the lithium source; magnesium fluoride ($MgF_2$) is prepared as the fluorine source and the magnesium source; nickel hydroxide is prepared as the nickel source; and aluminum hydroxide is prepared as the aluminum source (Step S21).

Moreover, a solvent used in the following mixing and grinding step performed by a wet method is prepared. As the solvent, acetone is used.

<Step S22>

Next, the materials are mixed and ground (Step S22 in FIG. 2). Although the mixing can be performed by either a dry method or a wet method, a wet method is preferable because the materials can be ground to a smaller size. For example, a ball mill or a bead mill can be used for the mixing. When the ball mill is used, zirconia balls are preferably used as media, for example. The mixing and grinding step is preferably performed enough to pulverize the above materials.

<Step S23 and Step S24>

The materials mixed and ground in the above manner are collected (Step S23), whereby the mixture 901 is obtained (Step S24).

A pre-synthesized composite oxide containing lithium, a transition metal, and oxygen is prepared in Step S25.

<Step S31>

Next, the mixture 901 and the composite oxide containing lithium, the transition metal, and oxygen are mixed (Step S31).

The manufacturing steps subsequent to Step S31 are the same as those in Embodiment 1, and thus the detailed description thereof is omitted here. By following the manufacturing steps subsequent to Step S31, a positive electrode active material 200A can be obtained in Step S36.

In this embodiment, Step S15 to Step S20 in Embodiment 1 can be omitted.

This embodiment can be freely combined with Embodiment 1.

Embodiment 3

An example of a method for manufacturing a positive electrode active material of one embodiment of the present invention will be described with reference to FIG. 3.

Figure 3:
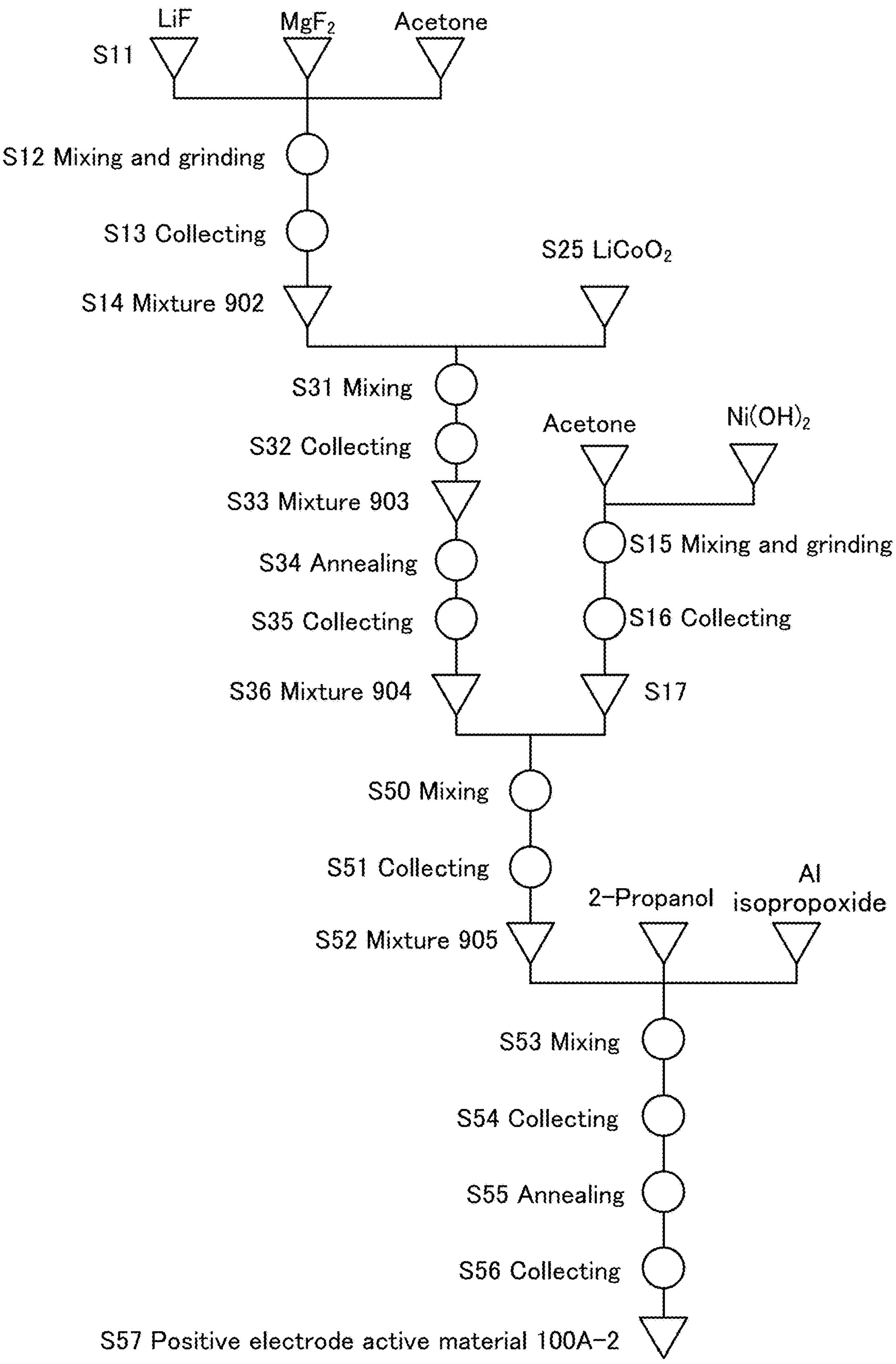
FIG. 3 illustrates an example of a method for manufacturing a positive electrode active material of one embodiment of the present invention.

As shown in Step S11 in FIG. 3, lithium fluoride that is a fluorine source and magnesium fluoride that is a magnesium source are first prepared as materials of the mixture 902. In particular, lithium fluoride is preferable because it is easily melted in the annealing process described later owing to its relatively low melting point of 848° C. Lithium fluoride can be used as both a lithium source and the fluorine source. Magnesium fluoride can be used as both the fluorine source and the magnesium source.

In this embodiment, lithium fluoride (LiF) is prepared as the fluorine source and the lithium source, and magnesium fluoride ($MgF_2$) is prepared as the fluorine source and the magnesium source (Step S11 in FIG. 3). The molar ratio of lithium fluoride to magnesium fluoride ($LiF:MgF_2$) is preferably x:1 ($0 \le x \le 1.9$), further preferably =x:1 ($0.1 \le x \le 0.5$), still further preferably x:1 (x=0.33 or a value close thereto).

In the case where the following mixing and grinding step is performed by a wet method, a solvent is prepared. As the solvent, ketone such as acetone, alcohol such as ethanol or isopropanol, ether, dioxane, acetonitrile, N-methyl-2-pyrrolidone (NMP), or the like can be used. An aprotic solvent, which hardly reacts with lithium, is preferably used. In this embodiment, acetone is used (Step S11 in FIG. 3).

Next, the materials of the mixture 902 are mixed and ground (Step S12 in FIG. 3). Although the mixing can be performed by either a dry method or a wet method, a wet method is preferable because the materials can be ground to a smaller size. For example, a ball mill or a bead mill can be used for the mixing. When the ball mill is used, zirconia balls are preferably used as media, for example. The mixing and grinding step is preferably performed enough to pulverize the mixture 902.

The materials mixed and ground in the above manner are collected (Step S13 in FIG. 3), whereby the mixture 902 is obtained (Step S14 in FIG. 3).

For example, the mixture 902 preferably has a D50 of greater than or equal to 600 nm and less than or equal to 20 μm, further preferably greater than or equal to 1 μm and less than or equal to 10 μm. When mixed with a composite oxide containing lithium, a transition metal, and oxygen in a later step, the mixture 902 pulverized to such a small size is easily attached uniformly to the surfaces of the composite oxide particles. The mixture 902 is preferably attached uniformly to the surfaces of the composite oxide particles, in which case halogen and magnesium are easily distributed to the surface portion of the composite oxide particles after heating. If the surface portion has a region that contains neither halogen nor magnesium, the positive electrode active material in a charged state might be less likely to have the aforementioned pseudo-spinel crystal structure.

Next, a lithium source is prepared as shown in Step S25. A pre-synthesized composite oxide containing lithium, a transition metal, and oxygen is prepared in Step S25.

For example, as pre-synthesized lithium cobalt oxide, a lithium cobalt oxide particle (product name: Cellseed C-10N, manufactured by Nippon Chemical Industrial Co., Ltd.) can be used. This is lithium cobalt oxide in which the average particle diameter (D50) is approximately 12 μm, and in the impurity analysis by glow discharge mass spectrometry (GD-MS), the concentrations of magnesium and fluorine are less than or equal to 50 ppm wt, the concentrations of calcium, aluminum, and silicon are less than or equal to 100 ppm wt, the concentration of nickel is less than or equal to 150 ppm wt, the concentration of sulfur is less than or equal to 500 ppm wt, the concentration of arsenic is less than or equal to 1,100 ppm wt, and the concentrations of elements other than lithium, cobalt, and oxygen are less than or equal to 150 ppm wt.

The composite oxide containing lithium, the transition metal, and oxygen in Step S25 preferably has a layered rock-salt crystal structure with few defects and distortions. Therefore, the composite oxide preferably includes few impurities. If a composite oxide containing lithium, a transition metal, and oxygen includes a large amount of impurities, the crystal structure is highly likely to have a lot of defects and distortions.

Next, the mixture 902 and the composite oxide containing lithium, the transition metal, and oxygen are mixed (Step S31 in FIG. 3). The ratio of the atomic number TM of the transition metal in the composite oxide containing lithium, the transition metal, and oxygen to the atomic number MgMix1 of magnesium in the mixture 902 (TM:MgMix1) is preferably 1:y ($0.005 \leq y \leq 0.05$), further preferably 1:y ($0.007 \leq y \leq 0.04$), still further preferably approximately 1:0.02.

The mixing in Step S31 is preferably performed under milder conditions than those for the mixing in Step S12, in order not to damage the composite oxide particles. For example, a condition with a smaller number of rotations or a shorter time than that for the mixing in Step S12 is preferable. Moreover, a dry method is regarded as a milder condition than a wet method. A ball mill or a bead mill can be used for the mixing, for example. When the ball mill is used, zirconia balls are preferably used as media, for example.

The materials mixed in the above manner are collected (Step S32 in FIG. 3), whereby the mixture 903 is obtained (Step S33 in FIG. 3).

Next, the mixture 903 is heated (Step S34 in FIG. 3).

The annealing is preferably performed at an appropriate temperature for an appropriate time. The appropriate temperature and time depend on the conditions such as the particle size and composition of the composite oxide containing lithium, the transition metal, and oxygen in Step S25. The annealing for small particles may be preferably performed at a lower temperature or for a shorter time than the case of the annealing for large particles.

When the average particle diameter (D50) of the particles in Step S25 is approximately 12 μm, the annealing temperature is preferably higher than or equal to 600° C. and lower than or equal to 950° C., for example. The annealing time is preferably longer than or equal to 3 hours, further preferably longer than or equal to 10 hours, still further preferably longer than or equal to 60 hours, for example.

Meanwhile, when the average particle diameter (D50) of the particles in Step S25 is approximately 5 μm, the annealing temperature is preferably higher than or equal to 600° C. and lower than or equal to 950° C., for example. The annealing time is preferably longer than or equal to 1 hour and shorter than or equal to 10 hours, further preferably approximately 2 hours, for example.

The time for lowering the temperature of the mixture 903 after the annealing is preferably longer than or equal to 10 hours and shorter than or equal to 50 hours, for example.

When the mixture 903 is annealed, it is likely that a material having a low melting point in the mixture 903 (e.g., lithium fluoride with a melting point of 848° C.) is melted first and distributed to the surface portion of the composite oxide particle. Next, the melted material causes a reduction in the melting point of another material, presumably resulting in melting of that material. For example, magnesium fluoride (melting point: 1263° C.) is presumably melted and distributed to the surface portion of the composite oxide particle.

The elements included in the mixture 903 diffuse faster in the surface portion of the composite oxide particle and the vicinity of the grain boundary than in the inner portion. Therefore, the concentrations of magnesium and halogen are higher in the surface portion and the vicinity of the grain boundary than in the inner portion. As will be described later, a higher magnesium concentration in the surface portion and the vicinity of the grain boundary can inhibit the change in the crystal structure more effectively.

The materials annealed in the above manner are collected (Step S35 in FIG. 3), whereby a mixture 904 is obtained (Step S36 in FIG. 3).

Next, as shown in Step S50, the mixture 904 and pulverized nickel hydroxide are mixed. Then, the mixed materials are collected (Step S51). The pulverized nickel hydroxide is formed in advance by Step S15 for mixing nickel hydroxide and acetone and Step S16 for collecting the mixture. Through Step S16, the pulverized nickel hydroxide is obtained (Step S17).

The materials mixed in Step S50 are collected in Step S51, whereby a mixture 905 is obtained (Step S52 in FIG. 3).

Next, through Step S53 to Step S55, a metal Z is added so that the positive electrode active material of one embodiment of the present invention is obtained. The metal Z can be added, for example, by a liquid phase method such as a sol-gel method, a solid phase method, a sputtering method, an evaporation method, a chemical vapor deposition (CVD) method, or a pulsed laser deposition (PLD) method.

As illustrated in FIG. 3, a metal source is first prepared in Step S52. In the case of employing a sol-gel method, a solvent used for the sol-gel method is also prepared. As the metal source, metal alkoxide, metal hydroxide, metal oxide, or the like can be used. When the metal Z is aluminum, for example, the number of aluminum atoms in the metal source ranges from 0.001 to 0.02 times the number of cobalt atoms in the lithium cobalt oxide. When the metal Z is nickel, for example, the number of nickel atoms in the metal source ranges from 0.001 to 0.02 times the number of cobalt atoms in the lithium cobalt oxide. When the metal Z is aluminum and nickel, for example, the number of aluminum atoms and the number of nickel atoms in the metal source each range from 0.001 to 0.02 times the number of cobalt atoms in the lithium cobalt oxide.

Here, an example of employing a sol-gel method using aluminum isopropoxide as the metal source and isopropanol as the solvent is shown (Step S52 in FIG. 3).

Next, the aluminum alkoxide is dissolved in alcohol, and then the lithium cobalt oxide particles are mixed (Step S53 in FIG. 3).

The necessary amount of metal alkoxide depends on the particle diameter of lithium cobalt oxide. For example, when aluminum isopropoxide is used and the particle diameter (D50) of the lithium cobalt oxide is approximately 20 μm, the aluminum isopropoxide is preferably added so that the number of aluminum atoms ranges from 0.001 to 0.02 times the number of cobalt atoms in the lithium cobalt oxide.

Next, the mixed solution of the alcohol solution of the metal alkoxide and the lithium cobalt oxide particles is stirred under an atmosphere containing water vapor. The stirring can be performed with a magnetic stirrer, for example. The stirring time is not limited as long as water in the atmosphere and the metal alkoxide cause hydrolysis and a polycondensation reaction. For example, the stirring can be performed at 25° C. and a relative humidity of 90% for four hours. Alternatively, the stirring may be performed under an atmosphere where the humidity and temperature are not adjusted, for example, an air atmosphere in a fume hood. In such a case, the stirring time is preferably set longer and can be 12 hours or longer at room temperature, for example.

A reaction between water vapor in the atmosphere and the metal alkoxide enables a sol-gel reaction to proceed slowly as compared with the case of adding liquid water. A reaction between metal alkoxide and water at room temperature enables a sol-gel reaction to proceed slowly as compared with the case where heating is performed at a temperature higher than the boiling point of alcohol serving as a solvent, for example. A sol-gel reaction that proceeds slowly enables formation of a high-quality coating layer with a uniform thickness.

After the above process, the precipitate is collected from the mixed solution (S54 in FIG. 3). As the collection method, filtration, centrifugation, evaporation to dryness, or the like can be used. The precipitate can be washed with alcohol, which is also used as the solvent for dissolving the metal alkoxide. Note that in the case of employing evaporation to dryness, the solvent and the precipitate are not necessarily separated in this step; for example, the precipitate is collected in the subsequent drying step in Step S54.

Next, the collected residue is dried, so that the mixture is obtained (Step S54 in FIG. 3). In the drying step, vacuum or ventilation drying can be performed at 80° C. for one hour to four hours, for example.

Then, the obtained mixture is heated (Step S55 in FIG. 3).

As for the heating time, the time for keeping the heating temperature within a predetermined range is preferably longer than or equal to 1 hour and shorter than or equal to 80 hours.

The heating temperature is lower than 1000° C., preferably higher than or equal to 700° C. and lower than or equal to 950° C., further preferably approximately 850° C.

The heating is preferably performed in an oxygen-containing atmosphere.

In this embodiment, the heating temperature is 850° C. and kept for two hours, the temperature rising rate is 200° C./h, and the flow rate of oxygen is 10 L/min.

The heating temperature in Step S55 is preferably lower than the heating temperature in Step S34.

<Step S56 and Step S57>

Next, cooled particles are collected (Step S56 in FIG. 3). Then, the particles are preferably sifted. Through the above process, a positive electrode active material 100A-2 of one embodiment of the present invention can be formed (Step S57 in FIG. 3).

Figure 33:
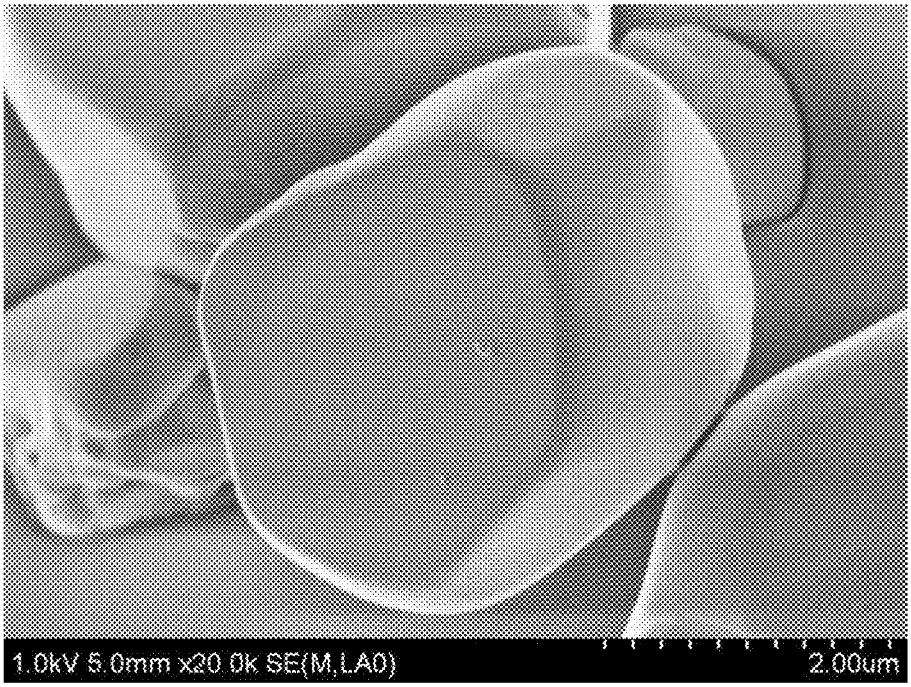
FIG. 33 shows a SEM image of a positive electrode active material of one embodiment of the present invention.

The positive electrode active material 100A-2 obtained by the above manufacturing method is described. FIG. 33 shows an image of the positive electrode active material 100A-2, taken with a scanning electron microscope (SEM).

[Structure of Positive Electrode Active Material]

A material with a layered rock-salt crystal structure, such as lithium cobalt oxide ($LiCoO_2$), is known to have a high discharge capacity and excel as a positive electrode active material of a secondary battery. An example of a material with a layered rock-salt crystal structure includes a composite oxide represented by $LiMO_2$. An example of the element M includes at least one of Co and Ni. Other examples of the element M include a combination of at least one of Al and Mn and at least one of Co and Ni.

It is known that the Jahn-Teller effect in a transition metal compound varies in degree according to the number of electrons in the d orbital of the transition metal.

In a compound containing nickel, distortion is likely to be caused because of the Jahn-Teller effect in some cases. Accordingly, when high-voltage charge and discharge are performed on $LiNiO_2$, the crystal structure might be disordered because of the distortion. The influence of the Jahn-Teller effect is suggested to be small in $LiCoO_2$; hence, $LiCoO_2$ is preferable because the resistance to high-voltage charge and discharge is higher in some cases.

Figure 4:
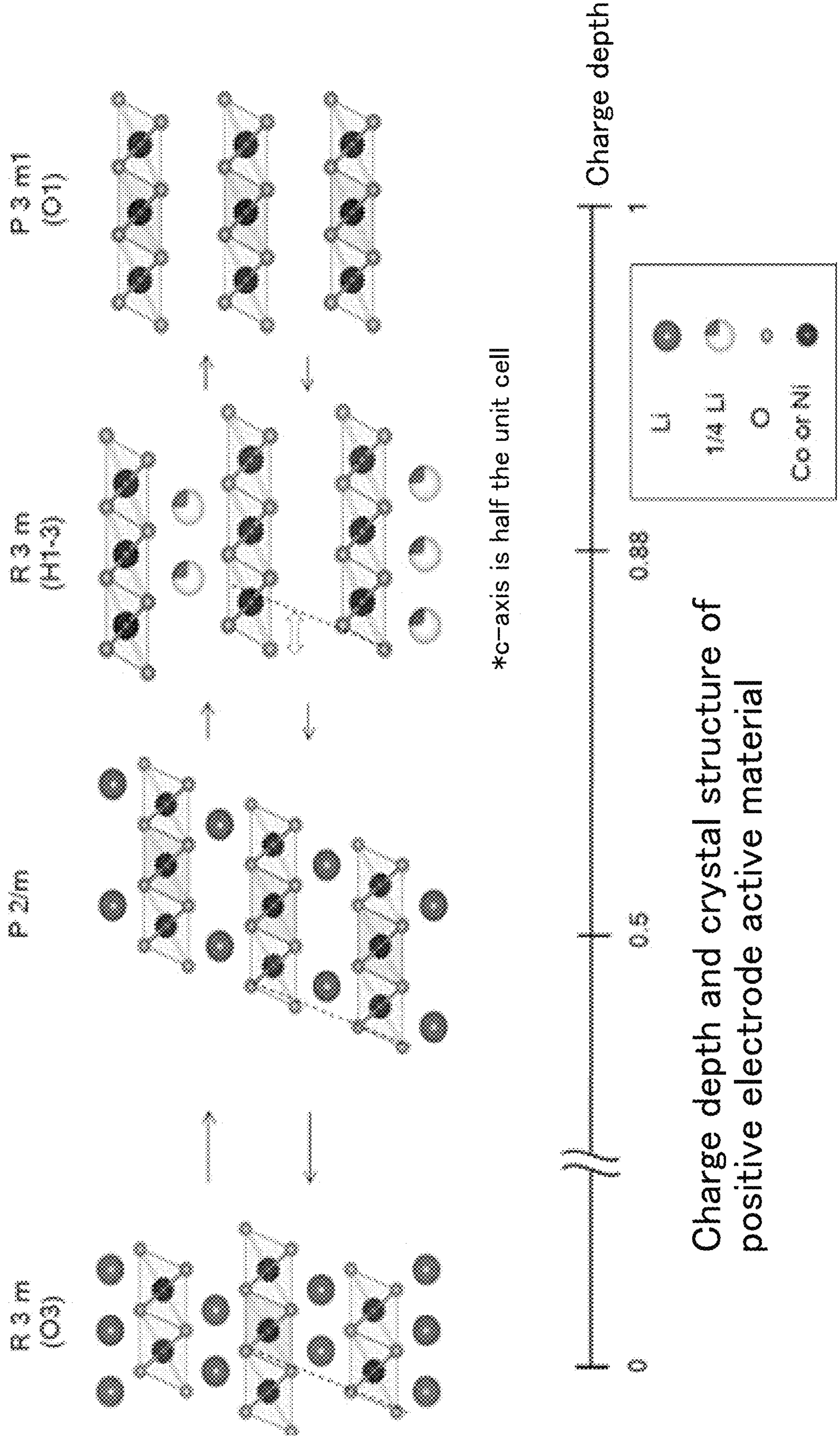
FIG. 4 illustrates the charge depth and crystal structures of a positive electrode active material.
Figure 5:
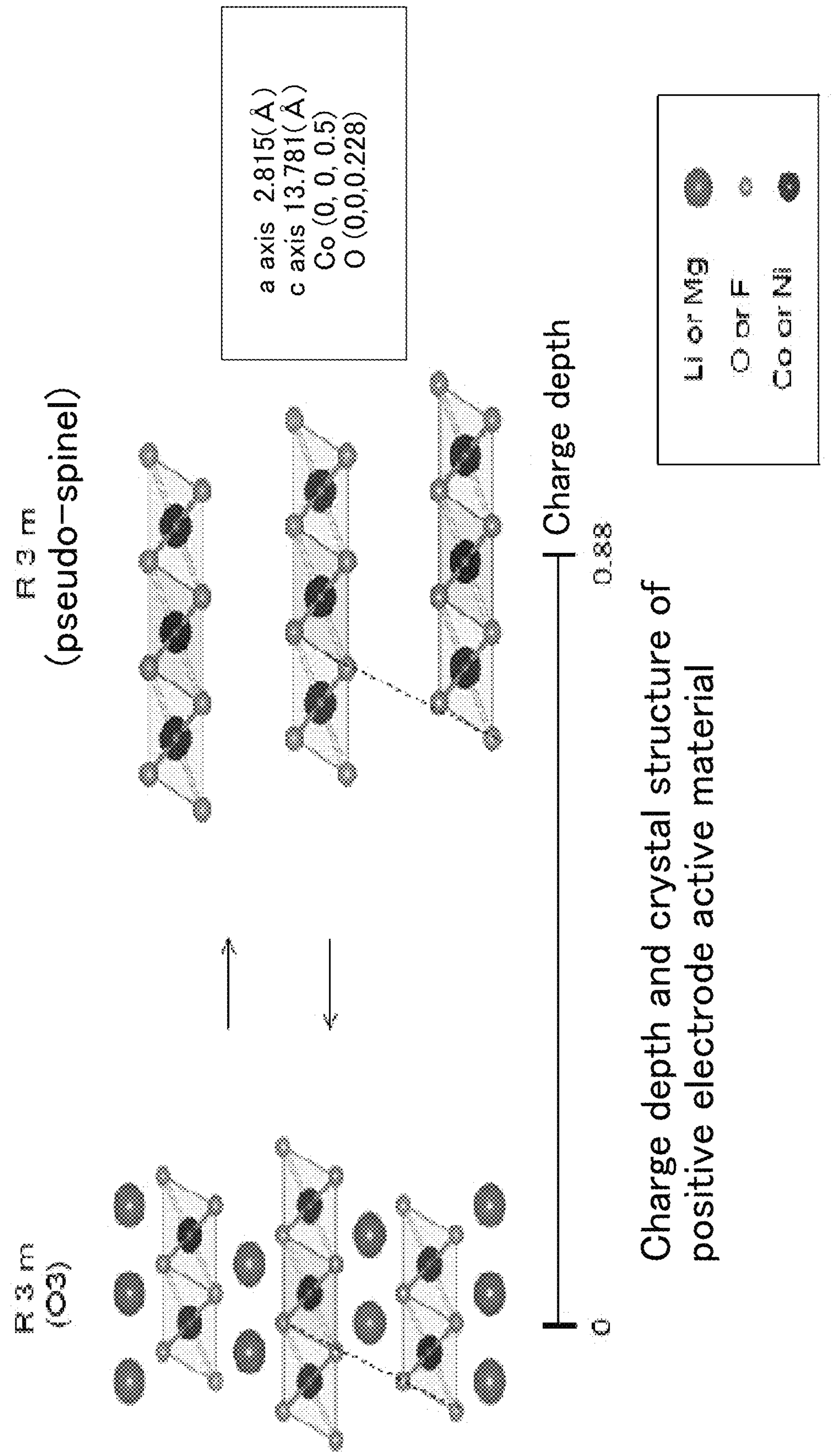
FIG. 5 illustrates the charge depth and crystal structures of a positive electrode active material.

Positive electrode active materials are described with reference to FIG. 4 and FIG. 5. In FIG. 4 and FIG. 5, the case where cobalt is used as the transition metal contained in the positive electrode active material is described.

<Positive Electrode Active Material>

In the positive electrode active material of one embodiment of the present invention, the difference in the positions of $CoO_2$ layers can be small in repeated charge and discharge at high voltage. Furthermore, the change in the volume can be small. Accordingly, the positive electrode active material of one embodiment of the present invention can achieve excellent cycling performance. In addition, the positive electrode active material of one embodiment of the present invention can have a stable crystal structure in a high-voltage charged state. Thus, in the positive electrode active material of one embodiment of the present invention, a short-circuit is less likely to occur while the high-voltage charged state is maintained. This is preferable because the safety is further improved.

The positive electrode active material of one embodiment of the present invention has a small crystal-structure change and a small volume difference per the same number of transition metal atoms between a sufficiently discharged state and a high-voltage charged state.

FIG. 4 illustrates crystal structures of the positive electrode active material 100A-1 before and after charge and discharge. The positive electrode active material 100A-1 is a composite oxide containing lithium, cobalt, and oxygen. In addition to the above elements, the positive electrode active material 100A-1 preferably contains magnesium. The positive electrode active material 100A-1 preferably contains halogen such as fluorine or chlorine. The positive electrode active material 100A-1 preferably contains aluminum and nickel.

The crystal structure with a charge depth of 0 (in a discharged state) in FIG. 4 is R-3m (O3) as in a positive electrode active material 100C of a comparative example in FIG. 5. Meanwhile, the positive electrode active material 100A-1 and the mixture 904 with a charge depth in a sufficiently charged state include a crystal whose structure is different from the H1-3 crystal structure. This structure belongs to the space group R-3m, and is not a spinel crystal structure but a structure in which an ion of cobalt, magnesium, or the like is coordinated to six oxygen atoms and the cation arrangement has symmetry similar to that of the spinel crystal structure. This structure is thus referred to as a pseudo-spinel crystal structure in this specification and the like. Although lithium is not illustrated in the pseudo-spinel crystal structure in FIG. 4 to show the symmetry of cobalt atoms and the symmetry of oxygen atoms, lithium of 20 atomic % or less, for example, with respect to cobalt practically exists between the $CoO_2$ layers. In both the O3 crystal structure and the pseudo-spinel crystal structure, a slight amount of magnesium preferably exists between the $CoO_2$ layers, i.e., in lithium sites. In addition, a slight amount of halogen such as fluorine preferably exists at random in oxygen sites.

Note that in the pseudo-spinel crystal structure, a light element such as lithium is sometimes coordinated to four oxygen atoms. In that case, the ion arrangement also has symmetry like that of the spinel crystal structure.

The pseudo-spinel crystal structure can be regarded as a crystal structure that contains Li between layers randomly and is similar to the $CdCl_2$ crystal structure. The crystal structure similar to the $CdCl_2$ crystal structure is close to a crystal structure of lithium nickel oxide ($Li_{0.06}NiO_2$) that is charged until the charge depth reaches 0.94; however, pure lithium cobalt oxide or a layered rock-salt positive electrode active material containing a large amount of cobalt is known not to have such a crystal structure generally.

Anions of a layered rock-salt crystal and anions of a rock-salt crystal form a cubic close-packed structure (face-centered cubic lattice structure). Anions of a pseudo-spinel crystal are presumed to form a cubic close-packed structure. When a pseudo-spinel crystal is in contact with a layered rock-salt crystal and a rock-salt crystal, there is a crystal plane at which orientations of cubic close-packed structures formed of anions are aligned with each other. A space group of each of the layered rock-salt crystal and the pseudo-spinel crystal is R-3m, which is different from a space group Fm-3m of a general rock-salt crystal and a space group Fd-3m of a rock-salt crystal having the simplest symmetry; thus, the Miller index of the crystal plane satisfying the above conditions in the layered rock-salt crystal and the pseudo-spinel crystal is different from that in the rock-salt crystal. In this specification, a state where the orientations of the cubic close-packed structures formed of anions in the layered rock-salt crystal, the pseudo-spinel crystal, and the rock-salt crystal are aligned with each other is sometimes referred to as a state where crystal orientations are substantially aligned with each other.

In the positive electrode active material 100A-1 and the mixture 904, a change in the crystal structure caused by extraction of a large amount of lithium during high-voltage charging is smaller than that in the positive electrode active material 100C of the comparative example. As indicated by the dotted lines in FIG. 4, for example, there is little difference in the positions of the $CoO_2$ layers in the crystal structures.

Specifically, the structures of the positive electrode active material 100A-1 and the mixture 904 are highly stable even when a charge voltage is high. For example, at a charge voltage that makes the positive electrode active material 100C of the comparative example have the H1-3 crystal structure, for example, at a voltage of approximately 4.6 V with reference to the potential of lithium metal, the R-3m (O3) crystal structure can be maintained. Moreover, in a higher charge voltage region, for example, at voltages of approximately 4.65 V to 4.7 V with reference to the potential of lithium metal, the pseudo-spinel crystal structure can be obtained. At a much higher charge voltage, the H1-3 crystal structure is eventually observed in some cases. In the case where graphite, for instance, is used as a negative electrode active material in a secondary battery, when the voltage of the secondary battery ranges from 4.3 V to 4.5 V, for example, the R-3m (O3) crystal structure can be maintained. In a higher charge voltage region, for example, at voltages of 4.35 V to 4.55 V with reference to the potential of lithium metal, the pseudo-spinel crystal structure can be obtained.

Thus, in the positive electrode active material 100A-1 and the mixture 904, the crystal structure is less likely to be disordered even when charge and discharge are repeated at high voltage.

Note that in the unit cell of the pseudo-spinel crystal structure, the coordinates of cobalt and oxygen can be represented by (0, 0, 0.5) and (0, 0, x), respectively, within the range of $0.20 \leq x \leq 0.25$.

A slight amount of magnesium randomly existing between the $CoO_2$ layers, i.e., in lithium sites can reduce a difference in the positions of the $CoO_2$ layers. Thus, magnesium between the $CoO_2$ layers makes it easier to obtain the pseudo-spinel crystal structure. Therefore, magnesium is preferably distributed over the particles of the positive electrode active material 100A-1 and the mixture 904. To distribute magnesium over the particles, heat treatment is preferably performed in the manufacturing process of the positive electrode active material 100A-1 and the mixture 904.

However, heat treatment at excessively high temperature may cause cation mixing, which increases the possibility of entry of magnesium into the cobalt sites. Magnesium in the cobalt sites eliminates the effect of maintaining the R-3m structure. Furthermore, heat treatment at excessively high temperature might have an adverse effect; for example, cobalt might be reduced to have a valence of two or lithium might be evaporated.

In view of the above, a halogen compound such as a fluorine compound is preferably added to lithium cobalt oxide before the heat treatment for distributing magnesium over the particles. The addition of the halogen compound decreases the melting point of lithium cobalt oxide. The decreased melting point makes it easier to distribute magnesium over the particles at a temperature at which the cation mixing is unlikely to occur. Furthermore, the fluorine compound probably increases corrosion resistance to hydrofluoric acid generated by decomposition of an electrolyte solution.

When the magnesium concentration is higher than a predetermined value, the effect of stabilizing a crystal structure becomes small in some cases. This is probably because magnesium enters the cobalt sites in addition to the lithium sites. The number of magnesium atoms in the positive electrode active material of one embodiment of the present invention is preferably 0.001 to 0.1 times, preferably larger than 0.01 times and less than 0.04 times, still further preferably approximately 0.02 times the number of cobalt atoms. The magnesium concentration described here may be a value obtained by element analysis on the entire particles of the positive electrode active material using inductive coupled plasma mass spectrometry (ICP-MS) or the like, or may be a value based on the ratio of the raw materials mixed in the process of manufacturing the positive electrode active material, for example.

To lithium cobalt oxide, as a metal other than cobalt (hereinafter the metal Z), one or more metals selected from nickel, aluminum, manganese, titanium, vanadium, and chromium may added, for example, and in particular, at least one of nickel and aluminum is preferably added. In some cases, manganese, titanium, vanadium, and chromium are likely to have a valence of four stably and thus contribute highly to a stable structure. The addition of the metal Z may enable the positive electrode active material of one embodiment of the present invention to have a more stable crystal structure in high-voltage charging, for example. Here, in the positive electrode active material 100A-1 of one embodiment of the present invention, the metal Z is preferably added at a concentration at which the crystallinity of the lithium cobalt oxide is not greatly changed. For example, the metal Z is preferably added at an amount with which the aforementioned Jahn-Teller effect is not exhibited. The metal Z is a metal added to the lithium cobalt oxide in the process of manufacturing the positive electrode active material.

As the magnesium concentration in the positive electrode active material 100A-1 of one embodiment of the present invention increases, the capacity of the positive electrode active material decreases in some cases. As an example, one possible reason is that the amount of lithium that contributes to charge and discharge decreases when magnesium enters the lithium sites. Another possible reason is that excess magnesium generates a magnesium compound that does not contribute to charge and discharge. When the positive electrode active material of one embodiment of the present invention contains nickel as the metal Z in addition to magnesium, the capacity per weight and per volume can be increased in some cases. When the positive electrode active material of one embodiment of the present invention contains aluminum as the metal Z in addition to magnesium, the capacity per weight and per volume can be increased in some cases. When the positive electrode active material of one embodiment of the present invention contains nickel and aluminum in addition to magnesium, the capacity per weight and per volume can be increased in some cases.

The concentrations of the elements, such as magnesium and the metal Z, contained in the positive electrode active material of one embodiment of the present invention are described below using the number of atoms.

The number of nickel atoms in the positive electrode active material 100A-1 of one embodiment of the present invention is preferably 7.5% or less, further preferably 0.05% to 4%, still further preferably 0.1% to 2% the number of cobalt atoms. The nickel concentration described here may be a value obtained by element analysis on the entire particles of the positive electrode active material using ICP-MS or the like, or may be a value based on the ratio of the raw materials mixed in the process of manufacturing the positive electrode active material, for example.

The number of aluminum atoms in the positive electrode active material 100A-1 of one embodiment of the present invention is preferably 0.05% to 4%, further preferably 0.1% to 2% the number of cobalt atoms. The aluminum concentration described here may be a value obtained by element analysis on the entire particles of the positive electrode active material using ICP-MS or the like, or may be a value based on the ratio of the raw materials mixed in the process of manufacturing the positive electrode active material, for example.

In the case where the electrolyte solution contains $LiPF_6$, hydrogen fluoride may be generated by hydrolysis. In some cases, hydrogen fluoride is generated by the reaction of PVDF used as a component of the positive electrode and alkali. The decrease in hydrogen fluoride concentration in the electrolyte solution may inhibit corrosion and coating film separation of a current collector or may inhibit a reduction in adhesion properties due to gelling or insolubilization of PVDF.

<<Particle Diameter>>

When the particle diameters of the positive electrode active material 100A-1 and the mixture 904 are too large, there are problems such as difficulty in lithium diffusion and large surface roughness of an active material layer at the time when these materials are applied to a current collector. By contrast, too small a particle diameter causes problems such as difficulty in supporting the active material layer at the time when these materials are applied to the current collector and overreaction with the electrolyte solution. Therefore, the average particle diameter (D50, also referred to as median diameter) ranges preferably from 1 μm to 100 μm, further preferably from 2 μm to 40 μm, still further preferably from 5 μm to 30 μm.

<Analysis Method>

Whether or not a given positive electrode active material is the positive electrode active material 100A-1 or the mixture 904 of one embodiment of the present invention, each of which has the pseudo-spinel crystal structure when charged with a high voltage, can be judged by analyzing a high-voltage charged positive electrode by XRD, electron diffraction, neutron diffraction, electron spin resonance (ESR), nuclear magnetic resonance (NMR), or the like. The XRD is particularly preferable because the symmetry of a transition metal such as cobalt in the positive electrode active material can be analyzed with high resolution, comparison of the degree of crystallinity and comparison of the crystal orientation can be performed, distortion of lattice arrangement and the crystallite size can be analyzed, and a positive electrode obtained only by disassembling a secondary battery can be measured with sufficient accuracy, for example.

As described above, the positive electrode active material 100A-1 and the mixture 904 of one embodiment of the present invention feature in a small change in the crystal structure between a high-voltage charged state and a discharged state. A material in which 50 wt % or more of the crystal structure largely changes between a high-voltage charged state and a discharged state is not preferable because the material cannot withstand high-voltage charging and discharging. It should be noted that the intended crystal structure is not obtained in some cases only by addition of an impurity element. For example, in a high-voltage charged state, lithium cobalt oxide containing magnesium and fluorine has the pseudo-spinel crystal structure at 60 wt % or more in some cases, and has the H1-3 crystal structure at 50 wt % or more in other cases. In some cases, lithium cobalt oxide containing magnesium and fluorine may have the pseudo-spinel crystal structure at almost 100 wt % in charging at a predetermined voltage, and charging at a voltage higher than the predetermined voltage may cause the H1-3 crystal structure. Thus, to determine whether or not a positive electrode active material is the positive electrode active material 100A-1 or the mixture 904 of one embodiment of the present invention, the crystal structure should be analyzed by XRD and other methods.

However, the crystal structure of a positive electrode active material in a high-voltage charged state or a discharged state may be changed with exposure to air. For example, the pseudo-spinel crystal structure changes into the H1-3 crystal structure in some cases. For that reason, all samples are preferably handled in an inert atmosphere such as an argon atmosphere.

<Positive Electrode Active Material 100C of Comparative Example>

The positive electrode active material 100C of the comparative example shown in FIG. 5 is lithium cobalt oxide ($LiCoO_2$) to which halogen and magnesium are not added in a manufacturing method described later. As described in Non-Patent Documents 1 and 2 and the like, the crystal structure of the lithium cobalt oxide shown in FIG. 5 changes with the charge depth.

As illustrated in FIG. 5, the lithium cobalt oxide with a charge depth of 0 (in a discharged state) includes a region having the crystal structure with the space group R-3m, and includes three $CoO_2$ layers in a unit cell. Thus, this crystal structure is referred to as an O3 crystal structure in some cases. Note that here, the $CoO_2$ layer has a structure in which an octahedral structure with cobalt coordinated to six oxygen atoms continues on a plane in an edge-shared state.

Lithium cobalt oxide with a charge depth of 1 has the crystal structure with the space group P-3m1 and includes one $CoO_2$ layer in a unit cell. Hence, this crystal structure is referred to as an O1 crystal structure in some cases.

Lithium cobalt oxide with a charge depth of approximately 0.88 has the crystal structure with the space group R-3m. This structure can also be regarded as a structure in which $CoO_2$ structures such as P-3m1 (O1) and $LiCoO_2$ structures such as R-3m (O3) are alternately stacked. Thus, this crystal structure is referred to as an H1-3 crystal structure in some cases. Note that the number of cobalt atoms per unit cell in the actual H1-3 crystal structure is twice that in other structures. However, in this specification including FIG. 5, the c-axis of the H1-3 crystal structure is half that of the unit cell for easy comparison with the other structures.

For the H1-3 crystal structure, as disclosed in Non-Patent Document 3, the coordinates of cobalt and oxygen in the unit cell can be expressed as follows, for example: Co (0, 0, 0.42150±0.00016), $O_1$ (0, 0, 0.27671±0.00045), and $O_2$ (0, 0, 0.11535±0.00045). Note that $O_1$ and $O_2$ are each an oxygen atom. In this manner, the H1-3 crystal structure is represented by a unit cell including one cobalt and two oxygen. Meanwhile, the pseudo-spinel crystal structure of one embodiment of the present invention is preferably represented by a unit cell including one cobalt and one oxygen, as described later. This means that the symmetry of cobalt and oxygen differs between the pseudo-spinel structure and the H1-3 structure, and the amount of change from the O3 structure is smaller in the pseudo-spinel structure than in the H1-3 structure. A preferred unit cell for representing a crystal structure in a positive electrode active material is selected so that the value of goodness of fit (GOF) is smaller in Rietveld analysis of XRD patterns, for example.

When charging with a high voltage of 4.6 V or higher based on the redox potential of a lithium metal or charging with a large charge depth of 0.8 or more and discharging are repeated, the crystal structure of lithium cobalt oxide changes (i.e., an unbalanced phase change occurs) repeatedly between the H1-3 crystal structure and the R-3m (O3) structure in a discharged state.

However, there is a large difference in the positions of the $CoO_2$ layers between these two crystal structures. As indicated by the dotted lines and the arrows in FIG. 5, the $CoO_2$ layer in the H1-3 crystal structure largely shifts from that in the R-3m (O3) structure. Such a dynamic structural change can adversely affect the stability of the crystal structure.

A difference in volume is also large. The H1-3 crystal structure and the O3 crystal structure in a discharged state that contain the same number of cobalt atoms have a difference in volume of 3.0% or more.

In addition, a structure in which $CoO_2$ layers are arranged continuously, such as P-3m1 (O1), included in the H1-3 crystal structure is highly likely to be unstable.

Accordingly, the repeated high-voltage charging and discharging gradually break the crystal structure of lithium cobalt oxide. The broken crystal structure triggers deterioration of the cycling performance. This is probably because the broken crystal structure has a smaller number of sites where lithium can exist stably and makes it difficult to insert and extract lithium.

Embodiment 4

In this embodiment, examples of materials that can be used for a secondary battery containing the positive electrode active material 100A-1 or the mixture 904 described in the above embodiment will be described.

<Structure Example 1 of Secondary Battery>

Hereinafter, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer contains at least a positive electrode active material. The positive electrode active material layer may contain another material for a coating film on the active material surface, a conductive additive, a binder, or the like in addition to the positive electrode active material.

As the positive electrode active material, the positive electrode active material 100A-1 or 100A-2 described in the above embodiment can be used. A secondary battery including the positive electrode active material 100A-1 or 100A-2 described in the above embodiment can have high capacity and excellent cycling performance.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, further preferably greater than or equal to 1 wt % and less than or equal to 5 wt %.

A network for electric conduction can be formed in the active material layer by the conductive additive. The conductive additive allows the maintenance of a path for electrical conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, or a conductive ceramic material can be used, for example.

Alternatively, a graphene compound may be used as the conductive additive.

A graphene compound sometimes has excellent electrical characteristics of high conductivity and excellent physical properties of high flexibility and high mechanical strength. A graphene compound has a planar shape. A graphene compound enables low-resistance surface contact. Furthermore, a graphene compound sometimes has extremely high conductivity even with a small thickness, and thus a small amount of a graphene compound efficiently allows a conductive path to be formed in an active material layer. Hence, a graphene compound is preferably used as the conductive additive, in which case the area where the active material and the conductive additive are in contact with each other can be increased. A graphene compound serving as the conductive additive is preferably formed with a spray dry apparatus as a coating film to cover the entire surface of the active material, in which case the electrical resistance can sometimes be reduced. Here, it is particularly preferable to use, for example, graphene, multilayer graphene, or RGO as a graphene compound. Note that RGO refers to a compound obtained by reducing graphene oxide (GO), for example.

In the case where an active material with a small particle diameter (e.g., 1 μm or less) is used, the specific surface area of the active material is large and thus more conductive paths for the active material particles are needed. For that reason, the amount of the conductive additive tends to increase and the loading amount of the active material tends to decrease relatively. When the loading amount of active material decreases, the capacity of the secondary battery also decreases. In such a case, a graphene compound, which can efficiently form a conductive path even with a small amount, is particularly preferably used as the conductive additive because the loading amount of the active material does not have to decrease.

A cross-sectional structure example of an active material layer 200 containing a graphene compound as a conductive additive is described below.

Figure 6A:
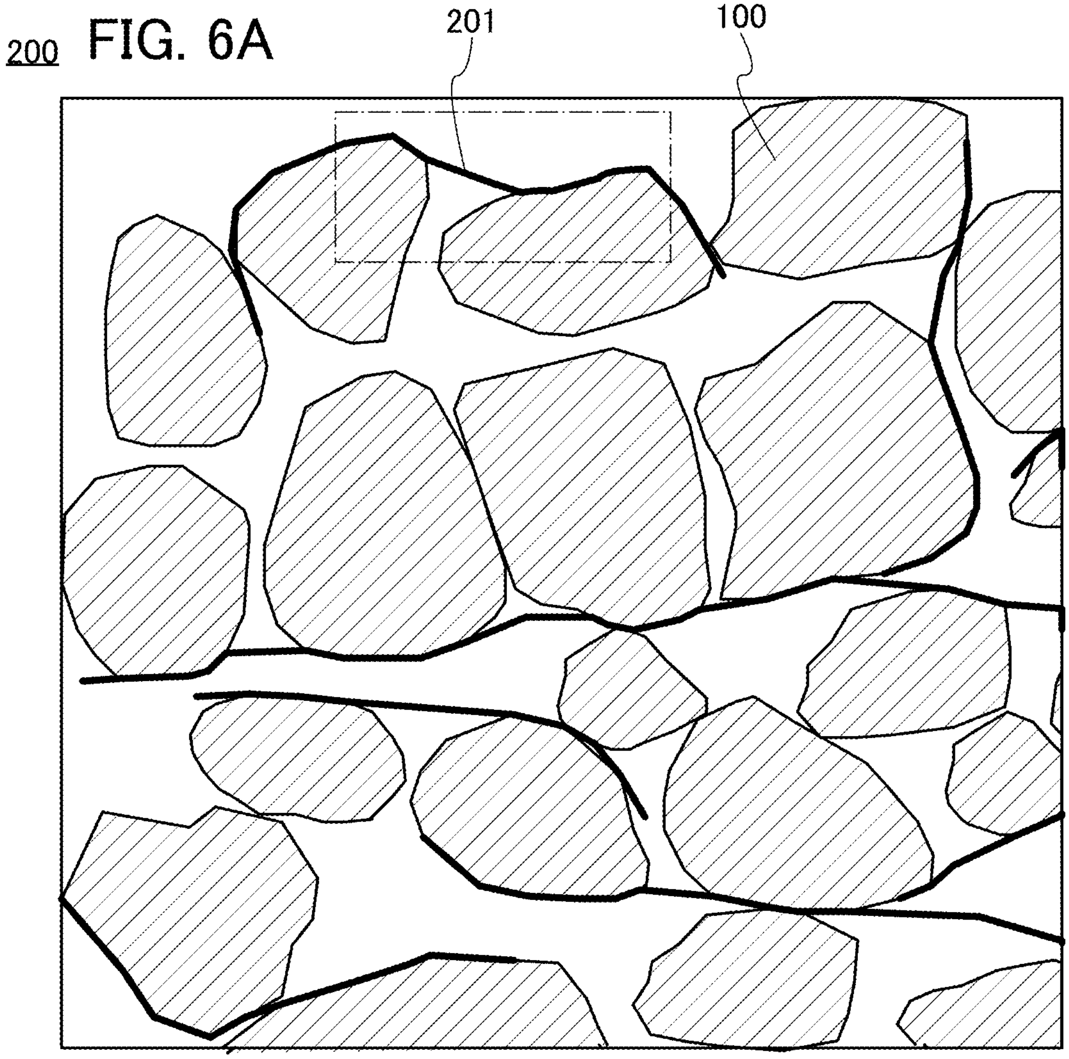
FIGS. 6A and 6B are cross-sectional views of an active material layer containing a graphene compound as a conductive additive.

FIG. 6A is a longitudinal cross-sectional view of the active material layer 200. The active material layer 200 includes particles of a positive electrode active material 100, a graphene compound 201 serving as a conductive additive, and a binder (not illustrated). Here, graphene or multilayer graphene can be used as the graphene compound 201, for example. The graphene compound 201 preferably has a sheet-like shape. Alternatively, the graphene compound 201 may have a sheet-like shape formed of a plurality of sheets of multilayer graphene and/or a plurality of sheets of graphene that partly overlap each other.

Figure 6B:
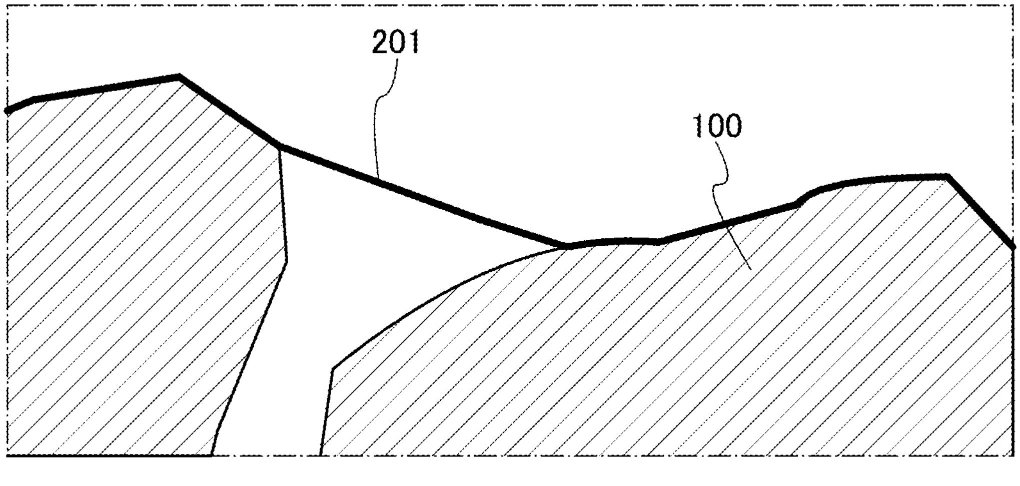

The longitudinal cross section of the active material layer 200 in FIG. 6B shows substantially uniform dispersion of the sheet-like graphene compounds 201 in the active material layer 200. The graphene compounds 201 are schematically shown by thick lines in FIG. 6B but are actually thin films each having a thickness corresponding to the thickness of a single layer or a multi-layer of carbon molecules. The plurality of graphene compounds 201 are formed to partly coat or adhere to the surfaces of the plurality of particles of the positive electrode active material 100, so that the graphene compounds 201 make surface contact with the particles of the positive electrode active material 100.

Here, the plurality of graphene compounds are bonded to each other to form a net-like graphene compound sheet (hereinafter referred to as a graphene compound net or a graphene net). A graphene net that covers the active material can function as a binder for bonding the active material particles. Accordingly, the amount of the binder can be reduced, or the binder does not have to be used. This can increase the proportion of the active material in the electrode volume or weight. That is to say, the capacity of the secondary battery can be increased.

Here, it is preferable to perform reduction after a layer to be the active material layer 200 is formed in such a manner that graphene oxide is used as the graphene compound 201 and mixed with an active material. When graphene oxide with extremely high dispersibility in a polar solvent is used for the formation of the graphene compounds 201, the graphene compounds 201 can be substantially uniformly dispersed in the active material layer 200. The solvent is removed by volatilization from a dispersion medium in which graphene oxide is uniformly dispersed, and the graphene oxide is reduced; hence, the graphene compounds 201 remaining in the active material layer 200 partly overlap each other and are dispersed such that surface contact is made, thereby forming a three-dimensional conduction path. Note that graphene oxide can be reduced by heat treatment or with the use of a reducing agent, for example.

Unlike a conductive additive in the form of particles, such as acetylene black, which makes point contact with an active material, the graphene compound 201 is capable of making low-resistance surface contact; accordingly, the electrical conduction between the particles of the positive electrode active material 100 and the graphene compound 201 can be improved with a small amount of the graphene compound 201 compared with a normal conductive additive. Thus, the proportion of the positive electrode active material 100 in the active material layer 200 can be increased, resulting in increased discharge capacity of the secondary battery.

Alternatively, a graphene compound serving as a conductive additive can be formed in advance with a spray dry apparatus as a coating film to cover the entire surface of the active material, and a conductive path between the active material particles can be formed using the graphene compound.

As the binder, a rubber material such as styrene-butadiene rubber (SBR), styrene-isoprene-styrene rubber, acrylonitrile-butadiene rubber, butadiene rubber, or ethylene-propylene-diene copolymer is preferably used, for example. Alternatively, fluororubber can be used as the binder.

For the binder, for example, water-soluble polymers are preferably used. As the water-soluble polymers, for example, a polysaccharide can be used. Examples of the polysaccharide include cellulose derivatives such as carboxymethyl cellulose (CMC), methyl cellulose, ethyl cellulose, hydroxypropyl cellulose, diacetyl cellulose, and regenerated cellulose and starch. It is further preferable that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

At least two of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for instance, a water-soluble polymer is preferably used. An example of a water-soluble polymer having a significant viscosity modifying effect is the above-mentioned polysaccharide; for instance, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly easily exerts an effect as a viscosity modifier. A high solubility can also increase the dispersibility of an active material and other components in the formation of slurry for an electrode. In this specification, cellulose and a cellulose derivative used as a binder of an electrode include salts thereof.

A water-soluble polymer stabilizes the viscosity by being dissolved in water and allows stable dispersion of the active material and another material combined as a binder, such as styrene-butadiene rubber, in an aqueous solution. Furthermore, a water-soluble polymer is expected to be easily and stably adsorbed to an active material surface because it has a functional group. Many cellulose derivatives, such as carboxymethyl cellulose, have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve also as a passivation film to suppress the decomposition of the electrolyte solution. Here, the passivation film refers to a film without electric conductivity or a film with extremely low electric conductivity, and can inhibit the decomposition of an electrolytic solution at a potential at which a battery reaction occurs when the passivation film is formed on the active material surface, for example. It is preferred that the passivation film can conduct lithium ions while suppressing electric conduction.

<Positive Electrode Current Collector>

The positive electrode current collector can be formed using a material that has high conductivity, such as a metal like stainless steel, gold, platinum, aluminum, or titanium or an alloy thereof. It is preferred that a material used for the positive electrode current collector not dissolve at the potential of the positive electrode. Alternatively, the positive electrode current collector can be formed using an aluminum alloy to which an element that improves heat resistance, such as silicon, titanium, neodymium, scandium, or molybdenum, is added. Still alternatively, a metal element that forms silicide by reacting with silicon may be used. Examples of the metal element that forms silicide by reacting with silicon include zirconium, titanium, hafnium, vanadium, niobium, tantalum, chromium, molybdenum, tungsten, cobalt, and nickel. The current collector can have a foil-like shape, a plate-like shape (sheet-like shape), a net-like shape, a punching-metal shape, an expanded-metal shape, or the like as appropriate. The current collector preferably has a thickness greater than or equal to 5 μm and less than or equal to 30 μm.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element that enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. Note that SiO can alternatively be expressed as $SiO_x$. Here, x preferably has an approximate value of 1. For example, x is preferably more than or equal to 0.2 and less than or equal to 1.5, further preferably more than or equal to 0.3 and less than or equal to 1.2.

As the carbon-based material, graphite, graphitizing carbon (soft carbon), non-graphitizing carbon (hard carbon), carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

As the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Alternatively, as the negative electrode active material, $Li_{3-x}M_xN$ (M is Co, Ni, or Cu) with a $Li_3N$ structure, which is a nitride containing lithium and a transition metal, can be used. For example, $Li_2.6Co_{0.4}N_3$ is preferable because of high charge and discharge capacity (900 mAh/g and 1890 $mAh/cm^3$).

A nitride containing lithium and a transition metal is preferably used, in which case lithium ions are contained in the negative electrode active material and thus the negative electrode active material can be used in combination with a material for a positive electrode active material that does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material; for example, a transition metal oxide that does not form an alloy with lithium, such as cobalt oxide (CoO), nickel oxide (NiO), or iron oxide (FeO), may be used. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material that is not alloyed with carrier ions of lithium or the like is preferably used for the negative electrode current collector.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharging or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As the electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains small numbers of dust particles and elements other than the constituent elements of the electrolyte solution (hereinafter also simply referred to as impurities). Specifically, the weight ratio of impurities to the electrolyte solution is preferably less than or equal to 1%, further preferably less than or equal to 0.1%, still further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of the material to be added is, for example, higher than or equal to 0.1 wt % and lower than or equal to 5 wt % of the whole solvent.

Alternatively, a polymer gel electrolyte obtained in such a manner that a polymer is swelled with an electrolyte solution may be used.

When a polymer gel electrolyte is used, safety against liquid leakage and the like is improved. Moreover, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based or oxide-based inorganic material, or a solid electrolyte including a polymer material such as a polyethylene oxide (PEO)-based polymer material may alternatively be used. When the solid electrolyte is used, a separator and a spacer are not necessary. Furthermore, the battery can be entirely solidified; therefore, there is no possibility of liquid leakage and thus the safety of the battery is dramatically improved.

[Separator]

The secondary battery preferably includes a separator. The separator can be formed using, for example, paper, nonwoven fabric, glass fiber, ceramics, or synthetic fiber containing nylon (polyamide), vinylon (polyvinyl alcohol-based fiber), polyester, acrylic, polyolefin, or polyurethane. The separator is preferably formed to have an envelope-like shape to wrap one of the positive electrode and the negative electrode.

The separator may have a multilayer structure. For example, an organic material film of polypropylene, polyethylene, or the like can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charging and discharging at high voltage can be suppressed and thus the reliability of the secondary battery can be improved. When the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. A film-like exterior body can also be used. As the film, for example, it is possible to use a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

<Structure Example 2 of Secondary Battery>

A structure of a secondary battery including a solid electrolyte layer will be described below as another structure example of a secondary battery.

Figure 7A:
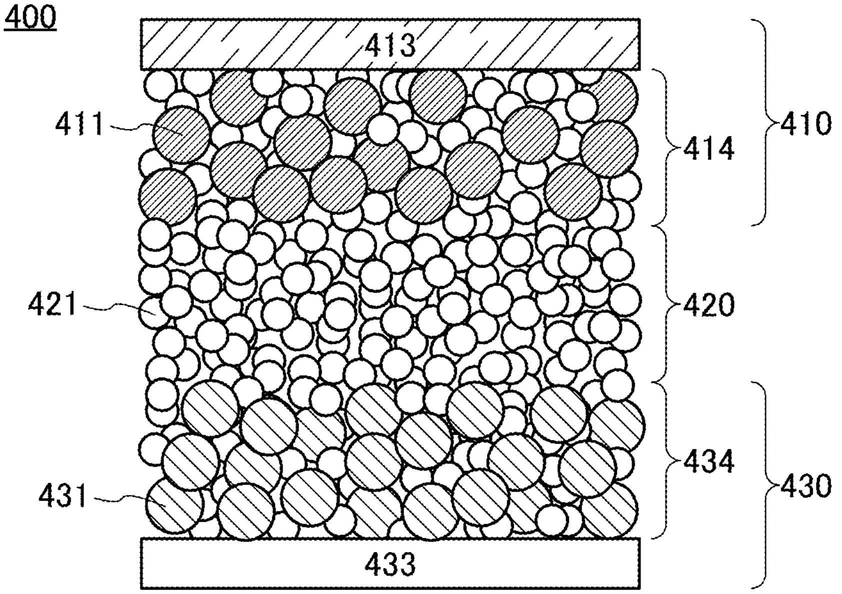
FIGS. 7A and 7B are cross-sectional views each illustrating an example of a secondary battery of one embodiment of the present invention.

As illustrated in FIG. 7A, a secondary battery 400 of one embodiment of the present invention includes a positive electrode 410, a solid electrolyte layer 420, and a negative electrode 430.

The positive electrode 410 includes a positive electrode current collector 413 and a positive electrode active material layer 414. The positive electrode active material layer 414 includes a positive electrode active material 411 and a solid electrolyte 421. The positive electrode active material layer 414 may also include a conductive additive and a binder.

The solid electrolyte layer 420 includes the solid electrolyte 421. The solid electrolyte layer 420 is positioned between the positive electrode 410 and the negative electrode 430 and is a region that includes neither the positive electrode active material 411 nor a negative electrode active material 431.

Figure 7B:
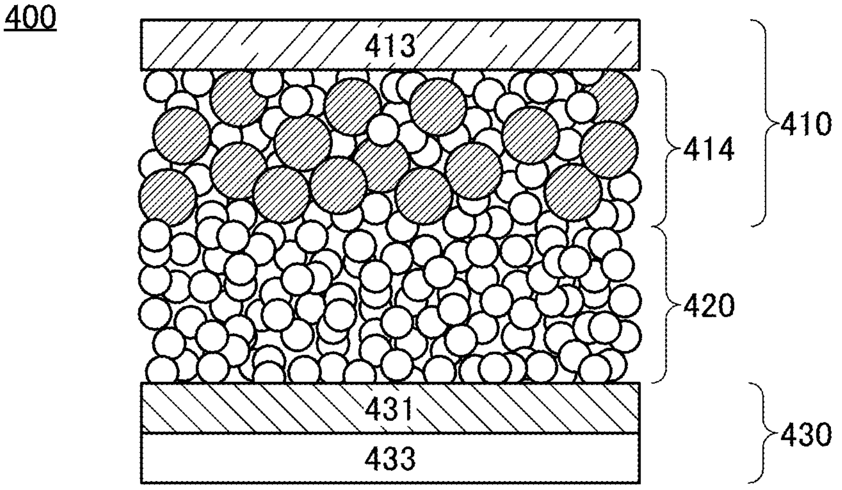

The negative electrode 430 includes a negative electrode current collector 433 and a negative electrode active material layer 434. The negative electrode active material layer 434 includes the negative electrode active material 431 and the solid electrolyte 421. The negative electrode active material layer 434 may also include a conductive additive and a binder. Note that when metal lithium is used for the negative electrode 430, it is possible that the negative electrode 430 does not include the solid electrolyte 421 as illustrated in FIG. 7B. The use of metal lithium for the negative electrode 430 is preferable because the energy density of the secondary battery 400 can be increased.

Figure 8A:
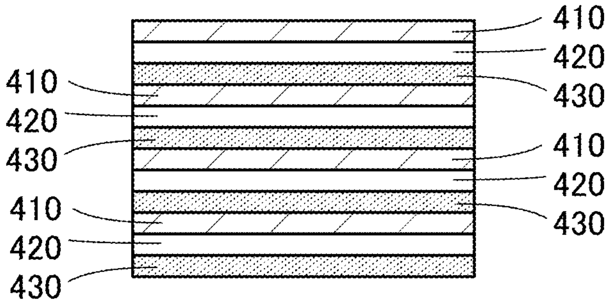
FIGS. 8A and 8B are cross-sectional views each illustrating an example of a secondary battery of one embodiment of the present invention.

As illustrated in FIG. 8A, the secondary battery may have a structure in which a combination of the positive electrode 410, the solid electrolyte layer 420, and the negative electrode 430 is repeatedly stacked. Stacking the positive electrodes 410, the solid electrolyte layers 420, and the negative electrodes 430 can increase the voltage of the secondary battery. FIG. 8A is a schematic diagram illustrating a structure in which four layers of the combination of the positive electrode 410, the solid electrolyte layer 420, and the negative electrode 430 are stacked.

Figure 8B:
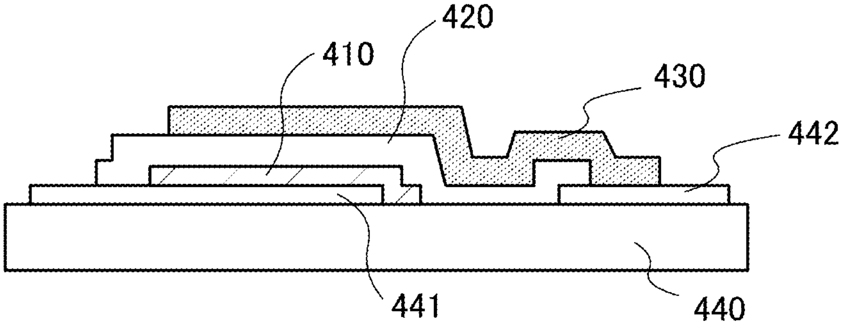

The secondary battery 400 of one embodiment of the present invention may be a thin-film all-solid-state battery. A thin-film all-solid-state battery can be formed by depositing a positive electrode, a solid electrolyte, a negative electrode, a wiring electrode, and the like by a vapor phase method (e.g., a vacuum deposition method, a pulsed laser deposition method, an aerosol deposition method, or a sputtering method). For example, as illustrated in FIG. 8B, after a wiring electrode 441 and a wiring electrode 442 are formed over a substrate 440, the positive electrode 410 is formed over the wiring electrode 441, the solid electrolyte layer 420 is formed over the positive electrode 410, and the negative electrode 430 is formed over the solid electrolyte layer 420 and the wiring electrode 442, whereby the secondary battery 400 can be fabricated. As the substrate 440, a ceramic substrate, a glass substrate, a plastic substrate, a metal substrate, or the like can be used.

As the solid electrolyte 421 included in the solid electrolyte layer 420, a sulfide-based solid electrolyte, an oxide-based solid electrolyte, or a halide-based solid electrolyte can be used, for example.

Examples of the sulfide-based solid electrolyte include a thio-silicon-based material (e.g., $Li_{10}GeP_2S_{12}$ and $Li_{3.25}Ge_{0.25}P_{0.75}S_4$), sulfide glass (e.g., $70Li_2S{\cdot}30P_2S_5$, $30Li_2S{\cdot}26B_2S_3.44LiI$, $63Li_2S{\cdot}38SiS_2{\cdot}1Li_3PO_4$, $57Li_2S{\cdot}38SiS_2{\cdot}5Li_4SiO_4$, and $50Li_2S{\cdot}50GeS_2$), and sulfide-based crystallized glass (e.g., $Li_7P_3S_{11}$ and $Li_{3.25}P_{0.95}S_4$). The sulfide-based solid electrolyte has advantages such as high conductivity of some materials, low-temperature synthesis, and ease of maintaining a path for electrical conduction after charge and discharge because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1+x}Al_xTi_{2-x}(PO_4)_3$), a material with a garnet crystal structure (e.g., $Li_7La_3Zr_2O_{12}$), a material with a LISICON crystal structure (e.g., $Li_{14}ZnGe_4O_{16}$), LLZO ($Li_7La_3Zr_2O_{12}$), oxide glass (e.g., $Li_3PO_4$—$Li_4SiO_4$ and $50Li_4SiO_4.50Li_3BO_3$), and oxide-based crystallized glass (e.g., $Li_{1.07}Al_{0.69}Ti_{1.46}(PO_4)_3$ and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum oxide or porous silica are filled with such a halide-based solid electrolyte can be used as the solid electrolyte.

Alternatively, different solid electrolytes may be mixed and used.

In particular, $Li_{1+x}Al_xTi_{2-x}(PO_4)_3$ (0<x<1) having a NASICON crystal structure (hereinafter LATP) is preferable because LATP contains aluminum and titanium, each of which is the element the positive electrode active material used in the secondary battery 400 of one embodiment of the present invention is allowed to contain, and thus a synergistic effect of improving the cycle performance is expected. Moreover, higher productivity due to the reduction in the number of steps is expected. Note that in this specification and the like, a material having a NASICON crystal structure refers to a compound that is represented by $M_2(XO_4)_3$ (M: transition metal; X: S, P, As, Mo, W, or the like) and has a structure in which $MO_6$ octahedra and $XO_4$ tetrahedra that share common corners are arranged three-dimensionally.

[Exterior Body and Shape of Secondary Battery]

An exterior body of the secondary battery 400 of one embodiment of the present invention can be formed using a variety of materials and have a variety of shapes, and preferably has a function of applying pressure to the positive electrode, the solid electrolyte layer, and the negative electrode.

Figure 9A:
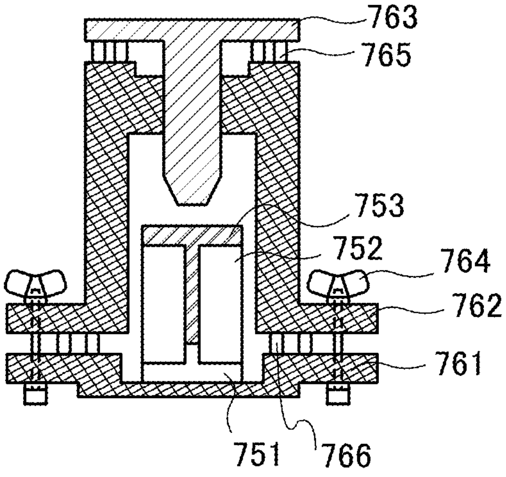
FIGS. 9A and 9B illustrate an example of manufacturing a secondary battery of one embodiment of the present invention.
Figure 9B:
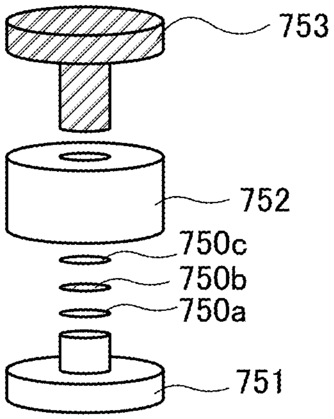
Figure 9C:
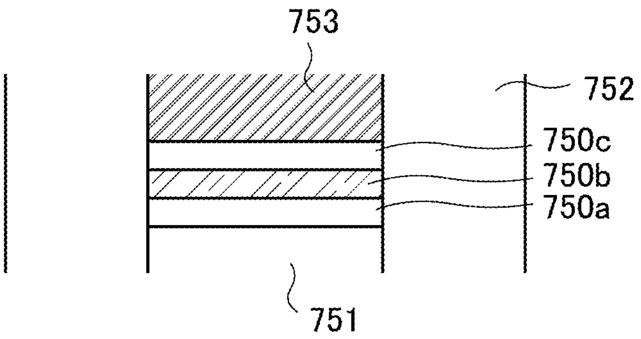
FIG. 9C is an enlarged cross-sectional view of the secondary battery.

FIGS. 9A to 9C show an example of a cell for evaluating materials of an all-solid-state battery.

FIG. 9A is a schematic cross-sectional view of the evaluation cell. The evaluation cell includes a lower component 761, an upper component 762, and a fixation screw and a butterfly nut 764 for fixing these components. By rotating a pressure screw 763, an electrode plate 753 is pressed to fix an evaluation material. An insulator 766 is provided between the lower component 761 and the upper component 762 that are made of a stainless steel material. An 0 ring 765 for hermetic sealing is provided between the upper component 762 and the pressure screw 763.

The evaluation material is placed on an electrode plate 751, surrounded by an insulating tube 752, and pressed from above by the electrode plate 753. FIG. 9B is an enlarged perspective view of the evaluation material and its vicinity.

A stack of a positive electrode 750*a*, a solid electrolyte layer 750*b*, and a negative electrode 750*c* is shown here as an example of the evaluation material, and its cross section is shown in FIG. 9C. Note that the same portions in FIGS. 9A to 9C are denoted by the same reference numerals.

The electrode plate 751 and the lower component 761 that are electrically connected to the positive electrode 750*a* correspond to a positive electrode terminal. The electrode plate 753 and the upper component 762 that are electrically connected to the negative electrode 750*c* correspond to a negative electrode terminal. The electric resistance or the like can be measured while pressure is applied to the evaluation material through the electrode plate 751 and the electrode plate 753.

The exterior body of the secondary battery of one embodiment of the present invention is preferably a package having excellent airtightness. For example, a ceramic package or a resin package can be used. When the exterior body is sealed, the air is preferably blocked in a closed atmosphere, for example, in a glove box.

Figure 10A:
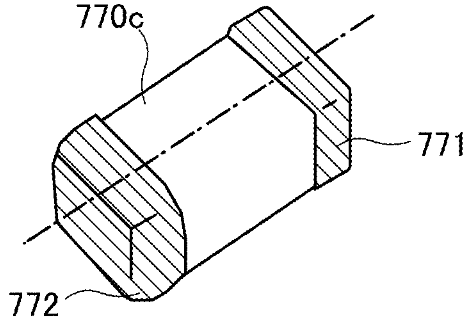
FIGS. 10A and 10B are a perspective view and a cross-sectional view illustrating an example of a secondary battery of one embodiment of the present invention.

FIG. 10A is a perspective view of a secondary battery of one embodiment of the present invention that has an exterior body and a shape different from those in FIGS. 9A to 9C. The secondary battery in FIG. 10A includes external electrodes 771 and 772 and is sealed with an exterior body including a plurality of package components.

Figure 10B:
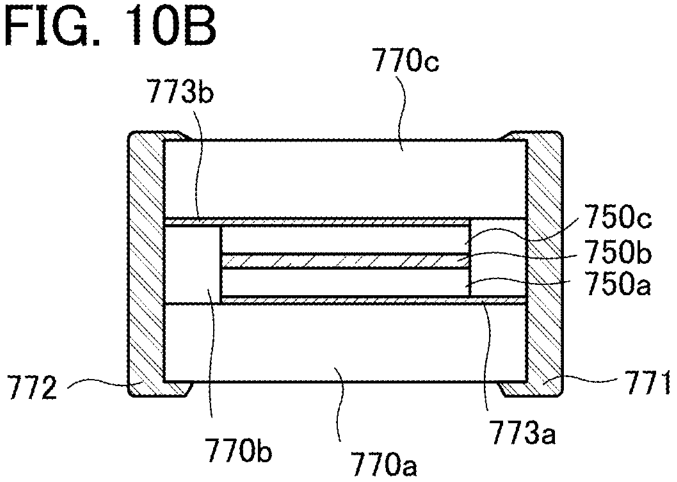

FIG. 10B illustrates an example of a cross section along the dashed-dotted line in FIG. 10A. A stack including the positive electrode 750*a*, the solid electrolyte layer 750*b*, and the negative electrode 750*c* is surrounded and sealed by a package component 770*a* including an electrode layer 773*a* on a flat plate, a frame-like package component 770*b*, and a package component 770*c* including an electrode layer 773*b* on a flat plate. For the package components 770*a*, 770*b*, and 770*c*, an insulating material such as a resin material or ceramic can be used.

The external electrode 771 is electrically connected to the positive electrode 750*a* through the electrode layer 773*a* and functions as a positive electrode terminal. The external electrode 772 is electrically connected to the negative electrode 750*c* through the electrode layer 773*b* and functions as a negative electrode terminal.

This embodiment can be implemented in appropriate combination with any of the other embodiments.

Embodiment 5

In this embodiment, examples of the shape of a secondary battery containing the positive electrode active material 100 described in the above embodiment will be described. For the materials used for the secondary battery described in this embodiment, refer to the description of the above embodiment.

[Coin-Type Secondary Battery]

Figure 11A:
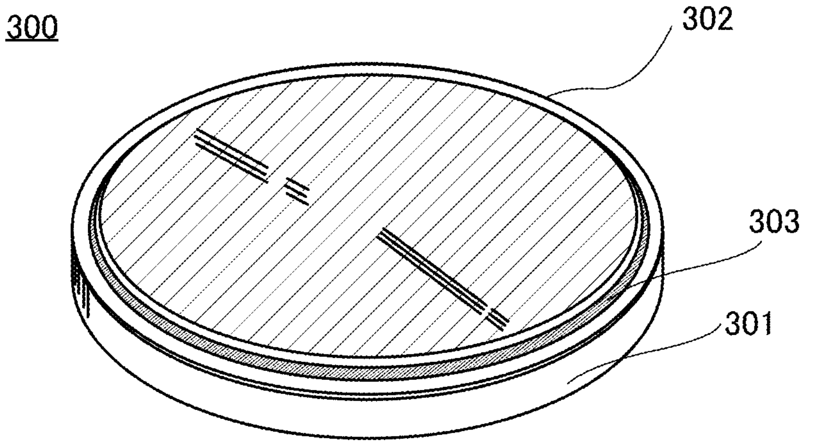
FIGS. 11A and 11B illustrate a coin-type secondary battery.
Figure 11B:
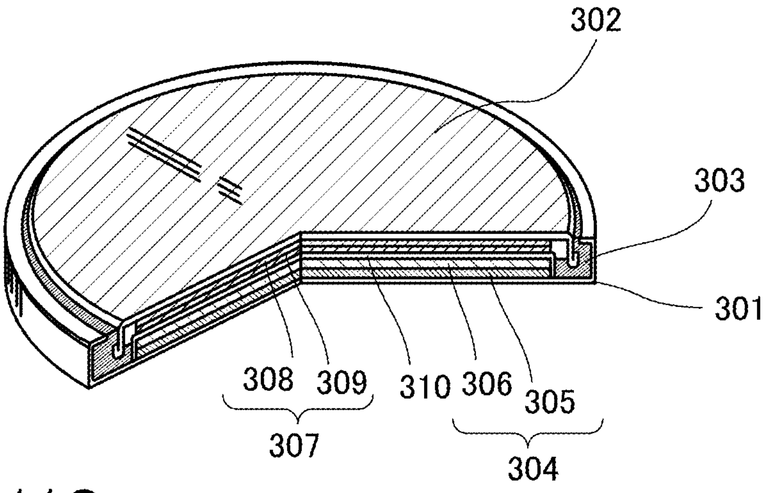

First, an example of a coin-type secondary battery is described. FIG. 11A is an external view of a coin-type (single-layer flat-type) secondary battery, and FIG. 11B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. The positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are immersed in the electrolyte solution. Then, as illustrated in FIG. 11B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In this manner, the coin-type secondary battery 300 is manufactured.

When the positive electrode active material described in the above embodiment is used in the positive electrode 304, the coin-type secondary battery 300 can have high capacity and excellent cycling performance.

Here, a current flow in charging a secondary battery is described with reference to FIG. 11C. When a secondary battery using lithium is regarded as a closed circuit, lithium ions transfer and a current flows in the same direction. Note that in the secondary battery using lithium, an anode and a cathode change places in charging and discharging, and an oxidation reaction and a reduction reaction occur on the corresponding sides; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charging is performed, discharging is performed, a reverse pulse current is supplied, and a charge current is supplied. The use of the terms "anode" and "cathode", which are related to an oxidation reaction and a reduction reaction, might cause confusion because the anode and the cathode change places at the time of charging and discharging. Therefore, the terms "anode" and "cathode" are not used in this specification. If the term "anode" or "cathode" is used, whether it is at the time of charging or discharging is noted, as well as whether the term corresponds to a positive (plus) electrode or a negative (minus) electrode.

Figure 11C:
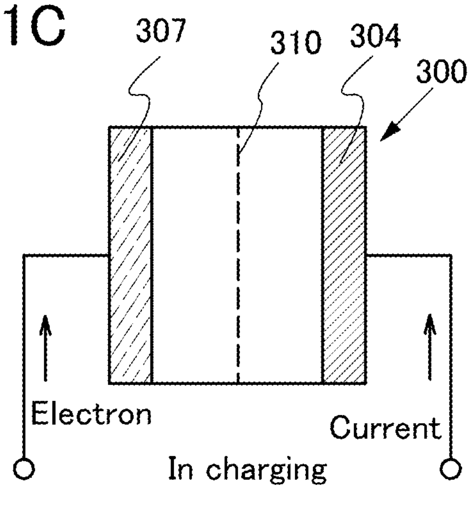
FIG. 11C illustrates a cross section of the battery in charging.

A charger is connected to the two terminals in FIG. 11C, and the secondary battery 300 is charged. As the charging of the secondary battery 300 proceeds, a potential difference between the electrodes increases.

[Cylindrical Secondary Battery]

Figure 12A:
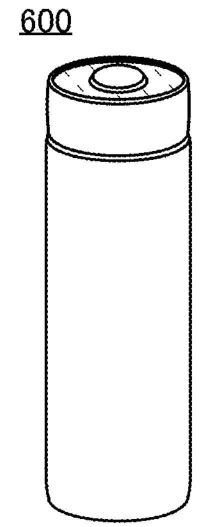
FIGS. 12A to 12C are perspective views illustrating a cylindrical secondary battery.
Figure 12B:
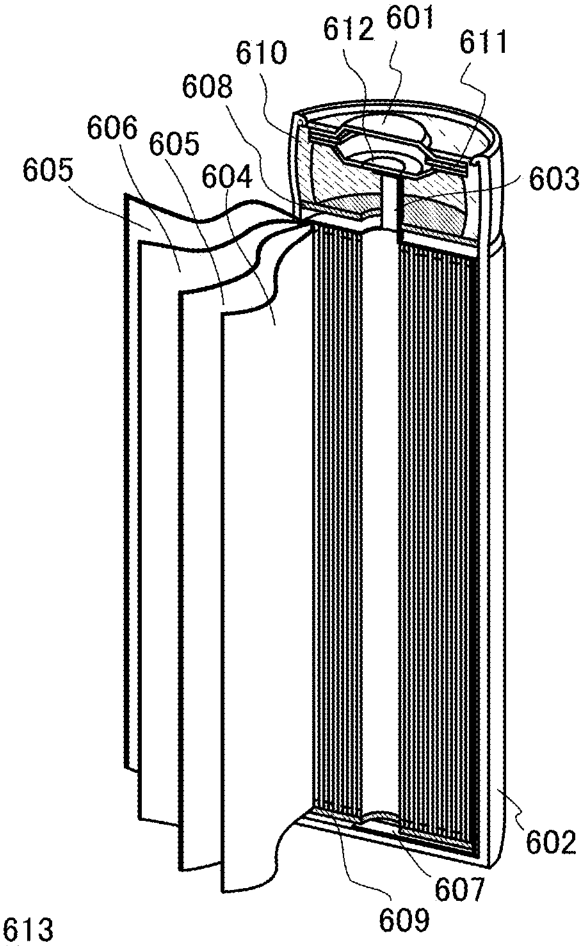

Next, an example of a cylindrical secondary battery is described with reference to FIGS. 12A to 12D. FIG. 12A is an external view of a cylindrical secondary battery 600. FIG. 12B is a schematic cross-sectional view of the cylindrical secondary battery 600. As illustrated in FIG. 12B, the cylindrical secondary battery 600 includes a positive electrode cap (battery lid) 601 on the top surface and a battery can (outer can) 602 on the side and bottom surfaces. The positive electrode cap 601 and the battery can (outer can) 602 are insulated from each other by a gasket (insulating gasket) 610.

Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. The battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, the inside of the battery can 602 provided with the battery element is filled with a nonaqueous electrolyte solution (not illustrated). As the nonaqueous electrolyte solution, an electrolyte solution similar to that for the coin-type secondary battery can be used.

Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which is a thermally sensitive resistor whose resistance increases as temperature rises, limits the amount of current by increasing the resistance, in order to prevent abnormal heat generation. Barium titanate ($BaTiO_3$)-based semiconductor ceramic or the like can be used for the PTC element.

Figure 12C:
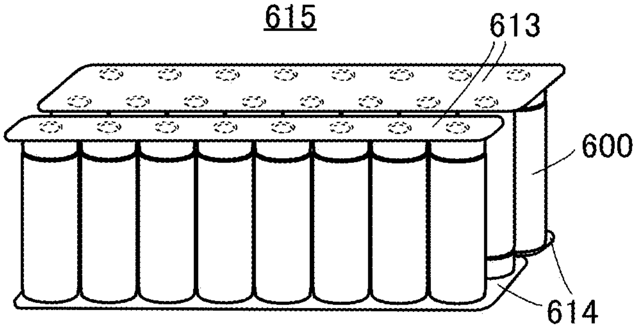

As illustrated in FIG. 12C, a plurality of secondary batteries 600 may be sandwiched between a conductive plate 613 and a conductive plate 614 to form a module 615. The plurality of secondary batteries 600 may be connected in parallel, connected in series, or connected in series after being connected in parallel. With the module 615 including the plurality of secondary batteries 600, large electric power can be extracted.

Figure 12D:
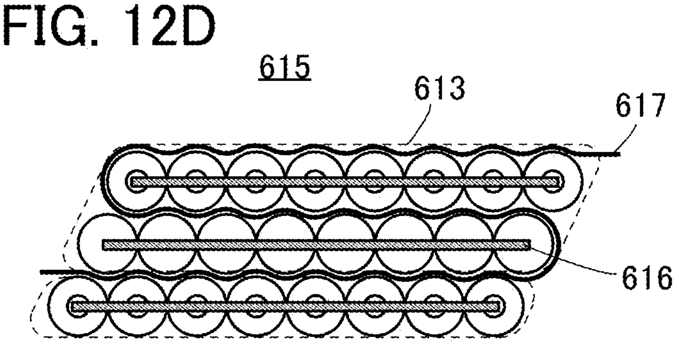
FIG. 12D is a top view of the cylindrical secondary battery.

FIG. 12D is a top view of the module 615. The conductive plate 613 is shown by a dotted line for clarity of the drawing. As illustrated in FIG. 12D, the module 615 may include a conductive wire 616 that electrically connects the plurality of secondary batteries 600 to each other.

The conductive plate can be provided over the conductive wire 616 to overlap each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

When the positive electrode active material described in the above embodiment is used in the positive electrode 604, the cylindrical secondary battery 600 can have high capacity and excellent cycling performance.

[Structure Examples of Secondary Battery]

Other structure examples of secondary batteries will be described with reference to FIGS. 13A and 13B, FIGS. 14A1, 14A2, 14B1, and 14B2, FIGS. 15A and 15B, and FIG. 16.

Figure 13A:
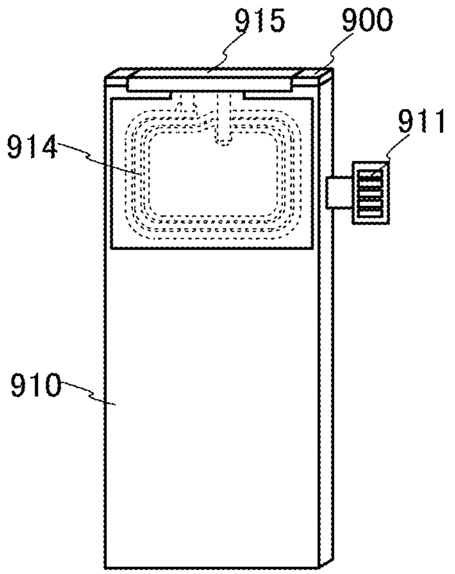
FIGS. 13A and 13B illustrate an example of a secondary battery.
Figure 13B:
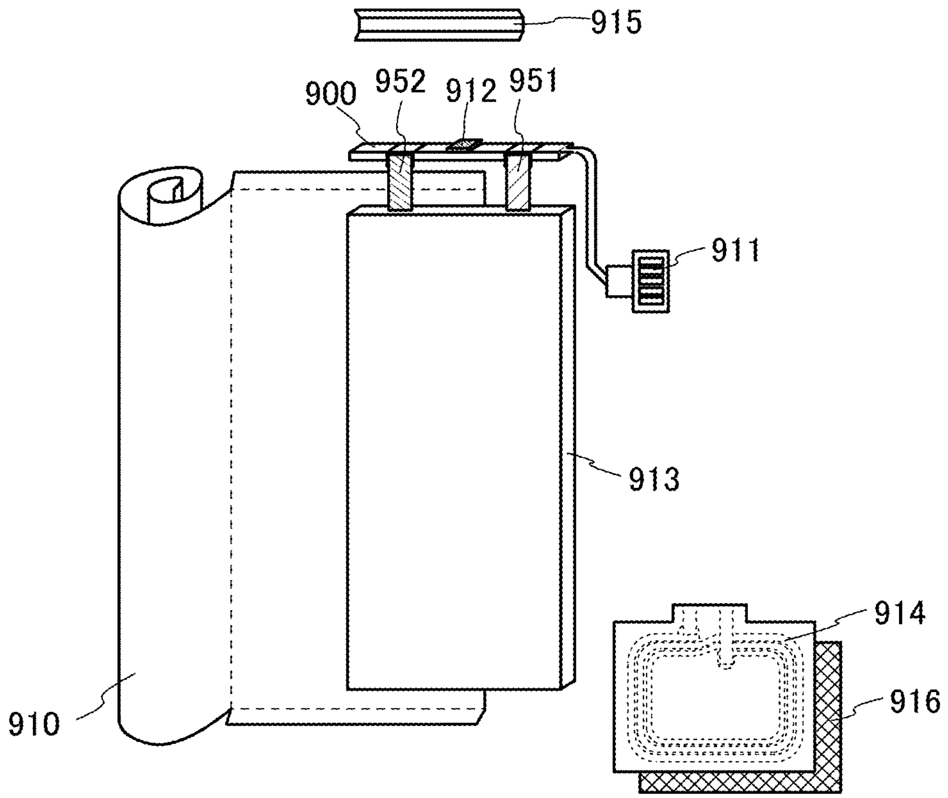

FIGS. 13A and 13B are external views of a secondary battery. A secondary battery 913 is connected to an antenna 914 and an antenna 915 through a circuit board 900. A label 910 is attached to the secondary battery 913. In addition, as illustrated in FIG. 13B, the secondary battery 913 is connected to a terminal 951 and a terminal 952.

The circuit board 900 includes a terminal 911 and a circuit 912. The terminal 911 is connected to the terminals 951 and 952, the antennas 914 and 915, and the circuit 912. Note that a plurality of terminals 911 may be provided to serve separately as a control signal input terminal, a power supply terminal, and the like.

The circuit 912 may be provided on the rear surface of the circuit board 900. Note that the shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, a dielectric antenna, or the like may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This increases the amount of electric power received by the antenna 914.

A layer 916 is provided between the secondary battery 913 and the antennas 914 and 915. The layer 916 has a function of blocking an electromagnetic field from the secondary battery 913, for example. As the layer 916, for example, a magnetic body can be used.

Note that the structure of the secondary battery is not limited to that shown in FIGS. 13A and 13B.

For example, as shown in FIGS. 14A1 and 14A2, two opposite surfaces of the secondary battery 913 in FIGS. 13A and 13B may be provided with respective antennas. FIG. 14A1 is an external view illustrating one of the two surfaces, and FIG. 14A2 is an external view illustrating the other of the two surfaces. For portions identical to those in FIGS. 13A and 13B, the description of the secondary battery illustrated in FIGS. 13A and 13B can be referred to as appropriate.

As illustrated in FIG. 14A1, the antenna 914 is provided on one of the opposite surfaces of the secondary battery 913 with the layer 916 located therebetween. As illustrated in FIG. 14A2, an antenna 918 is provided on the other of the opposite surfaces of the secondary battery 913 with a layer 917 located therebetween. The layer 917 has a function of blocking an electromagnetic field from the secondary battery 913, for example. As the layer 917, for example, a magnetic body can be used.

With the above structure, both of the antennas 914 and 918 can be increased in size. The antenna 918 has a function of communicating data with an external device, for example. An antenna with a shape that can be used for the antenna 914, for example, can be used as the antenna 918. As a system for communication using the antenna 918 between the secondary battery and another device, a response method that can be used between the secondary battery and another device, such as near field communication (NFC), can be employed.

Alternatively, as illustrated in FIG. 14B1, the secondary battery 913 in FIGS. 13A and 13B may be provided with a display device 920. The display device 920 is electrically connected to the terminal 911. Note that the label 910 is not necessarily provided in a portion where the display device 920 is provided. For portions identical to those in FIGS. 13A and 13B, the description of the secondary battery illustrated in FIGS. 13A and 13B can be referred to as appropriate.

The display device 920 can display, for example, an image showing whether charging is being carried out, an image showing the amount of stored power, or the like. As the display device 920, electronic paper, a liquid crystal display device, or an electroluminescent (EL) display device can be used, for instance. For example, the use of electronic paper can reduce power consumption of the display device 920.

Alternatively, as illustrated in FIG. 14B2, the secondary battery 913 in FIGS. 13A and 13B may be provided with a sensor 921. The sensor 921 is electrically connected to the terminal 911 via a terminal 922. For portions identical to those in FIGS. 13A and 13B, the description of the secondary battery illustrated in FIGS. 13A and 13B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With the sensor 921, for example, data on an environment where the secondary battery is placed (e.g., temperature) can be acquired and stored in a memory inside the circuit 912.

Another structure example of the secondary battery 913 is described with reference to FIGS. 15A and 15B and FIG. 16.

Figure 15A:
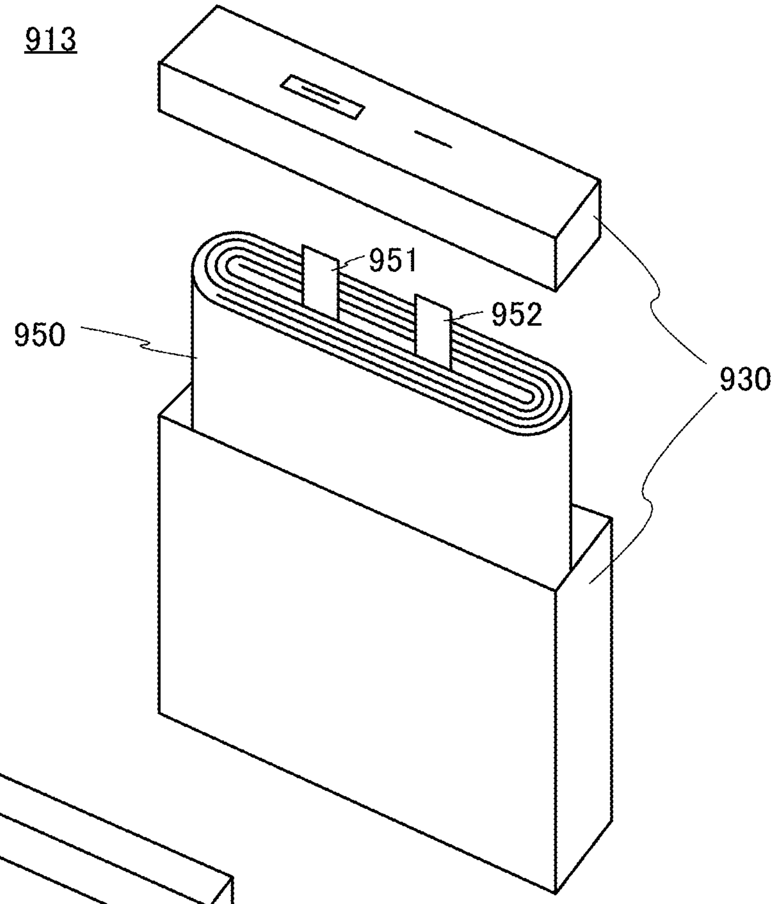
FIGS. 15A and 15B each illustrate an example of a secondary battery.

The secondary battery 913 illustrated in FIG. 15A includes a wound body 950 provided with the terminals 951 and 952 inside a housing 930. The wound body 950 is immersed in an electrolyte solution inside the housing 930. The terminal 952 is in contact with the housing 930. An insulator or the like inhibits contact between the terminal 951 and the housing 930. Note that in FIG. 15A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 15B:
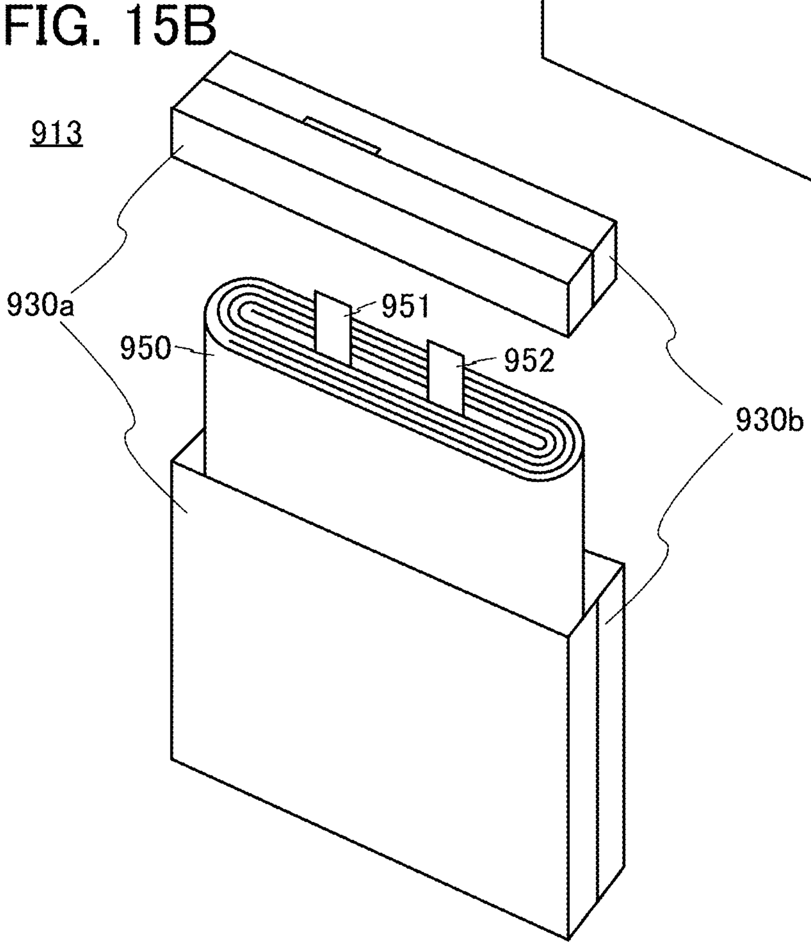

Note that as illustrated in FIG. 15B, the housing 930 in FIG. 15A may be formed using a plurality of materials. For example, in the secondary battery 913 in FIG. 15B, a housing 930*a* and a housing 930*b* are attached to each other, and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, blocking of an electric field by the secondary battery 913 can be inhibited. When an electric field is not significantly blocked by the housing 930*a*, an antenna such as the antennas 914 and 915 may be provided inside the housing 930*a*. For the housing 930*b*, a metal material can be used, for example.

Figure 16:
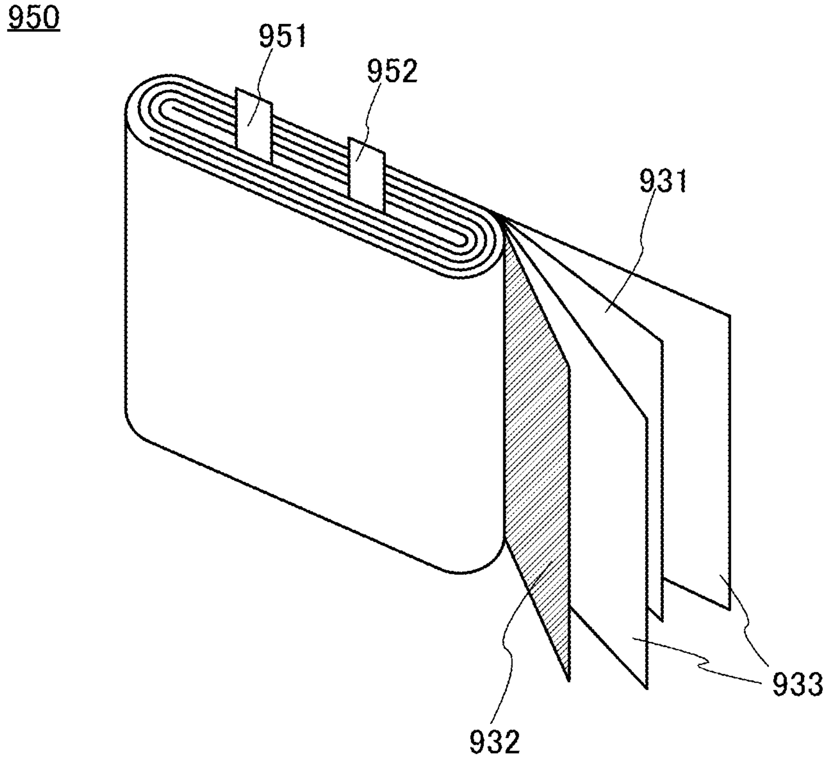
FIG. 16 illustrates an example of a secondary battery.

FIG. 16 illustrates the structure of the wound body 950. The wound body 950 includes a negative electrode 931, a positive electrode 932, and separators 933. The wound body 950 is obtained by winding a sheet of a stack in which the negative electrode 931 and the positive electrode 932 overlap with the separator 933 therebetween. Note that a plurality of stacks each including the negative electrode 931, the positive electrode 932, and the separators 933 may be overlaid.

The negative electrode 931 is connected to the terminal 911 in FIGS. 13A and 13B via one of the terminals 951 and 952. The positive electrode 932 is connected to the terminal 911 in FIGS. 13A and 13B via the other of the terminals 951 and 952.

When the positive electrode active material described in the above embodiment is used in the positive electrode 932, the secondary battery 913 can have high capacity and excellent cycling performance.

[Laminated Secondary Battery]

Next, examples of a laminated secondary battery will be described with reference to FIGS. 17A to 17C, FIGS. 18A and 18B, FIG. 19, FIG. 20, FIGS. 21A to 21C, FIGS. 22A, 22B1, 22B2, 22C, and 22D, FIGS. 23A and 23B, and FIGS. 24A and 24B. When a laminated secondary battery has flexibility and is used in an electronic device at least part of which is flexible, the secondary battery can be bent accordingly as the electronic device is bent.

A laminated secondary battery 980 is described with reference to FIGS. 17A to 17C. The laminated secondary battery 980 includes a wound body 993 illustrated in FIG. 17A. The wound body 993 includes a negative electrode 994, a positive electrode 995, and separators 996. The wound body 993 is, like the wound body 950 illustrated in FIG. 16, obtained by winding a sheet of a stack in which the negative electrode 994 and the positive electrode 995 overlap with the separator 996 therebetween.

Note that the number of stacks each including the negative electrode 994, the positive electrode 995, and the separator 996 can be determined as appropriate depending on required capacity and element volume. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 17A:
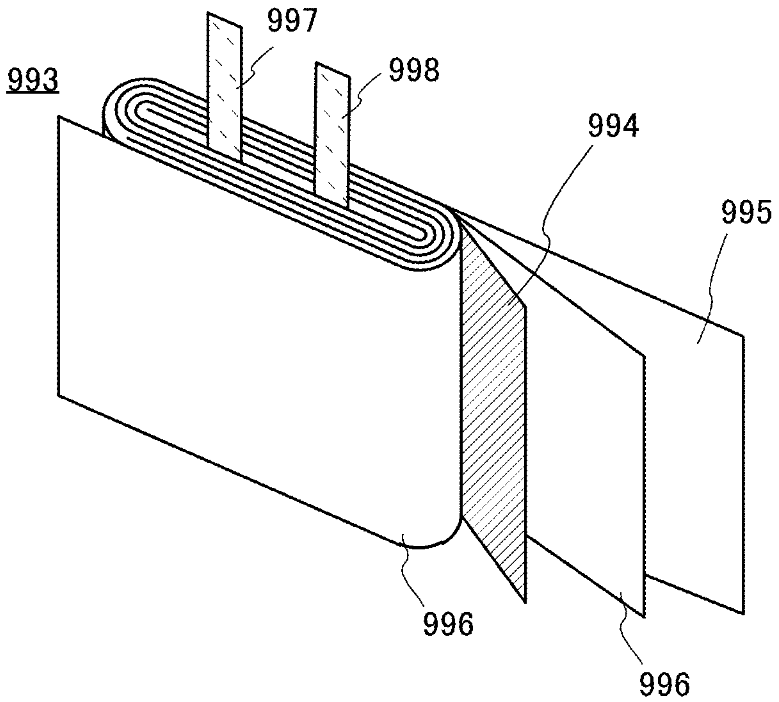
FIGS. 17A to 17C are perspective views illustrating a laminated secondary battery.
Figure 17B:
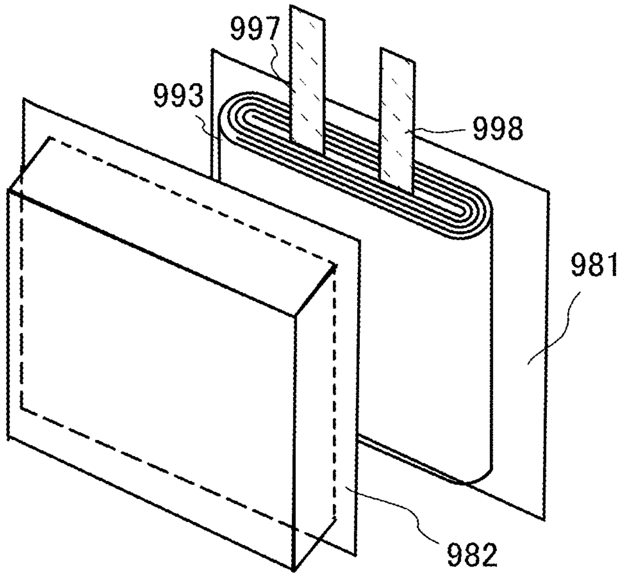
Figure 17C:
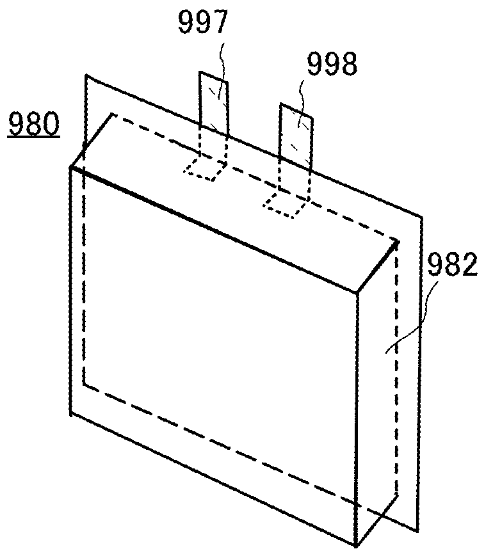

As illustrated in FIG. 17B, the wound body 993 is packed in a space formed by bonding a film 981 and a film 982 having a depressed portion by thermocompression bonding or the like, whereby the secondary battery 980 can be formed as illustrated in FIG. 17C. Note that the film 981 and the film 982 serve as an exterior body. The wound body 993 includes the lead electrode 997 and the lead electrode 998, and is immersed in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be manufactured.

Although FIGS. 17B and 17C illustrate an example where a space is formed by the two films, the wound body 993 may be placed in a space formed by bending one film.

When the positive electrode active material described in the above embodiment is used in the positive electrode 995, the secondary battery 980 can have high capacity and excellent cycling performance.

Figure 18A:
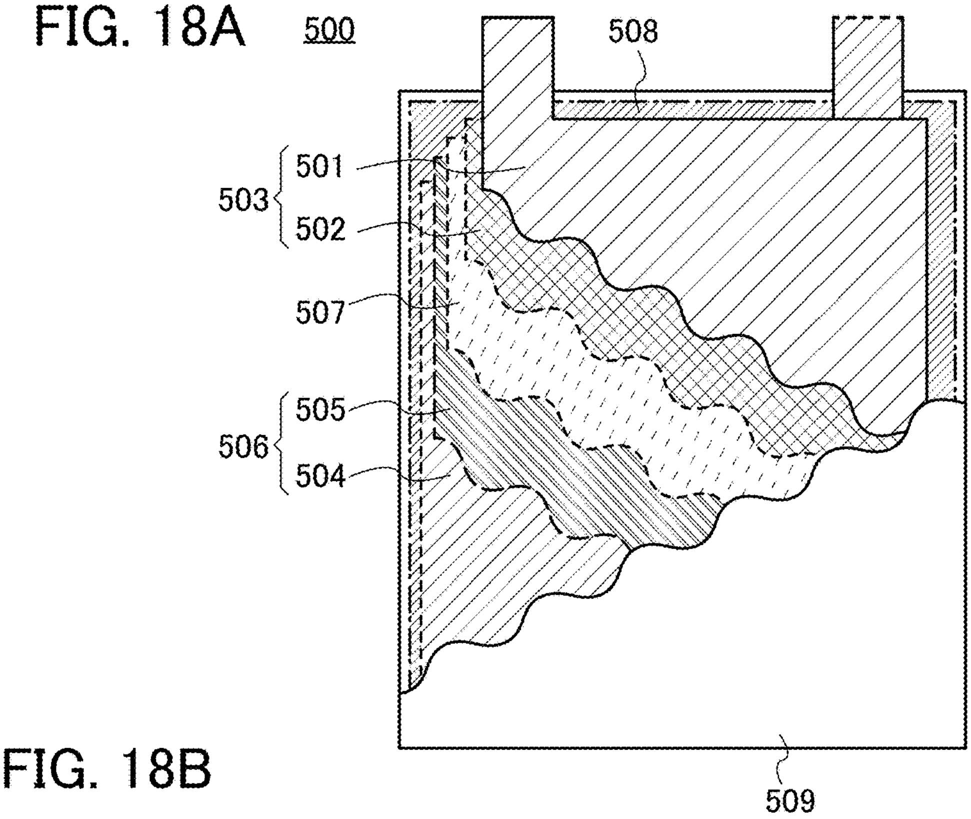
FIGS. 18A and 18B are a top view and a cross-sectional view illustrating a laminated secondary battery.
Figure 18B:
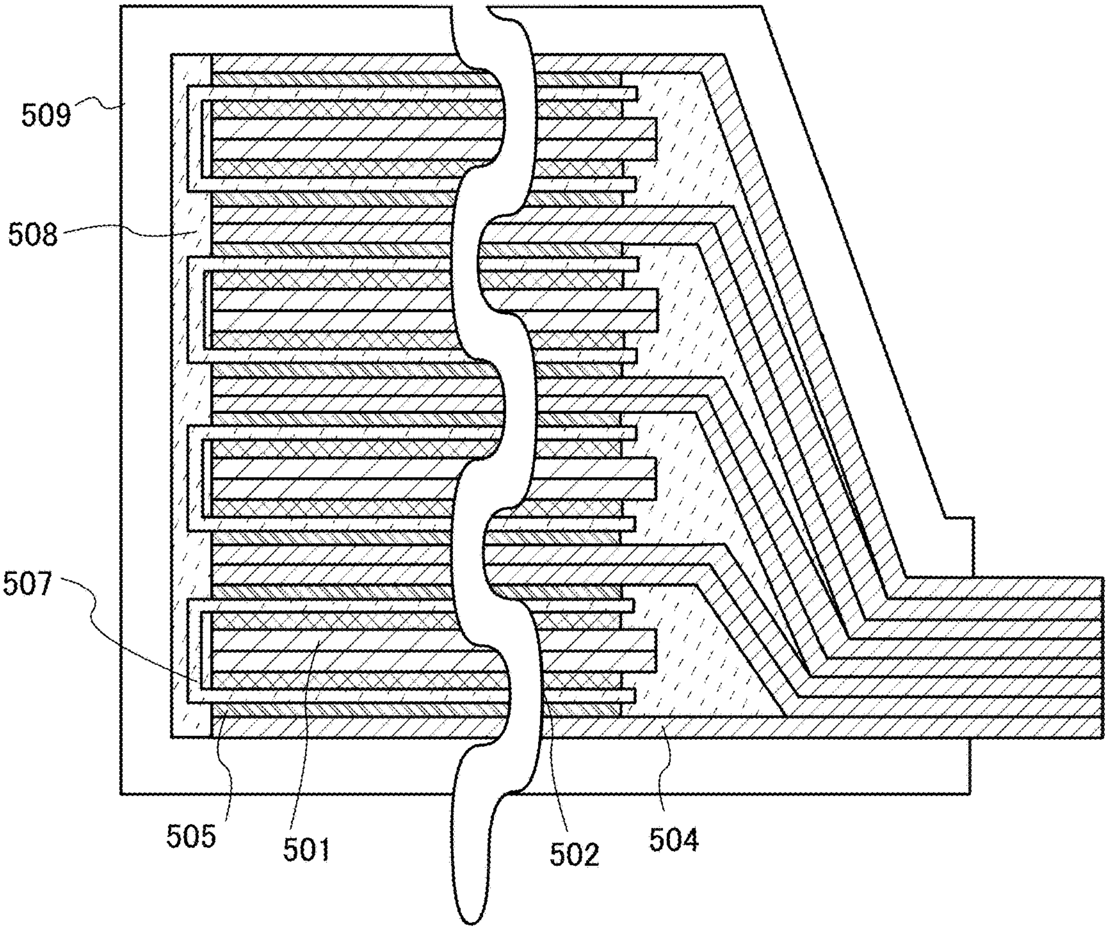

FIGS. 17A to 17C shows an example of the secondary battery 980 including a wound body in a space formed by films serving as an exterior body; alternatively, as illustrated in FIGS. 18A and 18B, a secondary battery may include a plurality of strip-shaped positive electrodes, a plurality of strip-shaped separators, and a plurality of strip-shaped negative electrodes in a space formed by films serving as an exterior body, for example.

A laminated secondary battery 500 illustrated in FIG. 18A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The inside of the exterior body 509 is filled with the electrolyte solution 508. The electrolyte solution described in Embodiment 2 can be used as the electrolyte solution 508.

In the laminated secondary battery 500 illustrated in FIG. 18A, the positive electrode current collector 501 and the negative electrode current collector 504 also serve as terminals for obtaining electrical contact with the outside. For this reason, the positive electrode current collector 501 and the negative electrode current collector 504 may be arranged to be partly exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 in the laminated secondary battery 500, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body can be used, for example.

FIG. 18B illustrates an example of a cross-sectional structure of the laminated secondary battery 500. Although FIG. 18A illustrates an example in which two current collectors are included for simplicity, an actual battery includes a plurality of electrode layers as illustrated in FIG. 18B.

The example in FIG. 18B includes 16 electrode layers. The laminated secondary battery 500 has flexibility even though including 16 electrode layers. FIG. 18B illustrates a structure including eight layers of negative electrode current collectors 504 and eight layers of positive electrode current collectors 501, i.e., 16 layers in total. Note that FIG. 18B illustrates a cross section of the lead portion of the negative electrode, and the eight negative electrode current collectors 504 are bonded to each other by ultrasonic welding. It is needless to say that the number of electrode layers is not limited to 16 and may be more than 16 or less than 16. With a large number of electrode layers, the secondary battery can have high capacity. By contrast, with a small number of electrode layers, the secondary battery can have small thickness and high flexibility.

Figure 19:
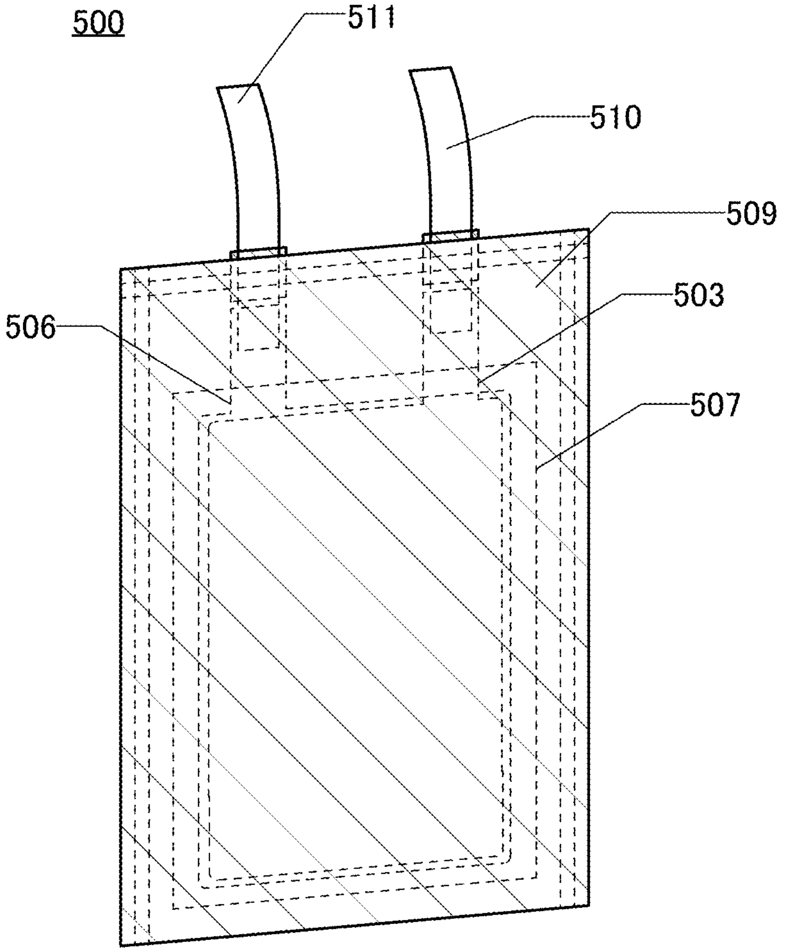
FIG. 19 is an external view of a secondary battery.
Figure 20:
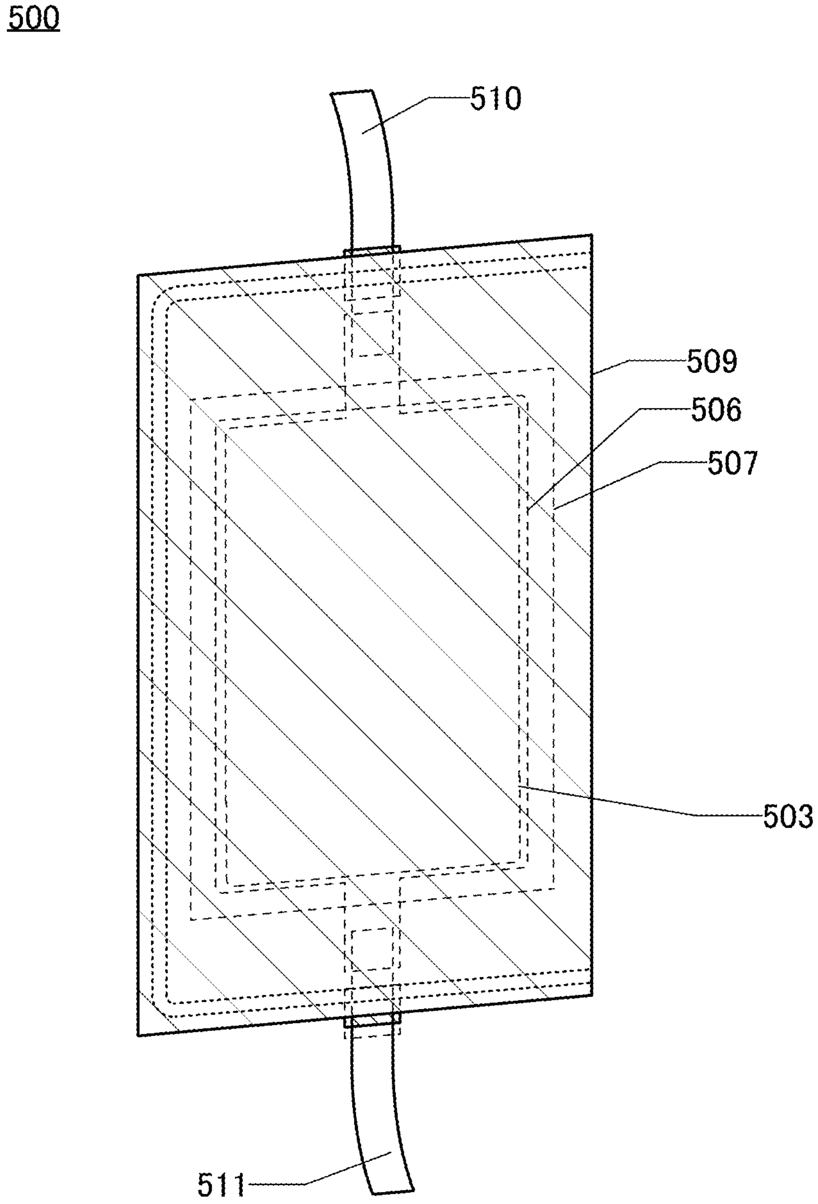
FIG. 20 is an external view of a secondary battery.

FIG. 19 and FIG. 20 illustrate examples of an external view of the laminated secondary battery 500. FIG. 19 and FIG. 20 illustrate the positive electrode 503, the negative electrode 506, the separator 507, the exterior body 509, a positive electrode lead electrode 510, and a negative electrode lead electrode 511.

Figure 21A:
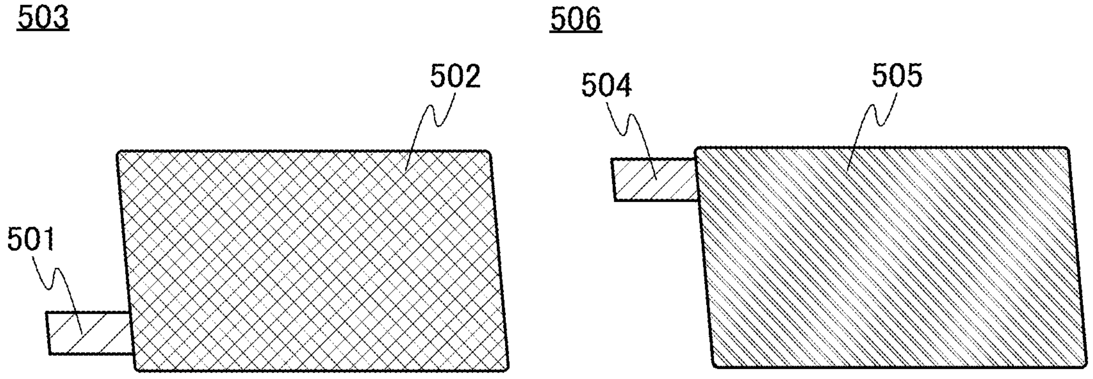
FIGS. 21A to 21C illustrate a method for manufacturing a secondary battery.

FIG. 21A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those in the example illustrated in FIG. 21A.

[Method for Manufacturing Laminated Secondary Battery]

Figure 21B:
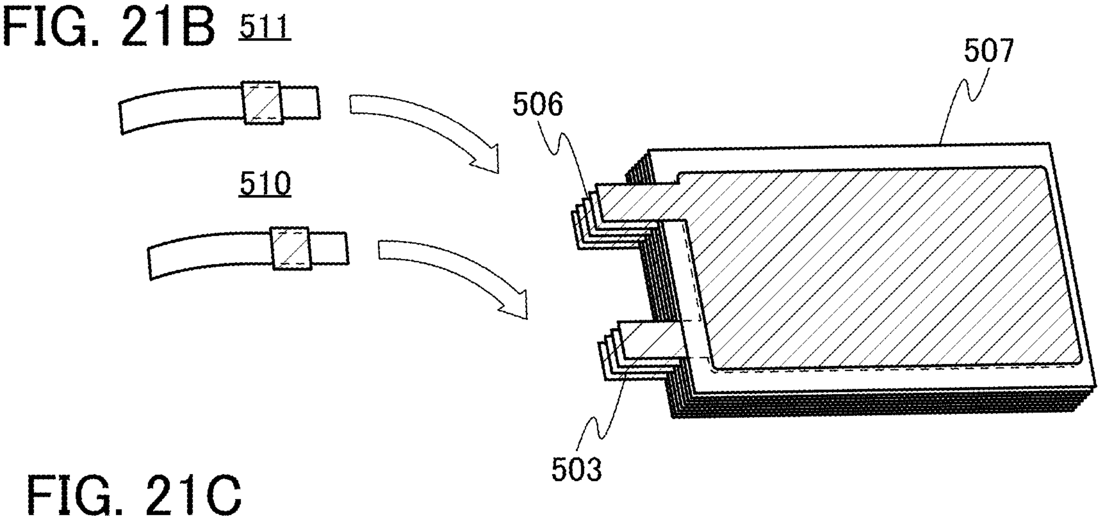

Here, an example of a method for manufacturing the laminated secondary battery whose external view is illustrated in FIG. 19 will be described with reference to FIGS. 21B and 21C.

First, the negative electrode 506, the separator 507, and the positive electrode 503 are stacked. FIG. 21B illustrates the stacked negative electrodes 506, separators 507, and positive electrodes 503. The secondary battery described here as an example includes five negative electrodes and four positive electrodes. Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the tab region of the negative electrode on the outermost surface and the negative electrode lead electrode 511 are bonded to each other.

Then, the negative electrodes 506, the separators 507, and the positive electrodes 503 are placed over the exterior body 509.

Figure 21C:
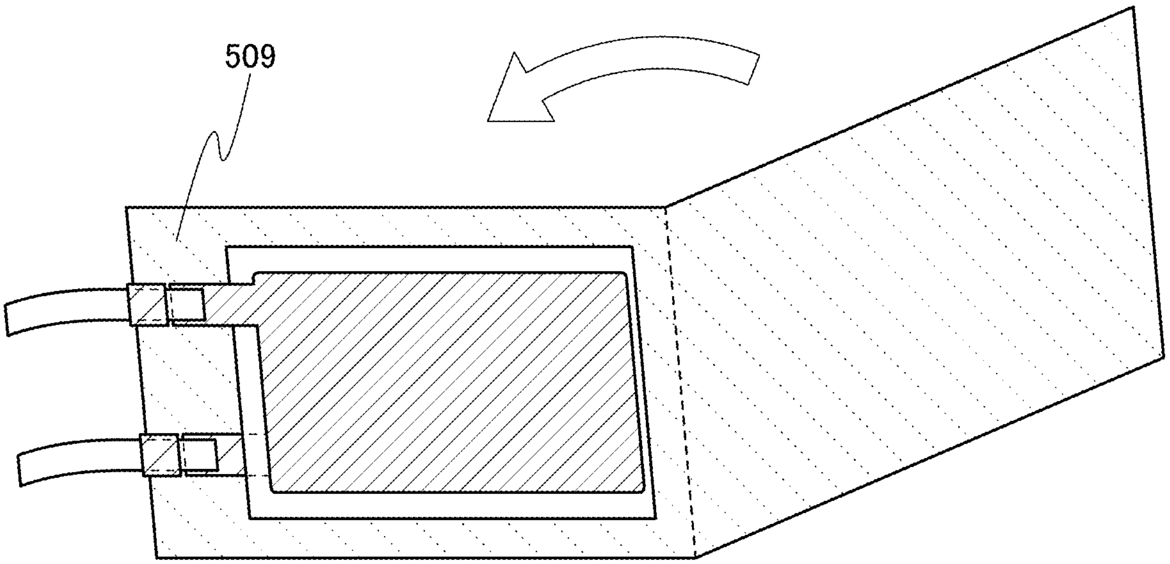

Subsequently, the exterior body 509 is folded along a dashed line as illustrated in FIG. 21C. Then, the outer edges of the exterior body 509 are bonded to each other. The bonding can be performed by thermocompression, for example. At this time, a part (or one side) of the exterior body 509 is left unbonded (to provide an inlet) so that the electrolyte solution 508 can be introduced later.

Next, the electrolyte solution 508 (not illustrated) is introduced into the exterior body 509 from the inlet of the exterior body 509. The electrolyte solution 508 is preferably introduced in a reduced pressure atmosphere or in an inert atmosphere. Lastly, the inlet is sealed by bonding. In this manner, the laminated secondary battery 500 can be manufactured.

When the positive electrode active material described in the above embodiment is used in the positive electrode 503, the secondary battery 500 can have high capacity and excellent cycling performance.

[Bendable Secondary Battery]

Next, an example of a bendable secondary battery is described with reference to FIGS. 22A, 22B1, 22B2, 22C and 22D and FIGS. 23A and 23B.

FIG. 22A is a schematic top view of a bendable secondary battery 250. FIGS. 22B1, 22B2, and 22C are schematic cross-sectional views taken along the cutting line C1-C2, cutting line C3-C4, and cutting line A1-A2, respectively, in FIG. 22A. The secondary battery 250 includes an exterior body 251, and a positive electrode 211*a* and a negative electrode 211*b* that are held in the exterior body 251. A lead 212*a* electrically connected to the positive electrode 211*a* and a lead 212*b* electrically connected to the negative electrode 211*b* are extended to the outside of the exterior body 251. In addition to the positive electrode 211*a* and the negative electrode 211*b*, an electrolyte solution (not illustrated) is enclosed in a region surrounded by the exterior body 251.

Figure 23A:
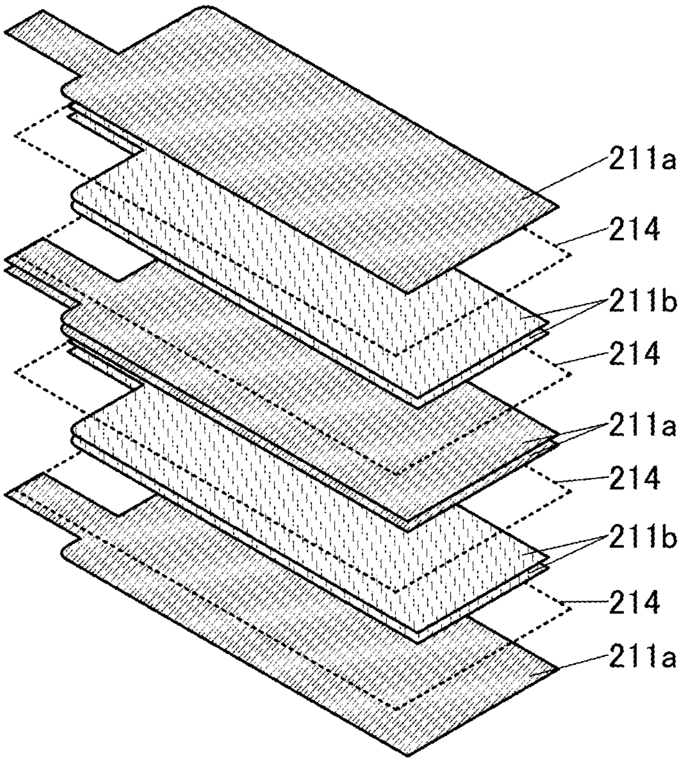
FIGS. 23A and 23B illustrate a bendable secondary battery.
Figure 23B:
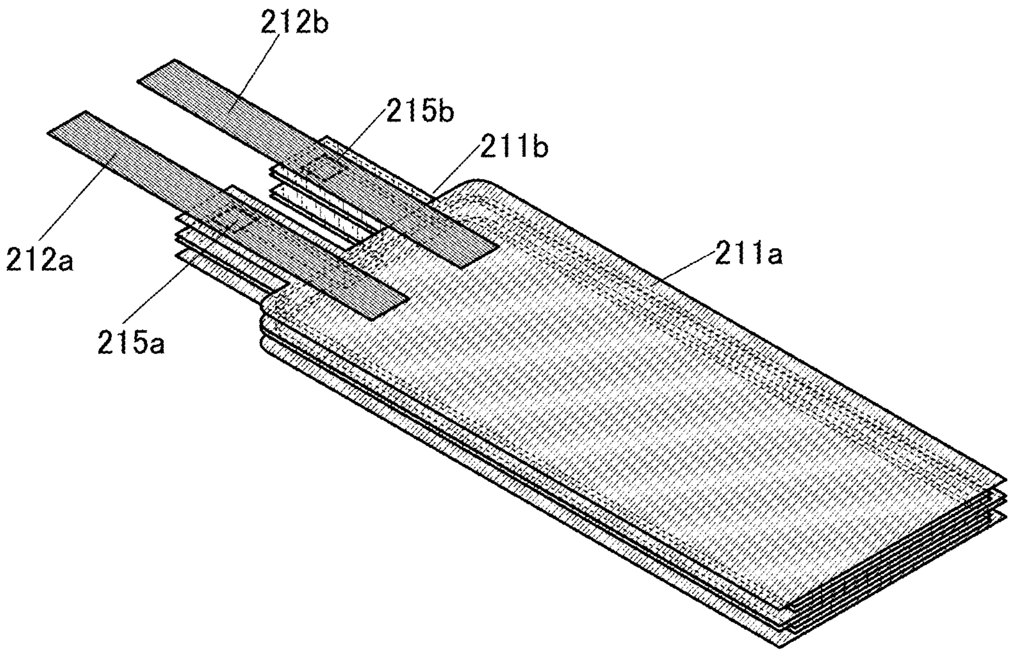

The positive electrode 211*a* and the negative electrode 211*b* included in the secondary battery 250 are described with reference to FIGS. 23A and 23B. FIG. 23A is a perspective view illustrating the stacking order of the positive electrodes 211*a*, the negative electrodes 211*b*, and a separators 214. FIG. 23B is a perspective view illustrating the lead 212*a* and the lead 212*b* in addition to the positive electrode 211*a* and the negative electrode 211*b*.

As illustrated in FIG. 23A, the secondary battery 250 includes a plurality of strip-shaped positive electrodes 211*a*, a plurality of strip-shaped negative electrodes 211*b*, and a plurality of separators 214. The positive electrode 211*a* and the negative electrode 211*b* each include a projected tab portion and a portion other than the tab portion. A positive electrode active material layer is formed on one surface of the positive electrode 211*a* other than the tab portion, and a negative electrode active material layer is formed on one surface of the negative electrode 211*b* other than the tab portion.

The positive electrodes 211*a* and the negative electrodes 211*b* are stacked so that surfaces of the positive electrodes 211*a* on each of which the positive electrode active material layer is not formed are in contact with each other and that surfaces of the negative electrodes 211*b* on each of which the negative electrode active material layer is not formed are in contact with each other.

Furthermore, the separator 214 is provided between the surface of the positive electrode 211*a* on which the positive electrode active material layer is formed and the surface of the negative electrode 211*b* on which the negative electrode active material layer is formed. In FIG. 23A, the separator 214 is shown by a dotted line for easy viewing.

As illustrated in FIG. 23B, the plurality of positive electrodes 211*a* are electrically connected to the lead 212*a* in a bonding portion 215*a*. The plurality of negative electrodes 211*b* are electrically connected to the lead 212*b* in a bonding portion 215*b*.

Next, the exterior body 251 is described with reference to FIGS. 22B1, 22B2, 22C, and 22D.

The exterior body 251 has a film-like shape and is folded in half with the positive electrodes 211*a* and the negative electrodes 211*b* between facing portions of the exterior body 251. The exterior body 251 includes a folded portion 261, a pair of seal portions 262, and a seal portion 263. The pair of seal portions 262 are provided with the positive electrodes 211*a* and the negative electrodes 211*b* positioned therebetween and thus can also be referred to as side seals. The seal portion 263 includes portions overlapping with the lead 212*a* and the lead 212*b* and can also be referred to as a top seal.

Part of the exterior body 251 that overlaps with the positive electrodes 211*a* and the negative electrodes 211*b* preferably has a wave shape in which crest lines 271 and trough lines 272 are alternately arranged. The seal portions 262 and the seal portion 263 of the exterior body 251 are preferably flat.

FIG. 22B1 shows a cross section cut along the part overlapping with the crest line 271. FIG. 22B2 shows a cross section cut along the part overlapping with the trough line 272. FIGS. 22B1 and 22B2 correspond to cross sections of the secondary battery 250, the positive electrodes 211*a*, and the negative electrodes 211*b* in the width direction.

Here, the distance between end portions of the positive electrode 211*a* and the negative electrode 211*b* in the width direction and the seal portion 262, that is, the distance between the end portions of the positive electrode 211*a* and the negative electrode 211*b* and the seal portion 262 is referred to as a distance La. When the secondary battery 250 changes in shape, for example, when the secondary battery 250 is bent, the positive electrode 211*a* and the negative electrode 211*b* change in shape such that their positions are shifted from each other in the length direction as described later. At this time, if the distance La is too short, the exterior body 251 is rubbed hard against the positive electrode 211*a* and the negative electrode 211*b*, so that the exterior body 251 is damaged in some cases. In particular, when a metal film of the exterior body 251 is exposed, the metal film might be corroded by the electrolyte solution. Therefore, the distance La is preferably set as long as possible. However, if the distance La is too long, the volume of the secondary battery 250 increases.

The distance La between the positive and negative electrodes 211*a* and 211*b* and the seal portion 262 is preferably increased as the total thickness of the stacked positive electrodes 211*a* and negative electrodes 211*b* is larger.

Specifically, when the total thickness of the stacked positive electrodes 211*a*, negative electrodes 211*b*, and separators 214 (not illustrated) is referred to as a thickness t, the distance La is preferably 0.8 times or more and 3.0 times or less, further preferably 0.9 times or more and 2.5 times or less, still further preferably 1.0 times or more and 2.0 times or less as large as the thickness t. With the distance La in the above range, a compact battery that is highly reliable for bending can be obtained.

When the distance between the pair of seal portions 262 is referred to as a distance Lb, it is preferred that the distance Lb be sufficiently larger than the width of the positive electrode 211*a* and the negative electrode 211*b* (here, a width Wb of the negative electrode 211*b*). In that case, even when the positive electrode 211*a* and the negative electrode 211*b* come into contact with the exterior body 251 by change in the shape of the secondary battery 250, such as repeated bending, the position of part of the positive electrode 211*a* and the negative electrode 211*b* can be shifted in the width direction; thus, the positive and negative electrodes 211*a* and 211*b* and the exterior body 251 can be effectively prevented from being rubbed against each other.

For example, the difference between the distance Lb (i.e., the distance between the pair of seal portions 262) and the width Wb of the negative electrode 211*b* is preferably 1.6 times or more and 6.0 times or less, further preferably 1.8 times or more and 5.0 times or less, still further preferably 2.0 times or more and 4.0 times or less as large as the thickness t of the positive electrode 211*a* and the negative electrode 211*b*.

In other words, the distance Lb, the width Wb, and the thickness t preferably satisfy the relation of Formula 1 below.

$$\frac{Lb - Wb}{2t} \geq a \qquad \text{[Formula 1]}$$

In the formula, a is 0.8 or more and 3.0 or less, preferably 0.9 or more and 2.5 or less, further preferably 1.0 or more and 2.0 or less.

FIG. 22C illustrates a cross section including the lead 212*a* and corresponds to a cross section of the secondary battery 250, the positive electrode 211*a*, and the negative electrode 211*b* in the length direction. As illustrated in FIG. 22C, a space 273 is preferably provided in the folded portion 261 between the exterior body 251 and the end portions of the positive electrode 211*a* and the negative electrode 211*b* in the length direction.

FIG. 22D is a schematic cross-sectional view of the secondary battery 250 in a state of being bent. FIG. 22D corresponds to a cross section along the cutting line B1-B2 in FIG. 22A.

When the secondary battery 250 is bent, the exterior body 251 is deformed such that a part positioned on the outer side of bending expands and another part positioned on the inner side of bending contracts. Specifically, the part of the exterior body 251 positioned on the outer side is deformed such that the wave amplitude becomes smaller and the length of the wave period becomes larger. By contrast, the part of the exterior body 251 positioned on the inner side is deformed such that the wave amplitude becomes larger and the length of the wave period becomes smaller. When the exterior body 251 changes its shape in this manner, stress applied to the exterior body 251 due to bending is relieved, so that a material itself of the exterior body 251 does not need to expand and contract. Thus, the secondary battery 250 can be bent with weak force without damage to the exterior body 251.

Furthermore, as illustrated in FIG. 22D, when the secondary battery 250 is bent, the positions of the positive electrode 211*a* and the negative electrode 211*b* are shifted relatively. At this time, the end of the stacked positive electrodes 211*a* and negative electrodes 211*b* on the seal portion 263 side is fixed by a fixing member 217. Thus, the plurality of positive electrodes 211*a* and the plurality of negative electrodes 211*b* are more shifted at a position closer to the folded portion 261. Accordingly, stress applied to the positive electrodes 211*a* and the negative electrodes 211*b* is relieved, and the positive electrodes 211*a* and the negative electrodes 211*b* themselves do not need to expand and contract. Consequently, the secondary battery 250 can be bent without damage to the positive electrodes 211*a* and the negative electrodes 211*b*.

The space 273 is provided between the positive and negative electrodes 211*a* and 211*b* and the exterior body 251, whereby the relative positions of the positive electrodes 211*a* and the negative electrodes 211*b* can be shifted while the positive electrode 211*a* and the negative electrode 211*b* located on the inner side when the secondary battery 250 is bent do not come in contact with the exterior body 251.

In the secondary battery 250 illustrated in FIGS. 22A, 22B1, 22B2, 22C, and 22D and FIGS. 23A and 23B, the exterior body, the positive electrode 211*a*, and the negative electrode 211*b* are less likely to be damaged and the battery performance is less likely to deteriorate even when the secondary battery 250 is repeatedly bent and unbent. When the positive electrode active material described in the above embodiment is used in the positive electrode 211*a* included in the secondary battery 250, a battery with quite excellent cycling performance can be obtained.

Figure 24A:
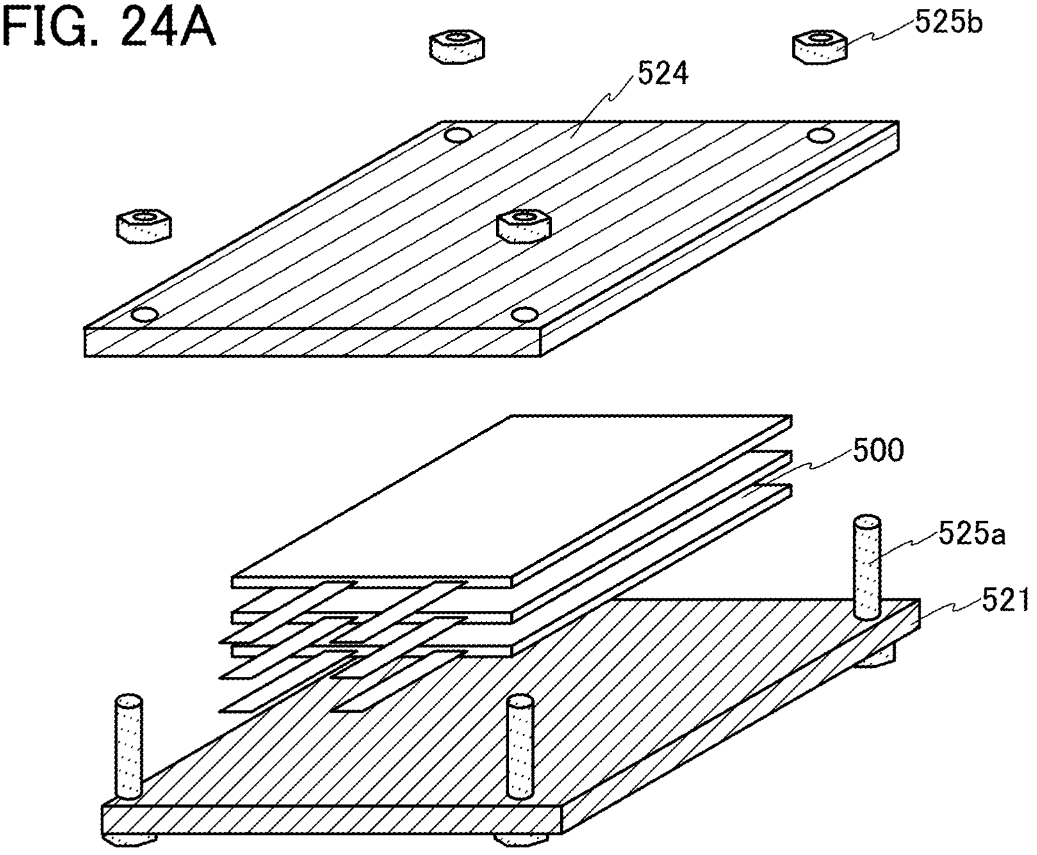
FIGS. 24A and 24B illustrate a secondary battery of one embodiment of the present invention and an example of a method for manufacturing the secondary battery.

FIG. 24A is a perspective view showing three laminated secondary batteries 500 sandwiched and fixed between a first plate 521 and a second plate 524. The distance between the first plate 521 and the second plate 524 is fixed using fixation tools 525*a* and 525*b* as illustrated in FIG. 24B, whereby stress can be applied to the three secondary batteries 500.

Figure 24B:
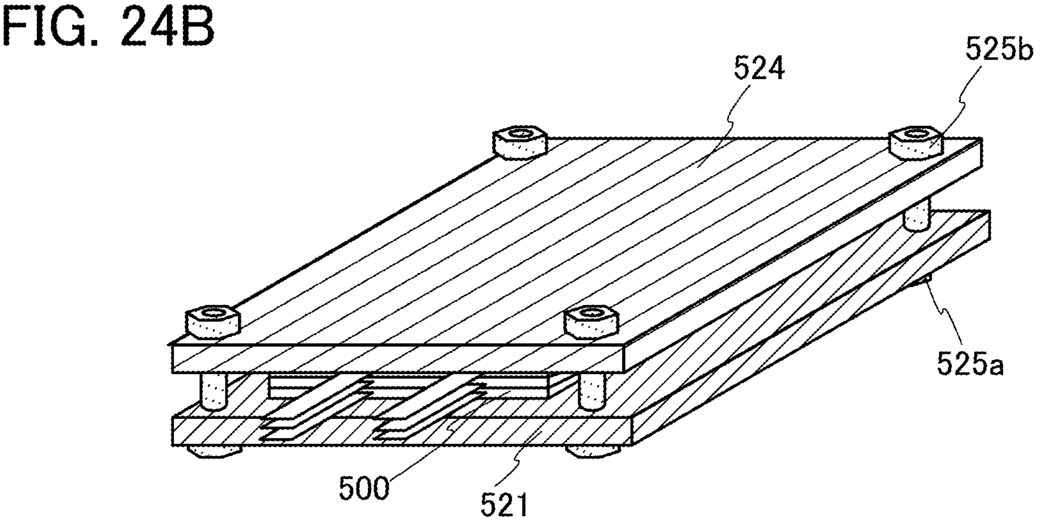

Although FIGS. 24A and 24B illustrate an example of using three laminated secondary batteries 500, the number of secondary batteries 500 is not particularly limited and four or more secondary batteries 500 can be used. Ten or more secondary batteries 500 can be used as a power source for a compact vehicle, and 100 or more secondary batteries 500 can be used as an in-vehicle large power source. In order to prevent overcharge, the laminated secondary battery 500 may be provided with a protection circuit or a temperature sensor for monitoring the temperature rise.

In an all-solid-state battery, the contact state of the inside interface can be kept favorable by applying a predetermined pressure in the direction of stacking positive electrodes and negative electrodes. By applying a predetermined pressure in the direction of stacking the positive electrodes and the negative electrodes, the amount of expansion of the all-solid-state battery in the stacking direction due to charge and discharge can be suppressed, and the reliability of the all-solid-state battery can be improved.

This embodiment can be implemented in appropriate combination with any of the other embodiments.

Embodiment 6

In this embodiment, examples of electronic devices each including the secondary battery of one embodiment of the present invention will be described.

FIGS. 25A to 25G show examples of electronic devices including the bendable secondary battery described in Embodiment 5. Examples of electronic devices including a bendable secondary battery include television sets (also referred to as televisions or television receivers), monitors of computers and the like, digital cameras and digital video cameras, digital photo frames, mobile phones (also referred to as cellular phones or mobile phone devices), portable game machines, portable information terminals, audio reproducing devices, and large game machines such as pachinko machines.

A flexible secondary battery can also be incorporated along a curved inside/outside wall surface of a house or a building or a curved interior/exterior surface of an automobile.

Figure 25A:
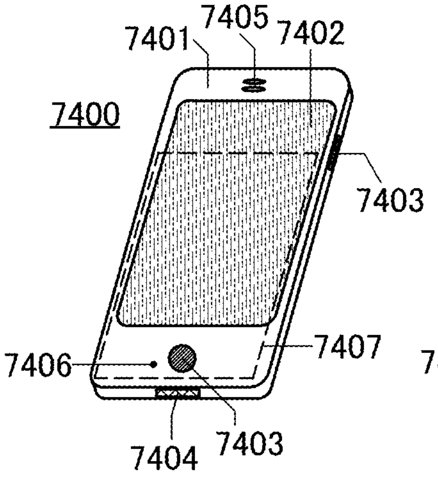
FIGS. 25A, 25B, 25D, 25F, 25G, and 25H are perspective views illustrating examples of electronic devices.

FIG. 25A illustrates an example of a mobile phone. A mobile phone 7400 is provided with a display portion 7402 incorporated in a housing 7401, operation buttons 7403, an external connection port 7404, a speaker 7405, a microphone 7406, and the like. The mobile phone 7400 includes a secondary battery 7407. By using the secondary battery of one embodiment of the present invention as the secondary battery 7407, a lightweight long-life mobile phone can be provided.

Figure 25B:
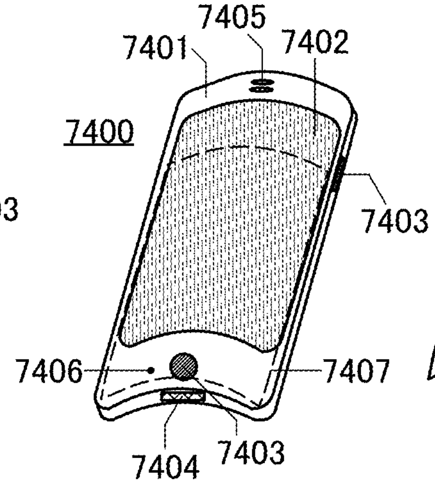
Figure 25C:
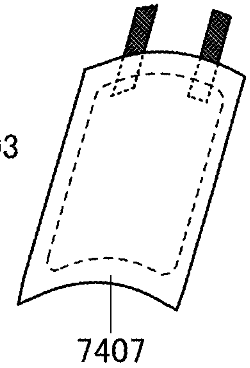
FIGS. 25C and 25E illustrate examples of secondary batteries.

FIG. 25B illustrates the mobile phone 7400 in a state of being bent. When the whole mobile phone 7400 is bent by the external force, the secondary battery 7407 included in the mobile phone 7400 is also bent. FIG. 25C illustrates the secondary battery 7407 that is being bent at that time. The secondary battery 7407 is a thin storage battery. The secondary battery 7407 is fixed in a state of being bent. The secondary battery 7407 includes a lead electrode electrically connected to a current collector. The current collector is, for example, copper foil and is partly alloyed with gallium; thus, adhesion between the current collector and an active material layer in contact with the current collector is improved and the secondary battery 7407 can have high reliability even in a state of being bent.

Figure 25D:
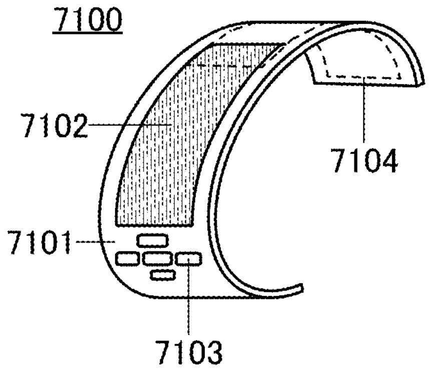
Figure 25E:
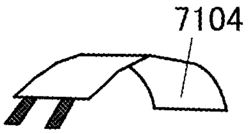

FIG. 25D illustrates an example of a bangle-type display device. A portable display device 7100 includes a housing 7101, a display portion 7102, operation buttons 7103, and a secondary battery 7104. FIG. 25E illustrates the secondary battery 7104 that is being bent. When the display device is worn on a user's arm while the secondary battery 7104 is bent, the housing changes its shape and the curvature of part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is deformed with a radius of curvature in the range of 40 mm to 150 mm. When the radius of curvature of the main surface of the secondary battery 7104 ranges from 40 mm to 150 mm, the reliability can be kept high. By using the secondary battery of one embodiment of the present invention as the secondary battery 7104, a lightweight long-life portable display device can be provided.

Figure 25F:
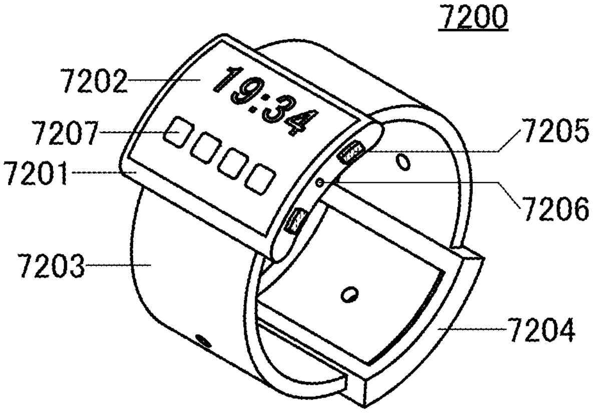

FIG. 25F illustrates an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, an application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by the operating system incorporated in the portable information terminal 7200.

The portable information terminal 7200 can employ near field communication based on an existing communication standard. For example, mutual communication between the portable information terminal 7200 and a headset capable of wireless communication can be performed, and thus hands-free calling is possible.

Moreover, the portable information terminal 7200 includes the input/output terminal 7206, and data can be directly transmitted to and received from another information terminal via a connector. In addition, charging via the input/output terminal 7206 is possible. Note that the charging operation may be performed by wireless power feeding without using the input/output terminal 7206.

The display portion 7202 of the portable information terminal 7200 includes the secondary battery of one embodiment of the present invention. With the use of the secondary battery of one embodiment of the present invention, a lightweight long-life portable information terminal can be provided. For example, the secondary battery 7104 in FIG. 25E that is in the state of being curved can be provided in the housing 7201. Alternatively, the secondary battery 7104 in FIG. 25E can be provided in the band 7203 such that it can be curved.

The portable information terminal 7200 preferably includes a sensor. As the sensor, a human body sensor such as a fingerprint sensor, a pulse sensor, or a temperature sensor, a touch sensor, a pressure sensitive sensor, or an acceleration sensor is preferably mounted, for example.

Figure 25G:
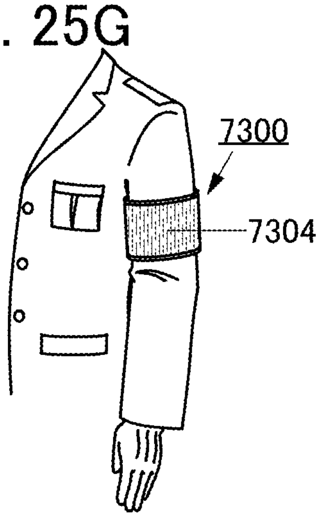

FIG. 25G illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication based on an existing communication standard.

The display device 7300 includes an input/output terminal, and data can be directly transmitted to and received from another information terminal via a connector. In addition, charging via the input/output terminal is possible. Note that the charging operation may be performed by wireless power feeding without using the input/output terminal.

By using the secondary battery of one embodiment of the present invention as the secondary battery included in the display device 7300, a lightweight long-life display device can be provided.

Examples of electronic devices each including the secondary battery with excellent cycling performance described in the above embodiment will be described with reference to FIG. 25H, FIGS. 26A to 26C, and FIG. 27.

By using the secondary battery of one embodiment of the present invention as a secondary battery of a daily electronic device, a lightweight long-life product can be provided. Examples of daily electronic devices include an electric toothbrush, an electric shaver, and electric beauty equipment. As secondary batteries for these products, small and lightweight stick-type secondary batteries with high capacity are desired in consideration of handling ease for users.

Figure 25H:
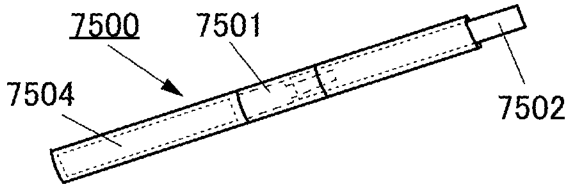

FIG. 25H is a perspective view of a device called a vaporizer (electronic cigarette). In FIG. 25H, an electronic cigarette 7500 includes an atomizer 7501 including a heating element, a secondary battery 7504 that supplies power to the atomizer, and a cartridge 7502 including a liquid supply bottle, a sensor, and the like. To improve safety, a protection circuit that prevents overcharge and overdischarge of the secondary battery 7504 may be electrically connected to the secondary battery 7504. The secondary battery 7504 in FIG. 25H includes an external terminal for connection to a charger. When the electronic cigarette 7500 is held by a user, the secondary battery 7504 is at the tip of the device; thus, it is preferred that the secondary battery 7504 have a short total length and be lightweight. With the secondary battery of one embodiment of the present invention, which has high capacity and favorable cycling performance, the small and lightweight electronic cigarette 7500 that can be used for a long time over a long period can be provided.

Figure 26A:
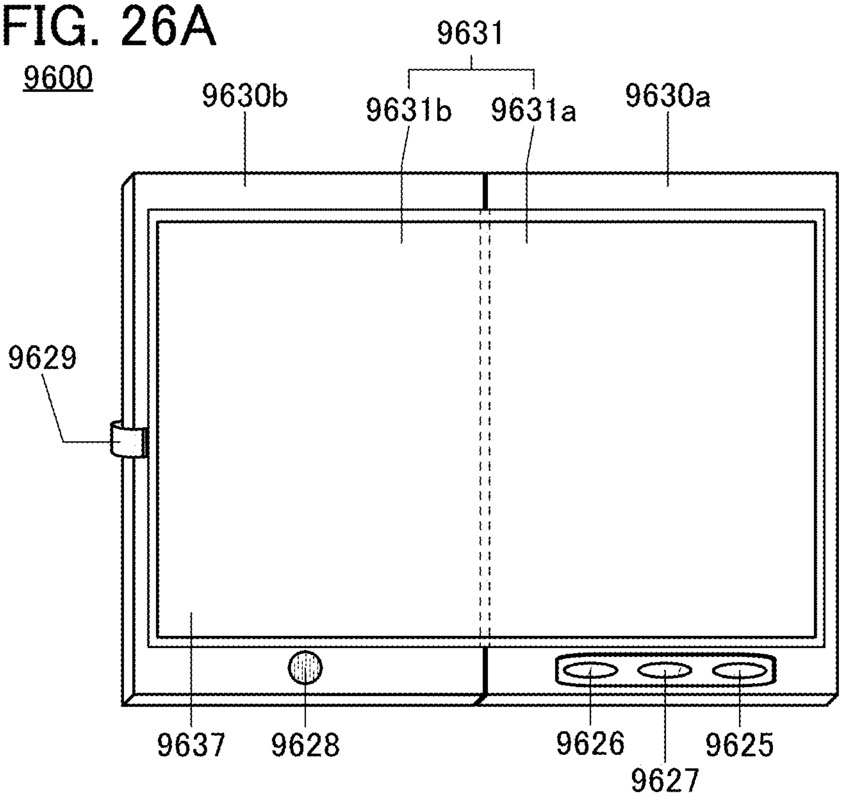
FIGS. 26A and 26B illustrate an example of an electronic device.
Figure 26B:
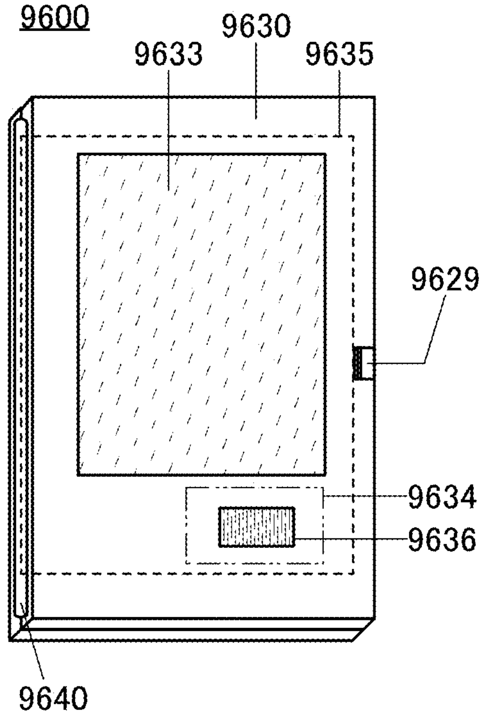

FIGS. 26A and 26B illustrate an example of a tablet terminal that can be folded in half. A tablet terminal 9600 illustrated in FIGS. 26A and 26B includes a housing 9630*a*, a housing 9630*b*, a movable portion 9640 connecting the housings 9630*a* and 9630*b*, a display portion 9631 including a display portion 9631*a* and a display portion 9631*b*, switches 9625 to 9627, a fastener 9629, and an operation switch 9628. The use of a flexible panel for the display portion 9631 achieves a tablet terminal with a larger display portion. FIG. 26A illustrates the tablet terminal 9600 that is opened, and FIG. 26B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of or the entire display portion 9631 can be a touch panel region, and data can be input by touching text, an input form, an image including an icon, and the like displayed on the region. For example, it is possible that keyboard buttons are displayed on the entire display portion 9631*a* on the housing 9630*a* side, and data such as text and an image is displayed on the display portion 9631*b* on the housing 9630*b* side.

It is also possible that a keyboard is displayed on the display portion 9631*b* on the housing 9630*b* side, and data such as text or an image is displayed on the display portion 9631*a* on the housing 9630*a* side. Furthermore, a switching button for showing/hiding a keyboard on a touch panel may be displayed on the display portion 9631 so that the keyboard is displayed on the display portion 9631 by touching the button with a finger, a stylus, or the like.

In addition, touch input can be performed concurrently in a touch panel region in the display portion 9631*a* on the housing 9630*a* side and a touch panel region in the display portion 9631*b* on the housing 9630*b* side.

The switches 9625 to 9627 may function not only as an interface for operating the tablet terminal 9600 but also as an interface that can switch various functions. For example, at least one of the switches 9625 to 9627 may have a function of switching on/off of the tablet terminal 9600. For another example, at least one of the switches 9625 to 9627 may have a function of switching display between a portrait mode and a landscape mode and a function of switching display between monochrome display and color display. For another example, at least one of the switches 9625 to 9627 may have a function of adjusting the luminance of the display portion 9631.

The luminance of the display portion 9631 can be optimized in accordance with the amount of external light in use of the tablet terminal 9600, which is detected by an optical sensor incorporated in the tablet terminal 9600. Note that in addition to the optical sensor, the tablet terminal may incorporate another sensing device such as a sensor for measuring inclination, like a gyroscope sensor or an acceleration sensor.

The display portion 9631*a* on the housing 9630*a* side and the display portion 9631*b* on the housing 9630*b* side have substantially the same display area in FIG. 26A; however, there is no particular limitation on the display areas of the display portions 9631*a* and 9631*b*, and the display portions may have different areas or different display quality. For example, one of the display portions 9631*a* and 9631*b* may display higher-definition images than the other.

The tablet terminal 9600 is folded in half in FIG. 26B. The tablet terminal 9600 includes a housing 9630, a solar cell 9633, and a charge/discharge control circuit 9634 including a DC-DC converter 9636. The power storage unit of one embodiment of the present invention is used as the power storage unit 9635.

As described above, the tablet terminal 9600 can be folded in half such that the housings 9630*a* and 9630*b* overlap each other when not in use. Accordingly, the display portion 9631 can be protected, which increases the durability of the tablet terminal 9600. With the power storage unit 9635 including the secondary battery of one embodiment of the present invention, which has high capacity and favorable cycling performance, the tablet terminal 9600 capable of being used for a long time over a long period can be provided.

The tablet terminal 9600 illustrated in FIGS. 26A and 26B can also have a function of displaying various kinds of data (e.g., a still image, a moving image, and a text image), a function of displaying a calendar, a date, or the time on the display portion, a touch input function of operating or editing data displayed on the display portion by touch input, a function of controlling processing by various kinds of software (programs), and the like.

The solar cell 9633, which is attached on the surface of the tablet terminal 9600, supplies electric power to the touch panel, the display portion, a video signal processing portion, and the like. Note that the solar cell 9633 can be provided on one or both surfaces of the housing 9630, and the power storage unit 9635 can be charged efficiently. The use of a lithium-ion battery as the power storage unit 9635 brings an advantage such as a reduction in size.

Figure 26C:
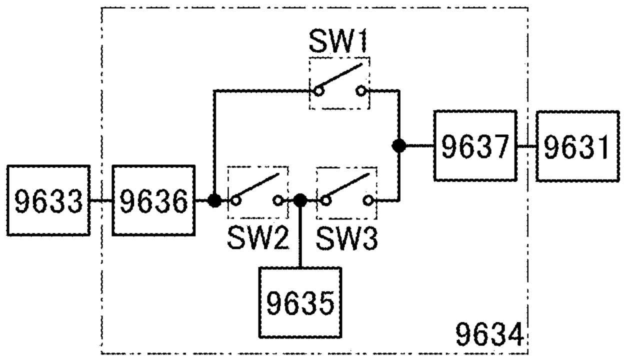
FIG. 26C is a block diagram of the electronic device.

The structure and operation of the charge/discharge control circuit 9634 illustrated in FIG. 26B will be described with reference to a block diagram in FIG. 26C. FIG. 26C illustrates the solar cell 9633, the power storage unit 9635, the DC-DC converter 9636, a converter 9637, switches SW1 to SW3, and the display portion 9631. The power storage unit 9635, the DC-DC converter 9636, the converter 9637, and the switches SW1 to SW3 correspond to the charge/discharge control circuit 9634 in FIG. 26B.

First, an operation example in which electric power is generated by the solar cell 9633 using external light is described. The voltage of electric power generated by the solar cell is raised or lowered by the DC-DC converter 9636 to a voltage for charging the power storage unit 9635. When the display portion 9631 operates with the electric power from the solar cell 9633, the switch SW1 is turned on and the voltage of the electric power is raised or lowered by the converter 9637 to a voltage needed for the display portion 9631. When display on the display portion 9631 is not performed, the switch SW1 is turned off and the switch SW2 is turned on, so that the power storage unit 9635 can be charged.

Note that the solar cell 9633 is described as an example of a power generation unit; however, one embodiment of the present invention is not limited to this example. The power storage unit 9635 may be charged using another power generation unit such as a piezoelectric element or a thermoelectric conversion element (Peltier element). For example, the power storage unit 9635 may be charged with a non-contact power transmission module that transmits and receives electric power wirelessly (without contact), or with a combination of other charging units.

Figure 27:
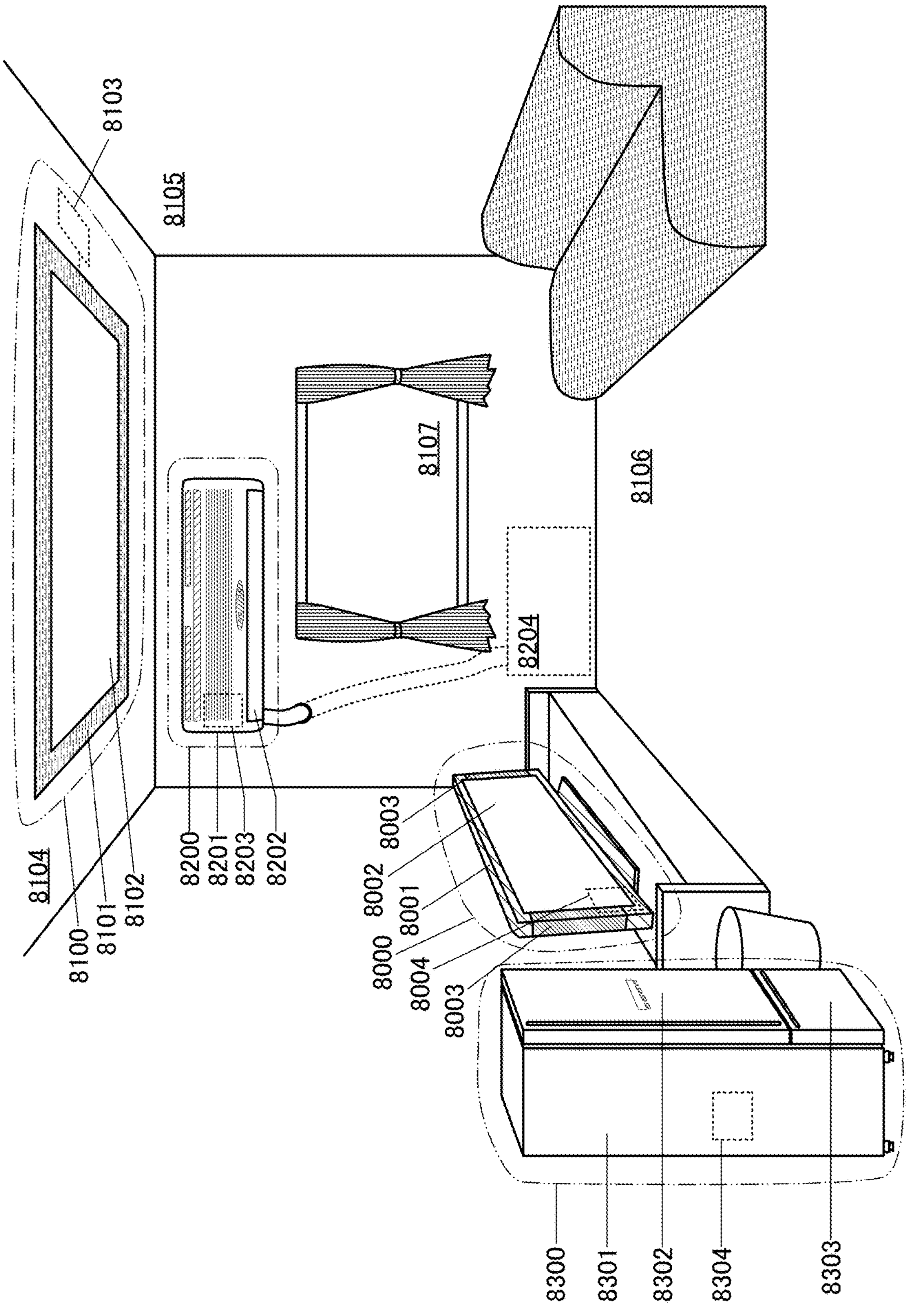
FIG. 27 illustrates examples of electronic devices.

FIG. 27 illustrates other examples of electronic devices. In FIG. 27, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 27, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 27 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated as an example in FIG. 27, the secondary battery of one embodiment of the present invention can be used in an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source that emits light artificially by using electric power can be used. Specific examples of the artificial light source include an incandescent lamp, a discharge lamp such as a fluorescent lamp, and light-emitting elements such as an LED and an organic EL element.

In FIG. 27, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 27 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can operate with the use of the secondary batteries 8203 of one embodiment of the present invention as uninterruptible power supplies even when electric power cannot be supplied from a commercial power supply due to power failure or the like.

Note that although the split-type air conditioner including the indoor unit and the outdoor unit is illustrated as an example in FIG. 27, the secondary battery of one embodiment of the present invention can also be used in an air conditioner in which the functions of an indoor unit and an outdoor unit are integrated in one housing.

In FIG. 27, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided inside the housing 8301 in FIG. 27. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of such an electronic device can be prevented by using the secondary battery of one embodiment of the present invention as an auxiliary power supply for supplying electric power which cannot be supplied enough by a commercial power supply.

In addition, by storing electric power in the secondary battery in a time period during which electronic devices are not used, particularly a time period during which the proportion of the amount of electric power that is actually used to the total amount of electric power that can be supplied from a commercial power supply source (such a proportion is referred to as an electricity usage rate) is low, the electricity usage rate can be reduced in a time period other than the above. For example, in the case of the electric refrigerator-freezer 8300, electric power is stored in the secondary battery 8304 in night time when the temperature is low and the refrigerator door 8302 and the freezer door 8303 are not often opened or closed. On the other hand, in daytime when the temperature is high and the refrigerator door 8302 and the freezer door 8303 are frequently opened and closed, the secondary battery 8304 is used as an auxiliary power supply; thus, the electricity usage rate in daytime can be reduced.

According to one embodiment of the present invention, the secondary battery can have excellent cycling performance and improved reliability. Moreover, according to one embodiment of the present invention, a secondary battery with high capacity can be obtained; hence, the secondary battery itself can be made more compact and lightweight as a result of improved characteristics of the secondary battery. Thus, the use of the secondary battery of one embodiment of the present invention enables the electronic device described in this embodiment to be more lightweight and have a longer lifetime.

This embodiment can be combined with any of the other embodiments as appropriate.

Embodiment 7

In this embodiment, examples of vehicles each including the secondary battery of one embodiment of the present invention will be described.

The use of secondary batteries in vehicles enables production of next-generation clean energy vehicles such as hybrid electric vehicles (HEV), electric vehicles (EV), and plug-in hybrid electric vehicles (PHEV).

Figure 28A:
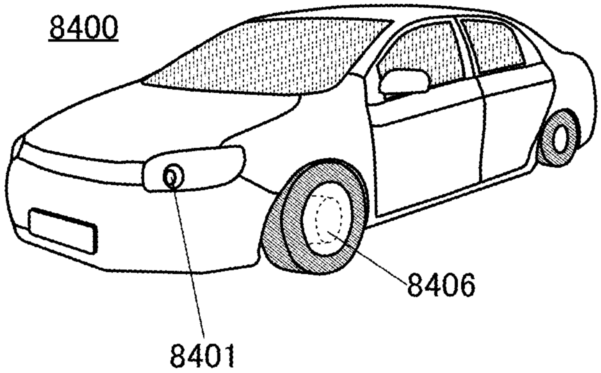
FIGS. 28A to 28C each illustrate an example of a vehicle.
Figure 28B:
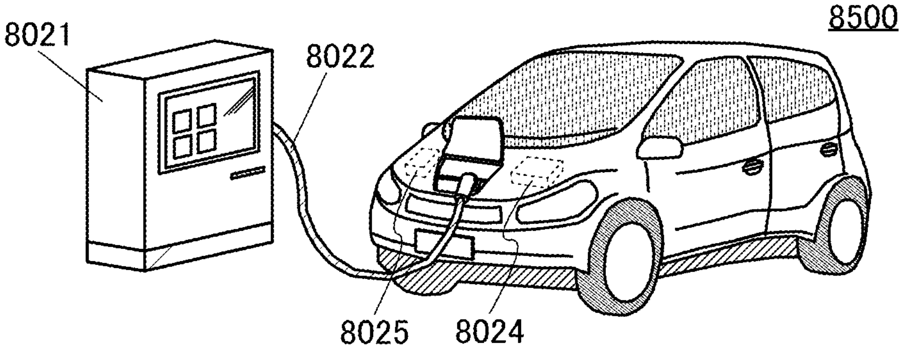
Figure 28C:
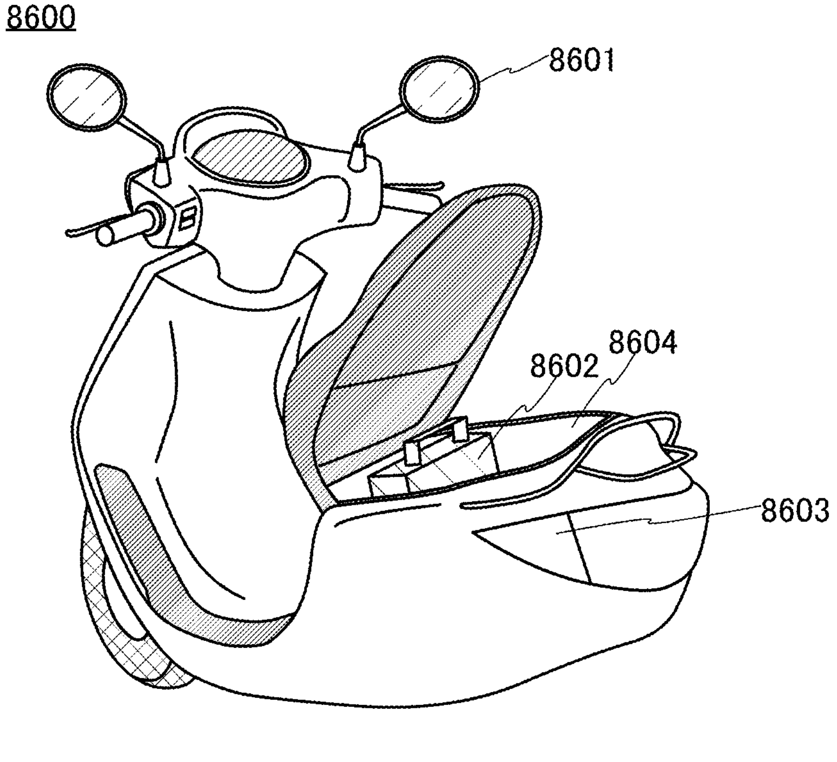

FIGS. 28A to 28C each illustrate an example of a vehicle including the secondary battery of one embodiment of the present invention. An automobile 8400 illustrated in FIG. 28A is an electric vehicle that runs on the power of an electric motor. Alternatively, the automobile 8400 is a hybrid electric vehicle capable of driving using either an electric motor or an engine as appropriate. The use of the secondary battery of one embodiment of the present invention allows fabrication of a high-mileage vehicle. The automobile 8400 includes the secondary battery. As the secondary battery, the modules of the secondary batteries illustrated in FIGS. 12C and 12D can be arranged to be used in a floor portion in the automobile. Alternatively, a battery pack in which a plurality of secondary batteries each of which is illustrated in FIGS. 15A and 15B are combined may be placed in the floor portion in the automobile. The secondary battery is used not only for driving an electric motor 8406, but also for supplying electric power to light-emitting devices such as a headlight 8401 and a room light (not illustrated).

The secondary battery can also supply electric power to a display device included in the automobile 8400, such as a speedometer and a tachometer. Furthermore, the secondary battery can supply electric power to a semiconductor device included in the automobile 8400, such as a navigation system.

FIG. 28B illustrates an automobile 8500 including the secondary battery. The automobile 8500 can be charged when the secondary battery is supplied with electric power through external charging equipment by a plug-in system, a contactless power feeding system, or the like. In FIG. 28B, the secondary battery 8024 included in the automobile 8500 is charged with the use of a ground-based charging apparatus 8021 through a cable 8022. In charging, a given method such as CHAdeMO (registered trademark) or Combined Charging System can be employed as a charging method, the standard of a connector, or the like as appropriate. The charging apparatus 8021 may be a charging station provided in a commerce facility or a power source in a house. For example, with the use of a plug-in technique, the secondary battery 8024 included in the automobile 8500 can be charged by being supplied with electric power from outside. The charge can be performed by converting AC electric power into DC electric power through a converter such as an AC-DC converter.

Although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charge can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

FIG. 28C shows an example of a motorcycle including the secondary battery of one embodiment of the present invention. A motor scooter 8600 illustrated in FIG. 28C includes a secondary battery 8602, side mirrors 8601, and indicators 8603. The secondary battery 8602 can supply electric power to the indicators 8603.

In the motor scooter 8600 illustrated in FIG. 28C, the secondary battery 8602 can be held in an under-seat storage unit 8604. The secondary battery 8602 can be held in the under-seat storage unit 8604 even with a small size. The secondary battery 8602 is detachable; thus, the secondary battery 8602 is carried indoors when charged, and is stored before the motor scooter is driven.

According to one embodiment of the present invention, the secondary battery can have improved cycling performance and an increased capacity. Thus, the secondary battery itself can be made more compact and lightweight. The compact and lightweight secondary battery contributes to a reduction in the weight of a vehicle and hence increases the mileage. Furthermore, the secondary battery included in the vehicle can be used as a power source for supplying electric power to products other than the vehicle. In such a case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with favorable cycling performance can be used over a long period; thus, the use amount of rare metals such as cobalt can be reduced.

This embodiment can be combined with any of the other embodiments as appropriate.

Example 1

In this example, the positive electrode active material 100A-1, the mixture 904, and the positive electrode active material 100C of the comparative example were fabricated, and the performance of battery cells were evaluated.

<Formation of Positive Electrode Active Material>

[Sample 1]

As a sample using the positive electrode active material 100A-1, Sample 1 was fabricated with reference to the flow chart illustrated in FIG. 1.

First, the mixture 902 containing magnesium and fluorine was fabricated (Steps S11 to S14). LiF and $MgF_2$ were weighted so that the molar ratio was 1:3, acetone was added as a solvent, and the materials were mixed and ground by a wet method. The mixing and the grinding were performed in a ball mill using a zirconia ball at 400 rpm for 12 hours. The resulting material was collected as the mixture 902.

Next, nickel hydroxide, which is a metal source, and acetone were mixed to form pulverized nickel hydroxide (Steps S15 to S17).

Then, aluminum hydroxide, which is a metal source, and acetone were mixed to form pulverized aluminum hydroxide (Steps S18 to S20).

Next, lithium cobalt oxide was prepared as a composite oxide containing lithium and cobalt. Specifically, Cellseed C-10N (manufactured by Nippon Chemical Industrial Co., Ltd.) was prepared (Step S25).

Then, in Step S31, the materials were weighed so that the atomic weight of magnesium in the mixture 902 was 1.0% of the atomic weight of cobalt in the lithium cobalt oxide, the atomic weight of nickel in the nickel hydroxide was 0.5% of the sum of the atomic weights of cobalt in the lithium cobalt oxide and nickel, and the atomic weight of aluminum in the aluminum hydroxide was 0.5% of the sum of the atomic weights of cobalt in the lithium cobalt oxide and nickel. The weighed mixture 902, nickel hydroxide, aluminum hydroxide, and lithium cobalt oxide were mixed with a dry method. The mixing was performed in a ball mill using a zirconia ball at 150 rpm for 1 hour.

Subsequently, the resulting material was collected, and the mixture 903 was obtained (Step S32 and Step S33).

Next, the mixture 903 was put in an alumina oxide crucible and annealed at 850° C. for 60 hours by a muffle furnace in an oxygen atmosphere (Step S34). At the time of annealing, the alumina oxide crucible was covered with a lid. The flow rate of oxygen was 10 L/min. The temperature rising rate was 200° C./h, and the temperature decreasing time was longer than or equal to 10 hours. The material subjected to the heat treatment was collected and sifted (Step S35), and the positive electrode active material 100A-1 was obtained (Step S36).

[Sample 2]

As a sample using the mixture 904 as a positive electrode active material, Sample 2 was fabricated with reference to part of the flow chart illustrated in FIG. 3.

First, the mixture 902 containing magnesium and fluorine was fabricated (Steps S11 to S14). LiF and $MgF_2$ were weighted so that the molar ratio was 1:3, acetone was added as a solvent, and the materials were mixed and ground by a wet method. The mixing and the grinding were performed in a ball mill using a zirconia ball at 400 rpm for 12 hours. The resulting material was collected as the mixture 902.

Next, a positive electrode active material containing cobalt was prepared (Step S25). Here, Cellseed C-10N (manufactured by Nippon Chemical Industrial Co., Ltd.) was used as pre-synthesized lithium cobalt oxide. Cellseed C-10N is lithium cobalt oxide having a D50 of approximately 12 μm and containing few impurities.

Then, the mixture 902 and the lithium cobalt oxide were mixed (Step S31). The materials were weighed so that the atomic weight of magnesium in the mixture 902 was 0.5% of the atomic weight of cobalt in the lithium cobalt oxide. The mixing was performed by a dry method. The mixing was performed in a ball mill using a zirconia ball at 150 rpm for 1 hour.

Subsequently, the resulting material was collected, and the mixture 903 was obtained (Step S32 and Step S33).

Next, the mixture 903 was put in an alumina oxide crucible and annealed at 850° C. for 60 hours by a muffle furnace in an oxygen atmosphere (Step S34). At the time of annealing, the alumina oxide crucible was covered with a lid. The flow rate of oxygen was 10 L/min. The temperature rising rate was 200° C./h, and the temperature decreasing time was longer than or equal to 10 hours. The material subjected to the heat treatment was collected (Step S35) and sifted, and the mixture 904 was obtained (Step S36). Unlike the positive electrode active material 100A-1, the mixture 904 does not need addition of aluminum and nickel; thus, the manufacturing process can be shortened. The mixture 904 is also formed utilizing the eutectic phenomenon and is therefore one embodiment of the present invention.

Cellseed C-10N was used as the positive electrode active material 100C of the comparative example.

<Fabrication of Battery Cell>

Next, positive electrodes were formed using Sample 1 and Sample 2 obtained in the above manner as a positive electrode active material. A current collector that was coated with a slurry in which the positive electrode active material, AB, and PVDF were mixed in a weight ratio of 95:3:2 was used. As a solvent of the slurry, NMP was used.

After the current collector was coated with the slurry, the solvent was volatilized. Then, pressure was applied at 210 kN/m and then at 1467 kN/m. Through the above process, the positive electrode was obtained. The loading amount of the positive electrode active material in the positive electrode was approximately 20 $mg/cm^2$.

CR2032 coin-type battery cells (diameter: 20 mm, height: 3.2 mm) were fabricated with the use of the formed positive electrodes.

A lithium metal was used for a counter electrode.

As an electrolyte contained in the electrolytic solution, 1 mol/L lithium hexafluorophosphate ($LiPF_6$) was used. As the electrolytic solution, a solution in which ethylene carbonate (EC) and diethyl carbonate (DEC) were mixed at a volume ratio of 3:7 was used. Note that for secondary batteries used for evaluating the cycle performance, 2 wt % of vinylene carbonate (VC) was added to the electrolytic solution.

As a separator, 25-μm-thick polypropylene was used.

A positive electrode can and a negative electrode can that were formed of stainless steel (SUS) were used.

<Cycling Performance>

Figure 29:
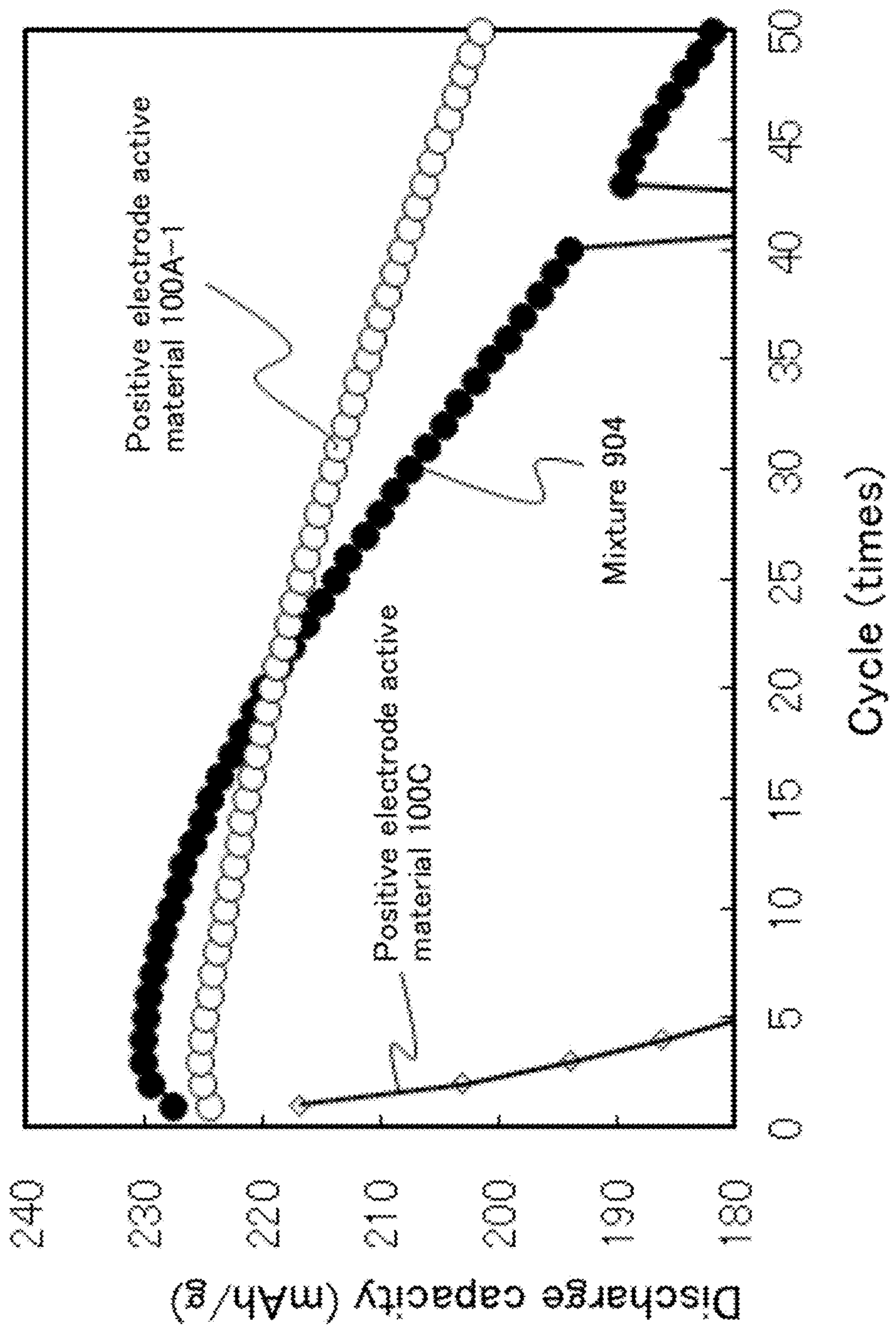
FIG. 29 shows cycling performance of secondary batteries.
Figure 31:
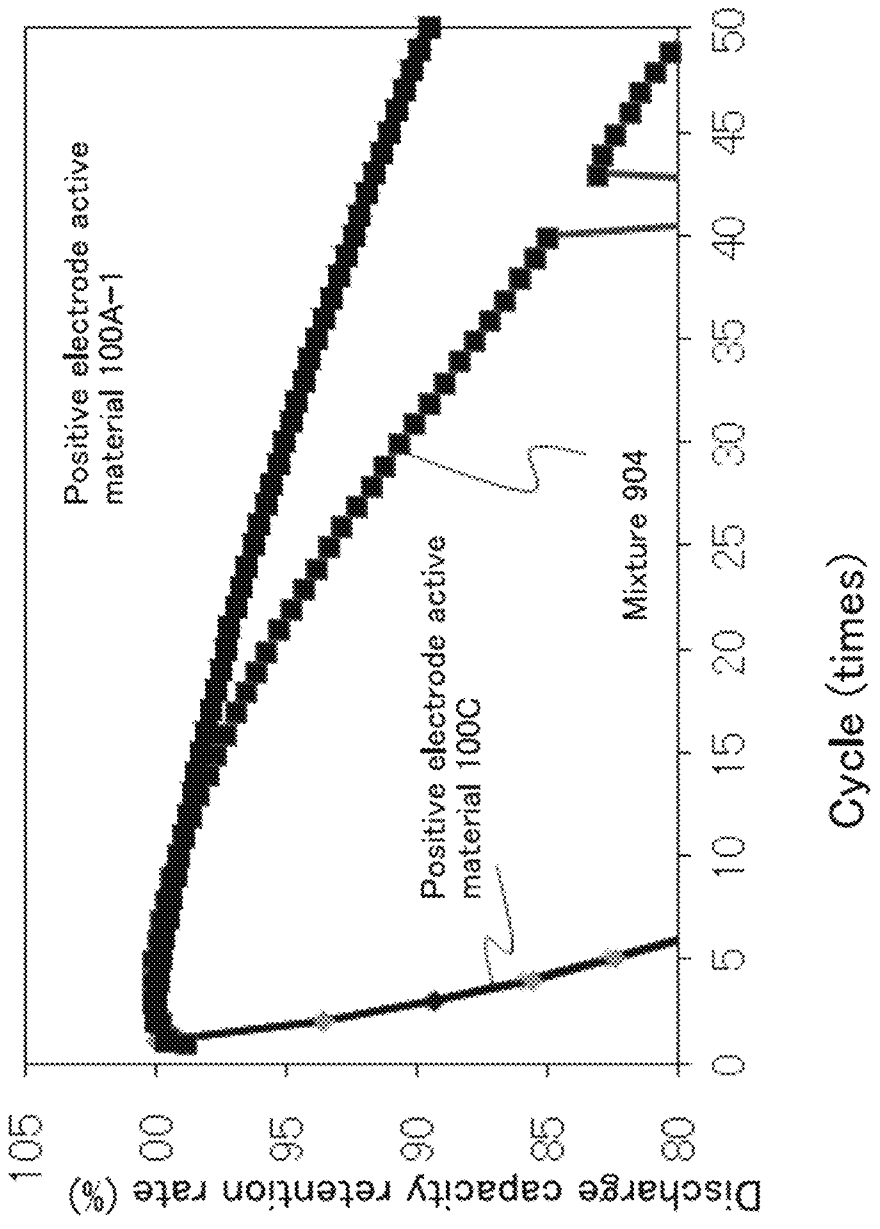
FIG. 31 shows cycling performance of secondary batteries.

FIG. 29 and FIG. 31 show the measurement results of cycling performance (45° C.) of the battery cells fabricated using the obtained positive electrode active material 100A-1 and mixture 904 as well as the positive electrode active material 100C of the comparative example. FIG. 29 is a graph with the discharge capacity as the vertical axis and the number of cycles as the horizontal axis. FIG. 31 is a graph showing the same measurement results with the capacity retention rate as the vertical axis and the number of cycles as the horizontal axis. All the samples used in the measurement in FIG. 29 and FIG. 31 had an active material loading of 7 mg/cm$^2$.

To measure the cycling performance, CCCV charging (0.5 C, 4.6 V, termination current: 0.05 C) and CC discharging (0.5 C, 2.5 V) were repeatedly performed at 45° C. The C rate was 200 mA/g.

As shown in FIG. 31, the positive electrode active material 100A-1 and the mixture 904 had a significantly high capacity retention rate, compared to the positive electrode active material 100C of the comparative example. After 50 cycles, the capacity retention rate of the positive electrode active material 100A-1 was approximately 90%, and that of the mixture 904 was approximately 79%. The positive electrode active material 100A-1 had a higher capacity retention rate by approximately 10% or more than the mixture 904 after 50 cycles.

Figure 32A:
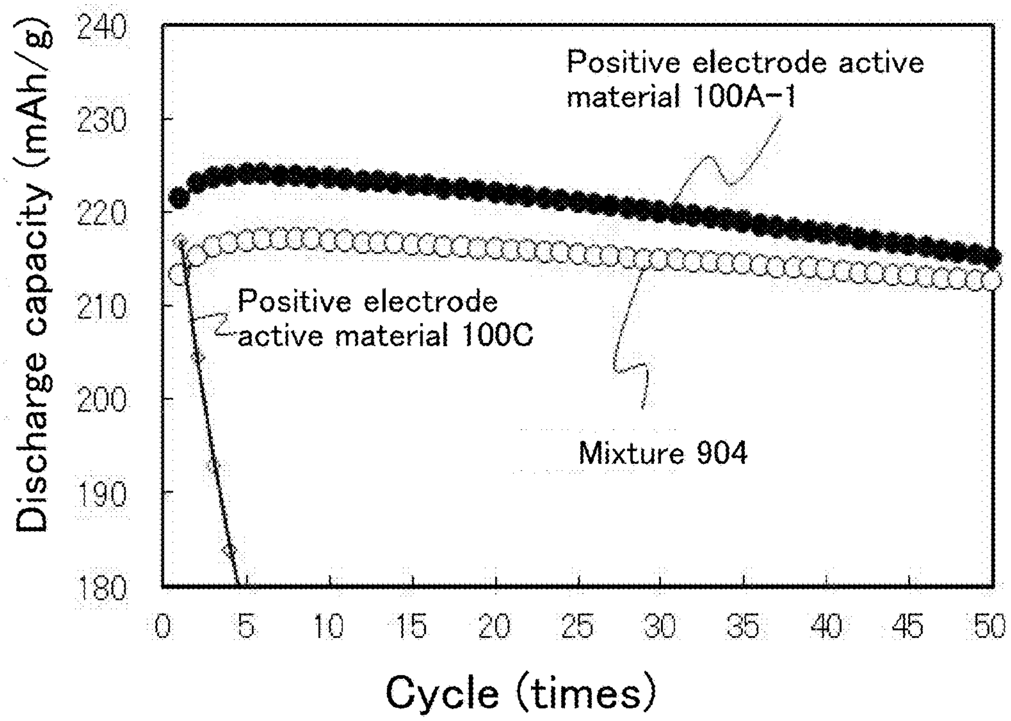
FIGS. 32A and 32B show cycling performance of secondary batteries.
Figure 32B:
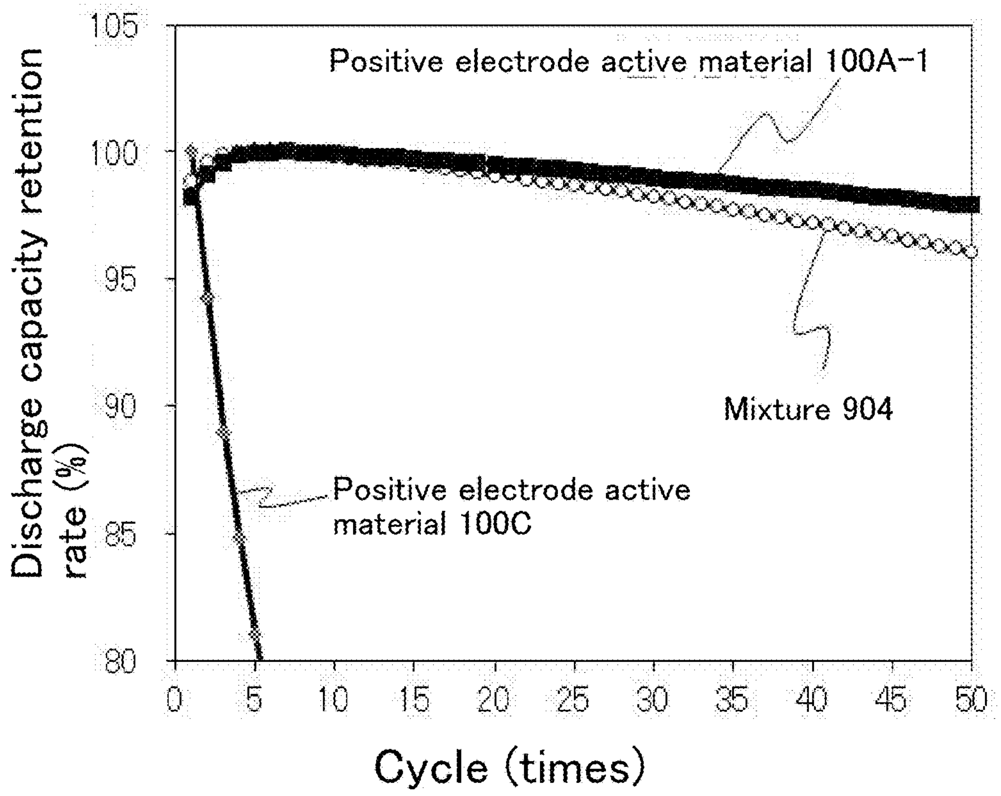

FIGS. 32A and 32B show the measurement results of cycling performance (25° C.) of the battery cells fabricated using the positive electrode active material 100A-1, the mixture 904, and the positive electrode active material 100C of the comparative example. To measure the cycling performance, CCCV charging (0.5 C, 4.6 V, termination current: 0.05 C) and CC discharging (0.5 C, 2.5 V) were repeatedly performed at 25° C. The C rate was 200 mA/g. FIG. 32A is a graph with the discharge capacity as the vertical axis and the number of cycles as the horizontal axis.

FIG. 32B is a graph showing the same measurement results with the capacity retention rate as the vertical axis and the number of cycles as the horizontal axis. All the samples used in the measurement in FIGS. 32A and 32B had an active material loading of 7 mg/cm$^2$.

As shown in FIG. 32A, the positive electrode active material 100A-1 and the mixture 904 had a significantly high capacity retention rate, compared to the positive electrode active material 100C of the comparative example. After 50 cycles, the capacity retention rate of the positive electrode active material 100A-1 was approximately 98%, and that of the mixture 904 was approximately 96%.

<Rate Performance>

Table 1 shows the results of evaluating the rate performance of secondary batteries using the mixture 904, the positive electrode active material 100A-1, and the comparative example.

TABLE 1

| Rate | Comparative example | | Mixture 904 | | Positive electrode active material 100A-1 | |
|---|---|---|---|---|---|---|
| 0.2 | 202.7 | 202.9 | 226.5 | 227.0 | 221.1 | 220.3 |
| 0.5 | 190.6 | 190.7 | 225.1 | 225.5 | 219.5 | 218.7 |
| 1 | 173.1 | 173.0 | 222.9 | 223.3 | 217.5 | 216.5 |
| 2 | 145.7 | 144.3 | 218.8 | 219.5 | 213.4 | 212.5 |
| 3 | 115.0 | 111.8 | 215.2 | 215.8 | 208.7 | 208.2 |
| 4 | 77.6 | 72.0 | 210.1 | 211.3 | 201.2 | 200.1 |
| 5 | 33.2 | 24.3 | 199.0 | 203.7 | 180.1 | 180.5 |

In the coin cell used for evaluating the rate performance, the loading amount of the positive electrode active material layer was 8 mg/cm$^2$; the density was 3.8 g/cc or more; the composition ratio of LCO:AB:PVDF was 95:3:2; an electrolyte contained in an electrolytic solution was 1 mol/L lithium hexafluorophosphate ($LiPF_6$); and the electrolytic solution was a mixture of ethylene carbonate (EC) and diethyl carbonate (DEC) at a volume ratio of 3:7. Moreover, 2 wt % of vinylene carbonate (VC) was added to the electrolytic solution.

In first charging, the upper limit voltage was set to 4.5 V or 4.6 V, and CCCV charging was performed at 0.2 C and 4.6 V with a cutoff current of 0.02 C. As first discharging, CC discharging was performed at 0.2 C with a cutoff voltage of 2.5 V. Note that 1 C here was 200 mA/g, which was a current value per weight of the positive electrode active material. In second and subsequent charging and discharging, only the discharge rate was changed, and 0.2 C charge/0.2 C discharge, 0.2 C charge/0.5 C discharge, 0.2 C charge/1.0 C discharge, 0.2 C charge/2.0 C discharge, 0.2 C charge/3.0 C discharge, 0.2 C charge/4.0 C discharge, and 0.2 C charge/5.0 C discharge were performed in this order for the measurement. The interval was 10 minutes, and the measurement temperature was 25° C.

As seen from Table 1, the sample using the comparative example showed significant capacity fading, whereas the sample using the mixture 904 and the sample using the positive electrode active material 100A-1 showed small capacity fading.

<Powder Resistivity and Conductivity>

The powder resistivity and conductivity of the mixture 904, the positive electrode active material 100A-1, and the comparative example (commercial LCO) were measured. As a measurement system, MCP-PD51 (manufactured by Mitsubishi Chemical Analytech Co., Ltd.) was used; for a device with a four probe method, Loresta-GP and Hiresta-GP were used properly. The volume resistivity of the mixture 904 was 8.2E+04 (Ω·cm), and the conductivity thereof was 1.2E-05 (S/cm). The volume resistivity of the positive electrode active material 100A-1 was 8.0E+07 (Ω·cm), and the conductivity thereof was 1.3E-08 (S/cm). The volume resistivity of the comparative example was 9.9E+02 (Ω·cm), and the conductivity thereof was 1.0E-03 (S/cm). Here, the volume resistivity and conductivity were values measured when a load of 20 kN was applied to the powder.

In addition, when a mixture layer of the mixture 904 was measured with an electrode resistivity measurement system (manufactured by HIOKI E.E. Corporation), the resistivity was 0.9 (Ω·cm) and the interface resistance was 0.003 (Ω·cm$^2$). When a mixture layer of the positive electrode active material 100A-1 was measured, the resistivity was 1.6 (Ω·cm) and the interface resistance was 0.005 (Ω·cm$^2$). When a mixture layer of the comparative example was measured, the resistivity was 4.2 (Ω·cm) and the interface resistance was 0.009 (Ω·cm$^2$).

<Continuous Charge Tolerance>

Figure 30:
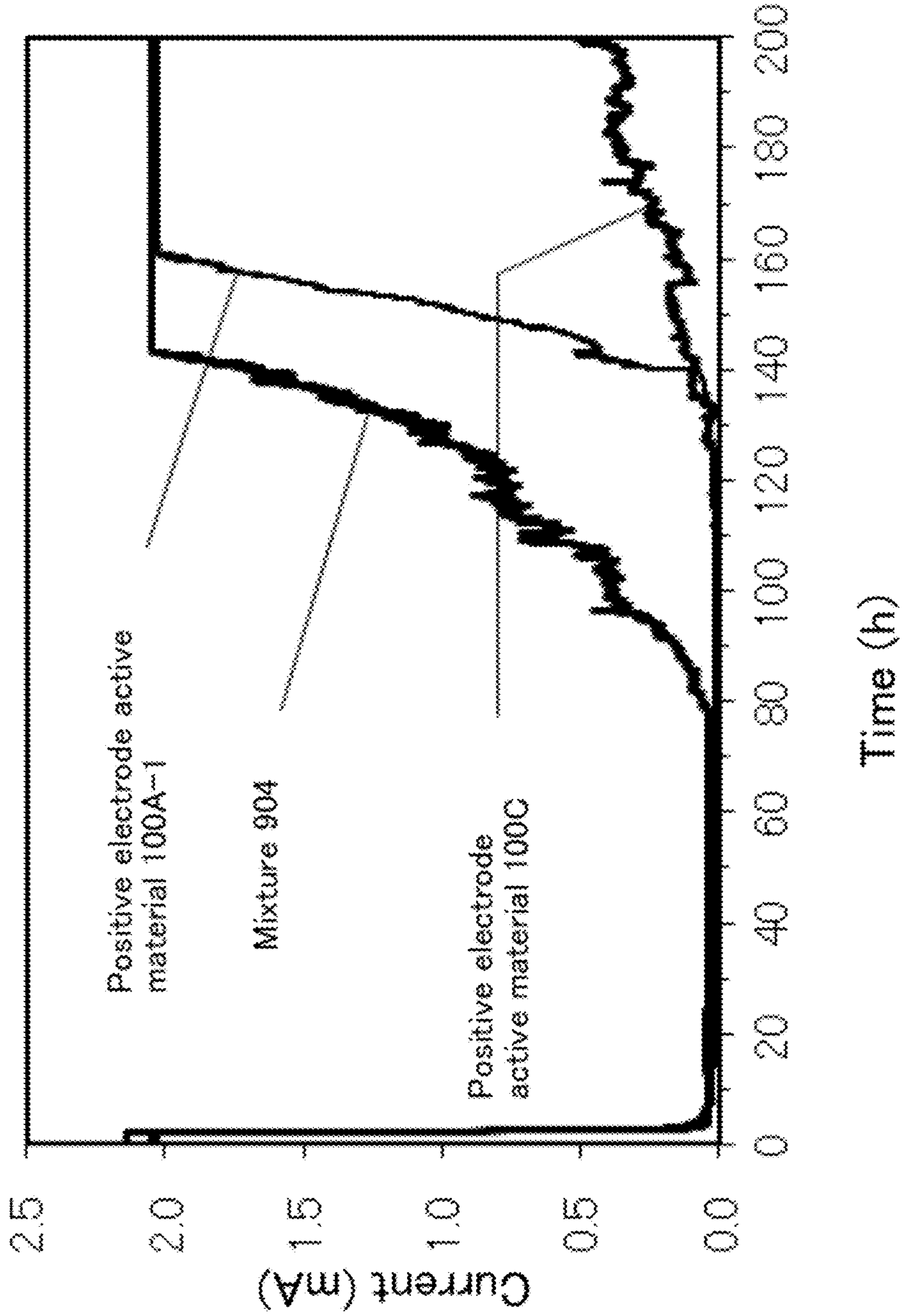
FIG. 30 shows continuous charge tolerance of secondary batteries.

FIG. 30 shows the measurement results of continuous charge tolerance of the battery cells fabricated using the obtained positive electrode active material 100A-1 and mixture 904 as well as the positive electrode active material 100C of the comparative example. All the samples used in the measurement in FIG. 30 had an active material loading of 20 mg/cm$^2$.

To measure the continuous charge tolerance, first, one cycle of CCCV charging (0.2 C, 4.5 V, termination current: 0.02 C) and CC discharging (0.2 C, 2.5 V) was performed at 25° C. Here, 1 C was 191.7 mA/g.

After that, CCCV charging (0.5 C) was performed at 60° C. The measurement continued while the charging was switched to CV charging after the voltage reached an upper limit voltage of 4.6 V, and a current value decreased gradually and then was stabilized at a low current value and eventually increased significantly. If the current value increases significantly while CV charging with 4.6 V at 60° C. continues, there is a possibility that a phenomenon such as short circuit may occur. Here, 1 C was 191.7 mA/g.

The positive electrode active material 100A-1, which demonstrated a continuous charge time of 136 hours, showed a better result than the mixture 904, which demonstrated a continuous charge time of 74 hours. Note that a continuous charge time refers to a time obtained by subtracting a full charge time from a short-circuit duration.

A positive electrode active material that has favorable cycling performance at 45° C. and high continuous charge tolerance is most appropriate to improve the reliability of a secondary battery; the above measurement results demonstrate that the positive electrode active material 100A-1 is the best material.

Example 2

Figure 34A:
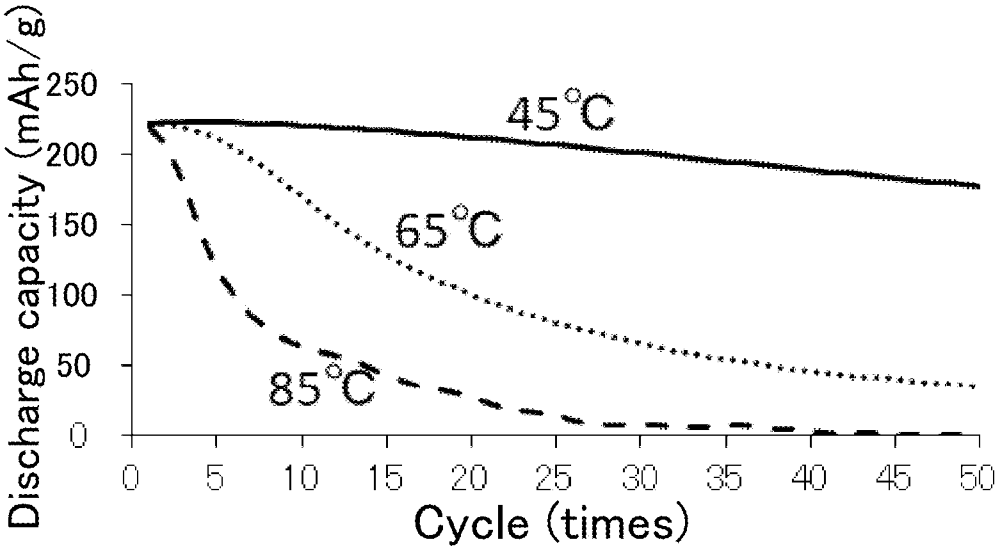
FIGS. 34A and 34B show cycling performance of a secondary battery.

In this example, a sample of a coin-type half-cell using the positive electrode active material 100A-2 was fabricated, and cycling performance (50 cycles) was measured at 45° C., 65° C., and 85° C. FIG. 34A shows the measurement results. Other measurement conditions were as follows: the charge voltage was 4.6 V, CCCV charging (0.5 C, termination current: 0.05 C) and CC discharging (0.2 C, 2.5 V) were performed with an interval of 10 minutes, and the C rate was 200 mA/g.

Figure 34B:
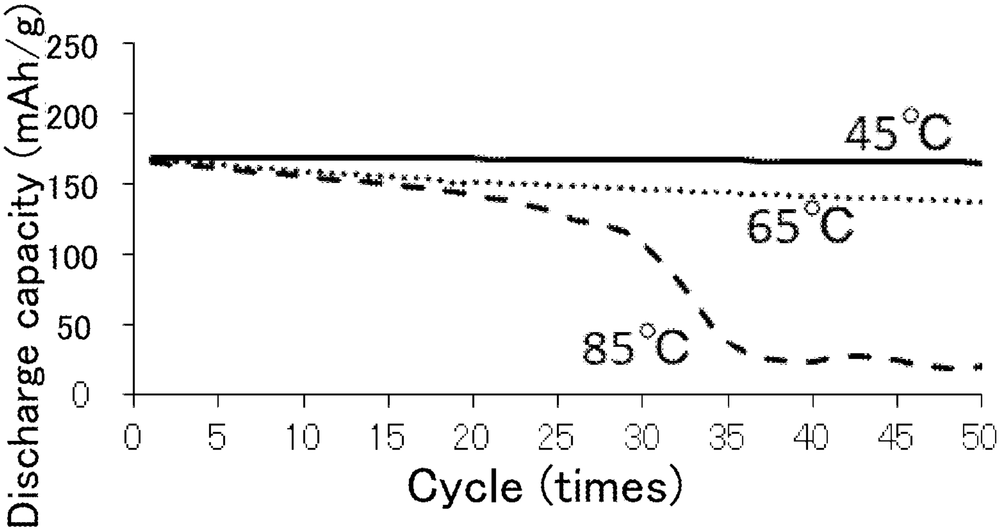

FIG. 34B shows the results of measuring cycling performance (50 cycles) with a charge voltage of 4.4 V.

All samples used in the measurements in FIGS. 34A and 34B had an active material loading of 7 mg/cm$^2$, a density of 3.8 g/cc or more, and a composition ratio of LCO:AB:PVDF of 95:3:2, and an electrolyte solution was EMI-FSA in which 1.5 mol/L lithium bis(trifluoromethanesulfonyl) amide ($Li(FSO_2)_2N$, abbreviation: LiFSA) was dissolved. Note that the chemical formula of EMI-FSA is shown below.

[Chemical Formula 1]

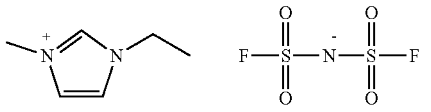

Note that the electrolytic solution used in this example was partly decomposed at 85° C., and thus, an adequate result of cycling performance at 85° C. was not obtained. The electrolytic solution used in this example was a mixture of a plurality of materials. Although the electrolytic solution with a certain combination or ratio of the materials was partly decomposed at 85° C., changing this combination or ratio by adding an additive, for example, can sometimes achieve an electrolytic solution that is not decomposed partly at 85° C.

Example 3

In this example, cycling performance (50 cycles) in the case of using an electrolytic solution different from that in Example 2 was measured at a charge voltage of 4.4 V.

As an electrolyte contained in the electrolytic solution, 1 mol/L lithium hexafluorophosphate ($LiPF_6$) was used. As the electrolytic solution, a solution in which ethylene carbonate (EC) and diethyl carbonate (DEC) were mixed at a volume ratio of 3:7 was used. Moreover, 2 wt % of vinylene carbonate (VC) was added to the electrolytic solution.

Figure 35A:
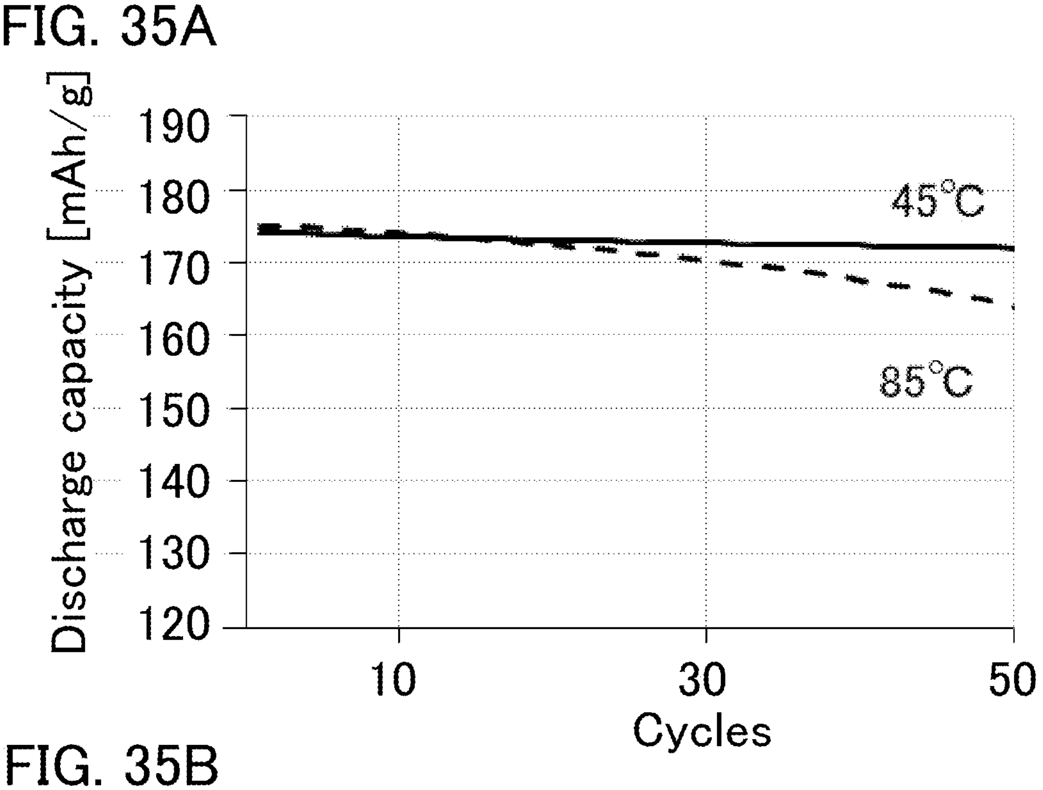
FIGS. 35A and 35B show cycling performance of secondary batteries.
Figure 35B:
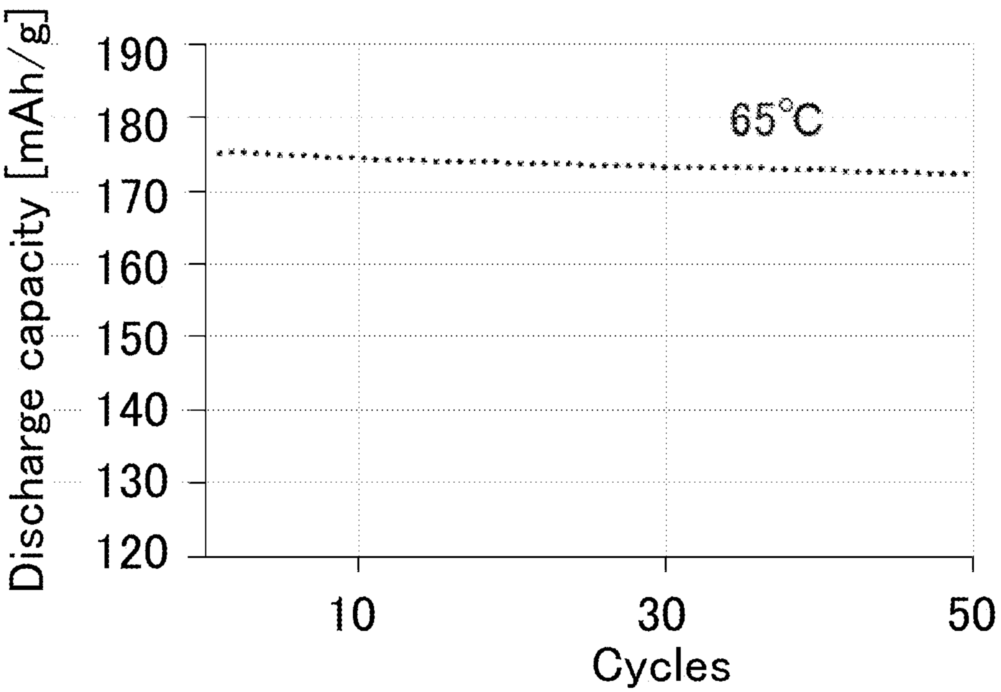

A sample of a coin-type half-cell using a positive electrode active material 100A-3 was fabricated, and cycling performance (50 cycles) was measured at 45° C. and 85° C. FIG. 35A shows the measurement results. Furthermore, a sample of a coin-type half-cell using the positive electrode active material 100A-1 was fabricated, and cycling performance (50 cycles) was measured at 65° C. FIG. 35B shows the measurement results.

Figure 37:
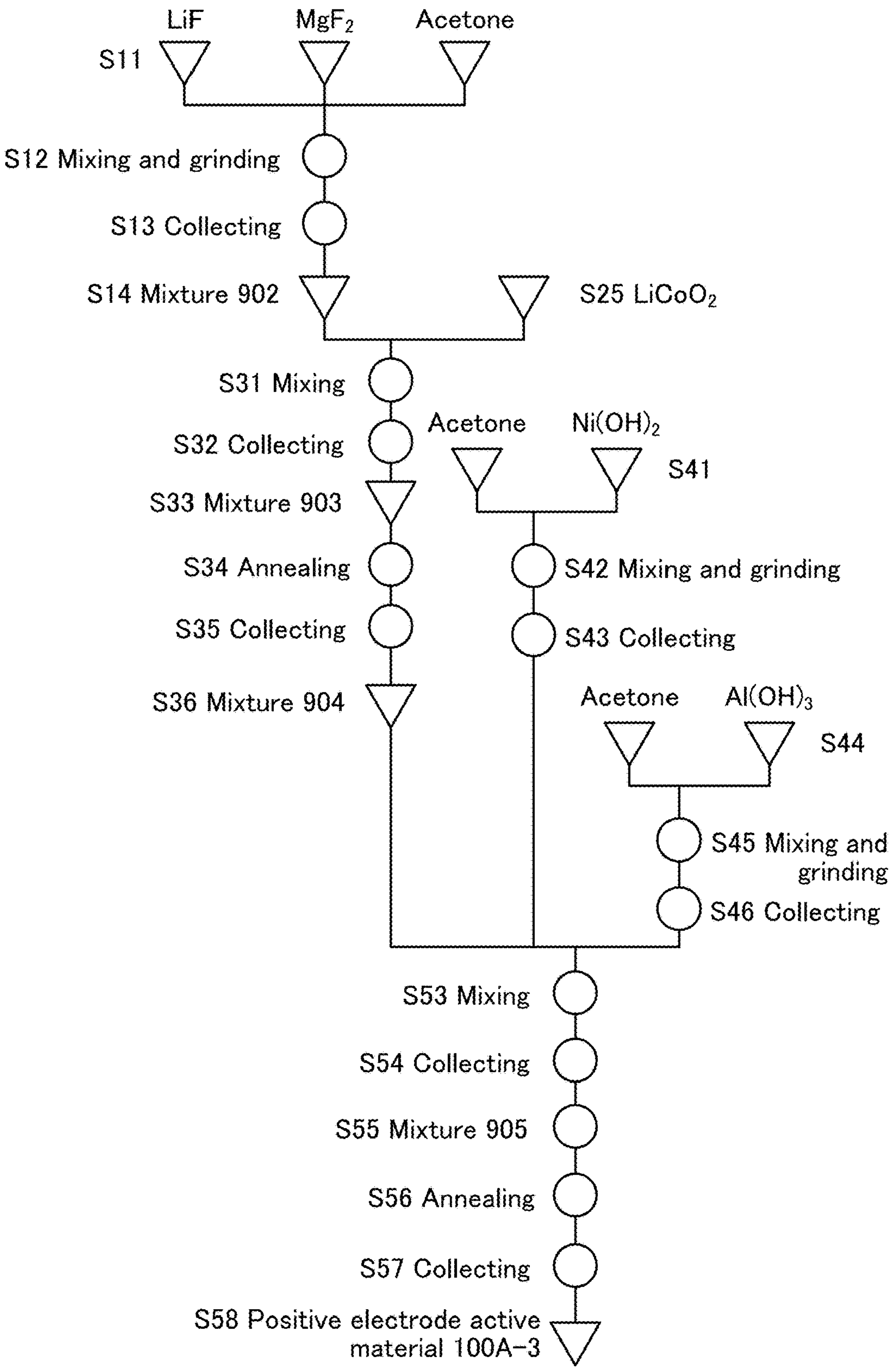
FIG. 37 illustrates an example of a method for manufacturing a positive electrode active material of one embodiment of the present invention.

FIG. 37 is a flow chart for obtaining the positive electrode active material 100A-3. The procedure up to the obtainment of the mixture 904 in S36 is the same as the procedure in FIG. 3. Subsequently, a nickel mixture obtained from S41 to S43 and an aluminum mixture obtained from S44 to S46 are mixed in S53. Then, the mixture underwent S53 to S57, whereby the positive electrode active material 100A-3 is obtained in S58.

Figure 36:
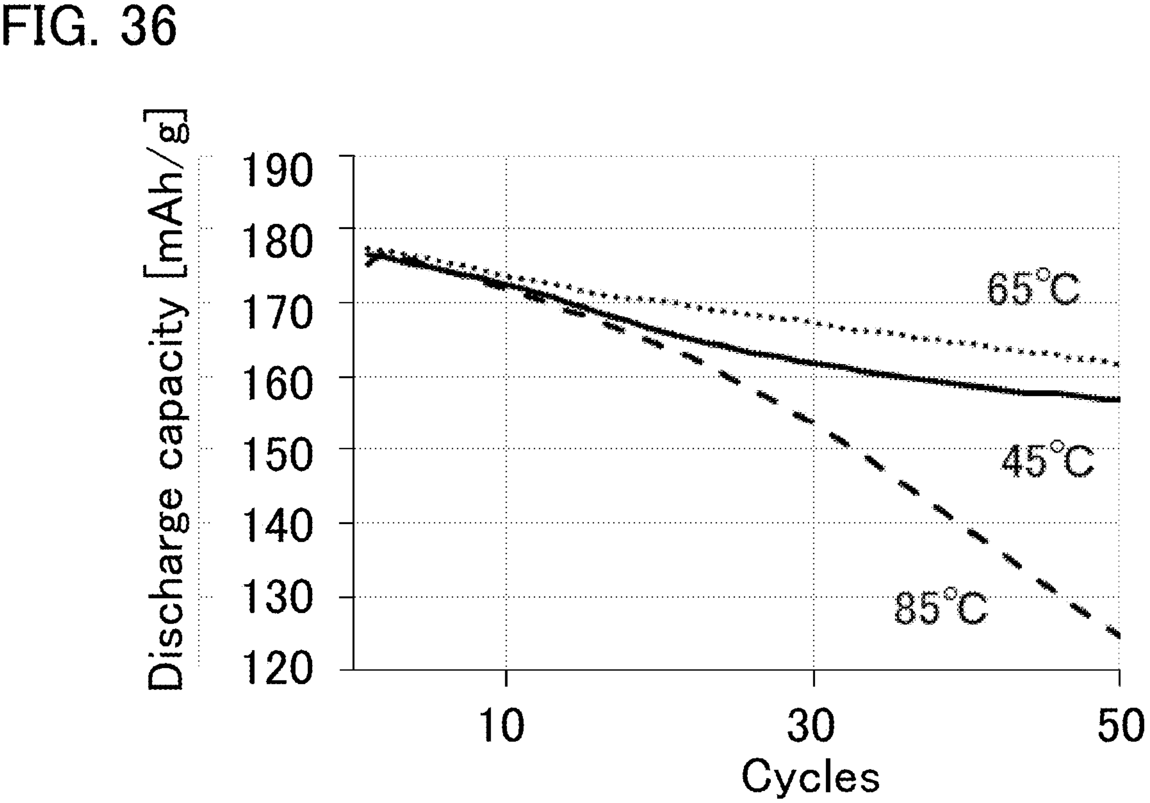
FIG. 36 shows cycling performance of a secondary battery (a comparative example)

As a comparative example, a sample of a coin-type half-cell was fabricated using lithium cobalt oxide particles (product name: Cellseed C-10N) as a positive electrode active material, and cycling performance (50 cycles) with a charge voltage of 4.4 V was measured. FIG. 36 shows the measurement results.

FIGS. 35A and 35B show almost the same results at 45° C. and 65° C., demonstrating favorable cycling performance. In addition, the cycling performance at 85° C. in FIG. 35A is better than that of the comparative example at 85° C. in FIG. 36.

Example 4

In this example, cycling performance (50 cycles) with a charge voltage of 4.6 V, which is different from that in Example 3, was measured.

In this example, the positive electrode active material 100A-1 and the mixture 904 were fabricated, and the performance of battery cells was evaluated. A sample fabricated according to FIG. 1, which is the flow chart for obtaining the positive electrode active material 100A-1, was subjected to measurement. The positive electrode active material 100A-1 was fabricated as follows: the aforementioned lithium cobalt oxide particles (C-10N), magnesium fluoride, lithium fluoride, nickel hydroxide, and aluminum hydroxide were mixed at once by dry ball mill grinding and then annealing was performed at 850° C. for 60 hours under an oxygen gas flow. Note that the materials for the positive electrode active material 100A-1 were weighed so that the molar ratio of lithium in lithium fluoride is 0.33 times, that of nickel in nickel hydroxide is 0.5 times, and that of aluminum in aluminum hydroxide is 0.5 times that of magnesium in magnesium fluoride, and were mixed with lithium cobalt oxide particles manufactured by Nippon Chemical Industrial Co., Ltd. (product name: Cellseed C-10N).

Figure 38:
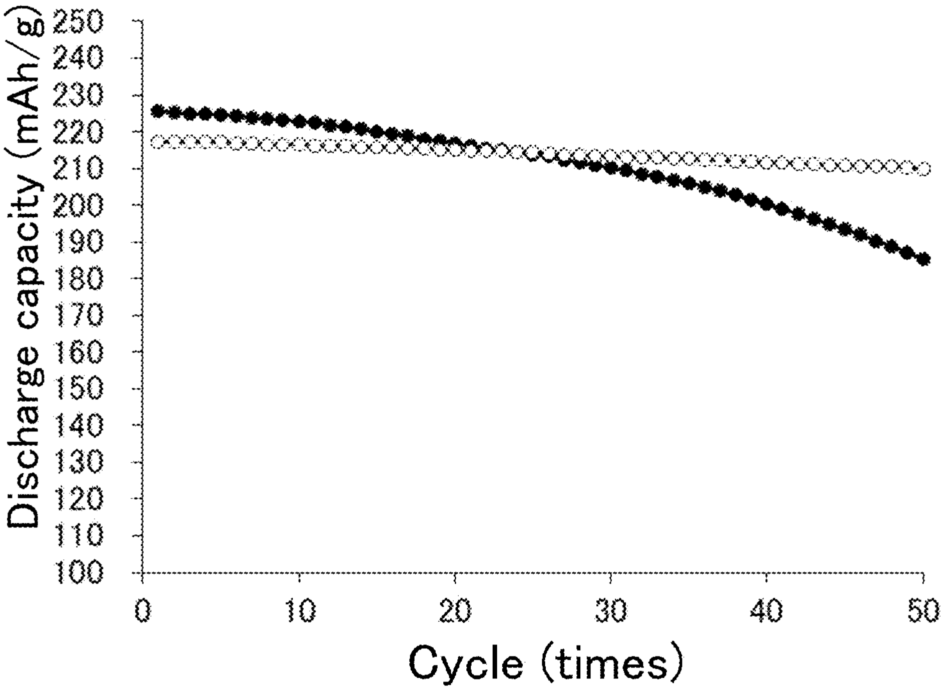
FIG. 38 shows cycling performance of secondary batteries in Example 4.

A positive electrode obtained by coating a current collector with a slurry in which the obtained positive electrode active material 100A-1, AB, and PVDF were mixed in a weight ratio of 95:3:2 and performing pressing was used. FIG. 38 shows the results. Note that in FIG. 38, a white circle represents performance of the positive electrode active material 100A-1 in this example, and a black circle represents performance of the mixture 904. FIG. 38 demonstrates favorable cycling performance with a loading of 20 $mg/cm^2$; the mixture 904 shows adequately high performance, and yet the positive electrode active material 100A-1 exhibits better performance.

The measurement condition was 25° C., the loading was 20 $mg/cm^2$, and the density was 3.8 g/cc or more.

As an electrolyte contained in an electrolytic solution, 1 mol/L $LiPF_6$ was used. As the electrolytic solution, a solution in which ethylene carbonate (EC) and diethyl carbonate (DEC) were mixed at a volume ratio of 3:7 was used. Moreover, 2 wt % of vinylene carbonate (VC) was added to the electrolytic solution.

Figure 39:
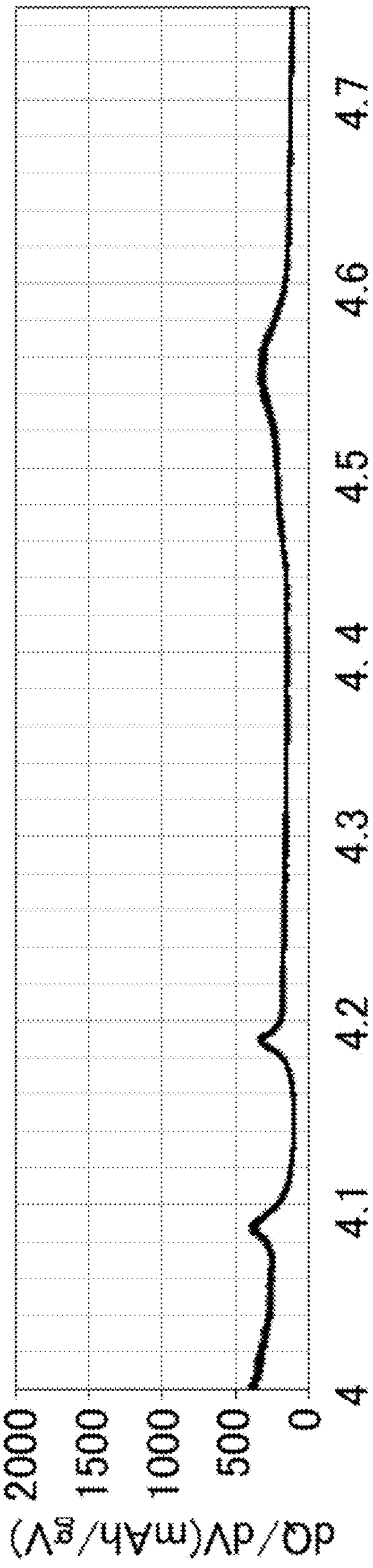
FIG. 39 is a graph showing dQ/dV vs V of a sample in Example 4.

FIG. 39 shows a dQ/dV vs V curve that shows the amount of change in voltage with respect to the charge capacity and is calculated from the data in FIG. 38. In FIG. 39, a small unclear peak was observed at approximately 4.55 V. In the dQ/dV vs V curve shown in FIG. 39, some peaks are extremely broad or small in some cases. In such a case, there is a possibility that two crystal structures coexist. For example, the 03 phase and the pseudo-spinel phase may coexist, or the pseudo-spinel phase and the H1-3 phase may coexist.

Example 5

In this example, a sample fabricated according to FIG. 3, which is the flow chart for obtaining the positive electrode active material 100A-2, was subjected to measurement. In the process of fabricating the positive electrode active material 100A-2, first, lithium cobalt oxide particles (C-10N), magnesium fluoride, and lithium fluoride were mixed in a dry ball mill, and then heat treatment was performed at 850° C. for 60 hours, and the obtained mixture was mixed with nickel hydroxide in a dry ball mill. After that, a mixture was obtained by a sol-gel method using aluminum isopropoxide as a metal source and isopropanol as a solvent, and then heat treatment was performed at 850° C. for 2 hours, whereby the positive electrode active material 100A-2 was obtained. A positive electrode obtained by coating a current collector with a slurry in which the obtained positive electrode active material 100A-2, AB, and PVDF were mixed in a weight ratio of 95:3:2 was used. The loading was 10 $mg/cm^2$. Note that in order to easily observe an XRD peak, the electrode was not pressed.

As a comparative example, the mixture 904 was used. Lithium cobalt oxide particles (C-10N), magnesium fluoride, and lithium fluoride were mixed in a dry ball mill, and heat treatment was performed at 850° C. for 60 hours.

As an electrolytic solution of each of the sample secondary batteries, a solution in which ethylene carbonate (EC) and diethyl carbonate (DEC) were mixed at a volume ratio of 3:7 was used.

The secondary battery using the positive electrode active material 100A-2 or the mixture 904 was subjected to CCCV charging at 4.6 V. Specifically, constant current charging was performed at 0.5 C until the voltage reached 4.6 V, and subsequently, constant voltage charging was performed until the current value reached 0.01 C. Then, the secondary battery in the charged state was disassembled in a glove box with an argon atmosphere to take out the positive electrode, and the positive electrode was washed with dimethyl carbonate (DMC) to remove the electrolyte solution. Then, the positive electrode was enclosed in an airtight container with an argon atmosphere and analyzed by XRD. For the XRD measurement, D8 Advance (manufactured by Bruker AXS.) was used. X-ray powder diffraction analysis using CuKα1 radiation was performed on the positive electrode. The XRD measurement was performed on the electrode that was sealed in an airtight container with an argon atmosphere and attached to a glass plate to maintain the flatness. The XRD apparatus was set for a powder sample, and the height of the sample was set in accordance with the measurement surface required by the apparatus.

Figure 40:
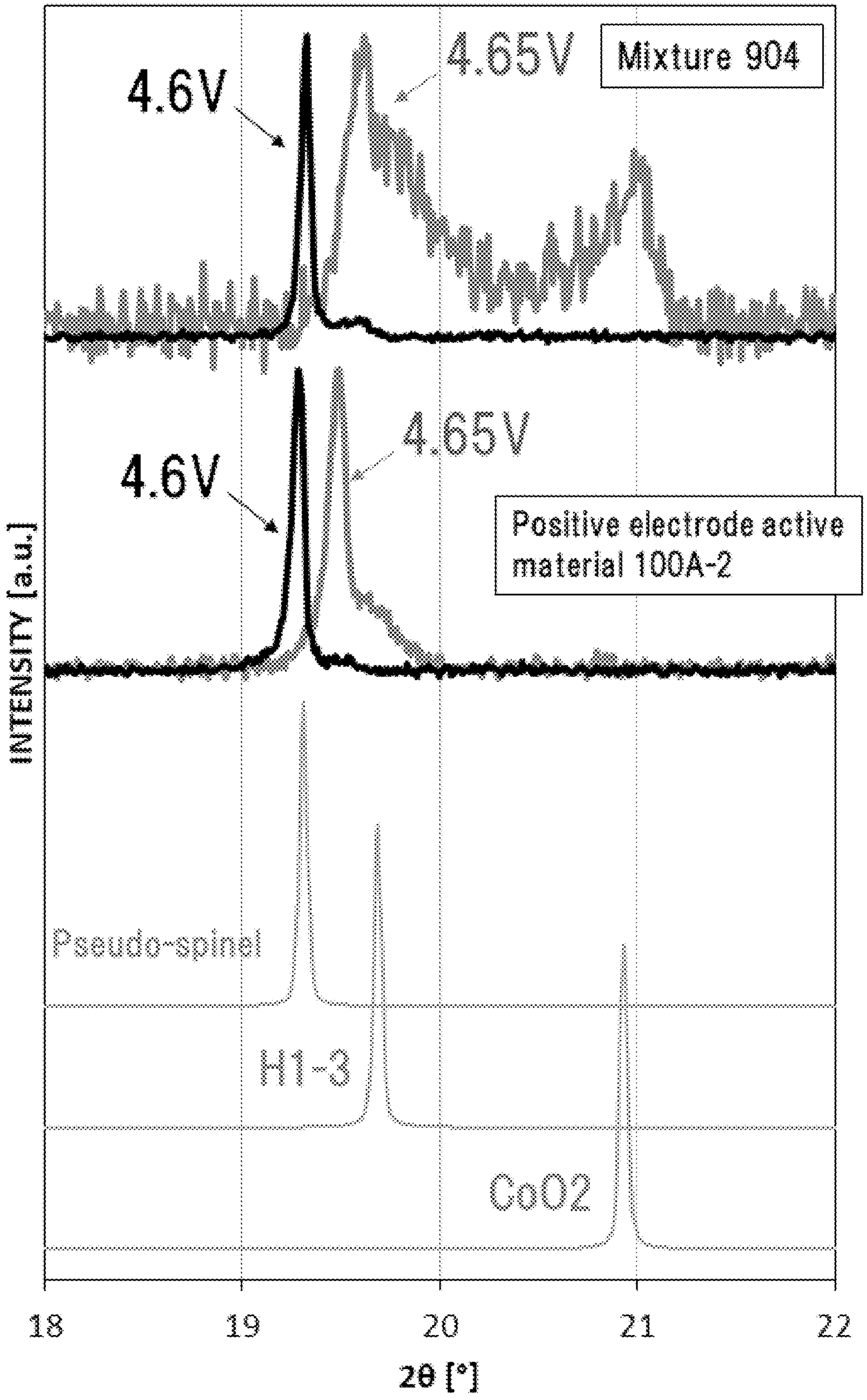
FIG. 40 shows XRD patterns (at lower angles) of samples in Example 5.
Figure 41:
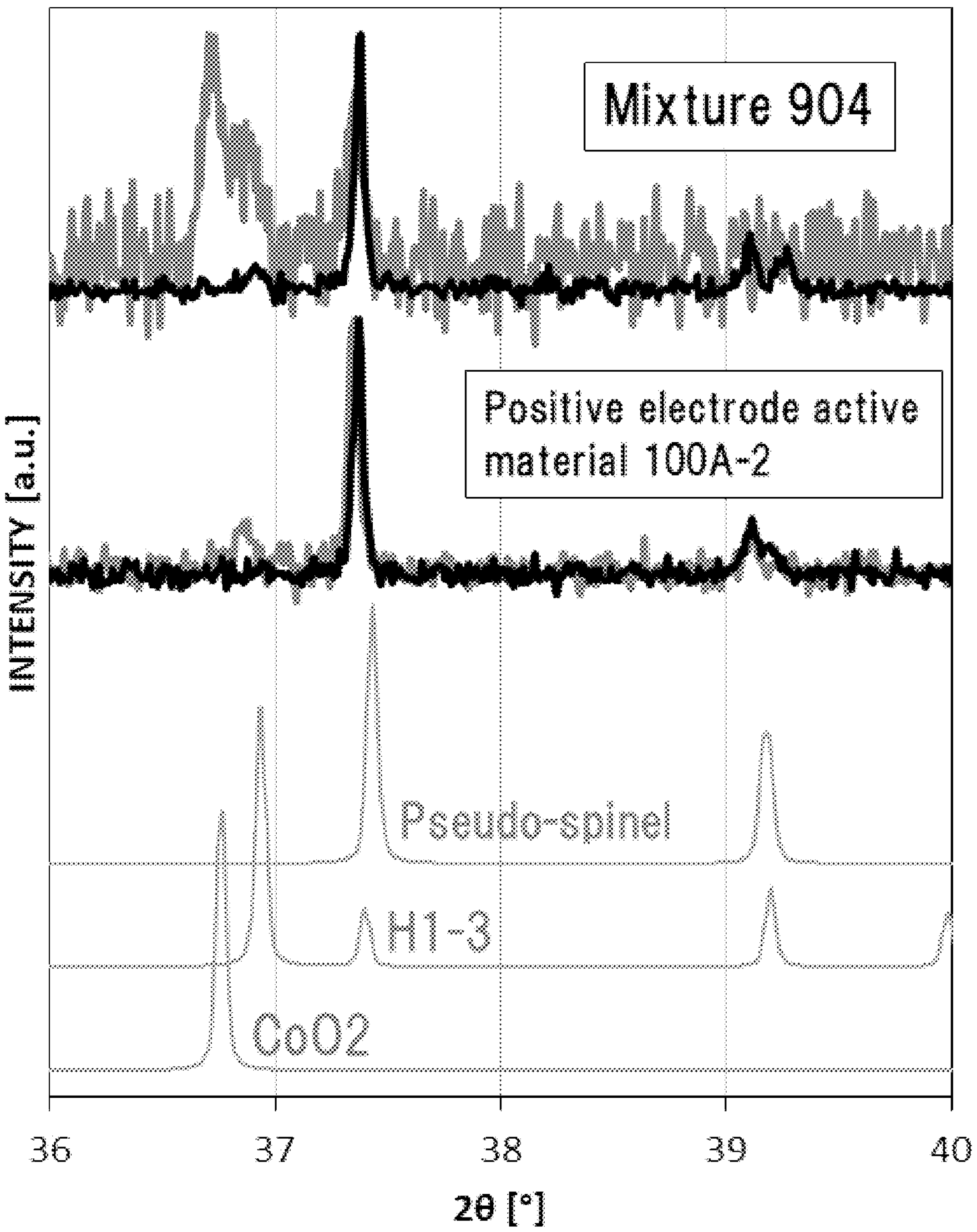
FIG. 41 shows XRD patterns (at higher angles) of samples in Example 5.

FIG. 40 and FIG. 41 show ideal X-ray powder diffraction patterns with CuKα1 radiation that are calculated from models of the pseudo-spinel crystal structure and the H1-3 crystal structure. For comparison, FIG. 40 and FIG. 41 also show ideal XRD patterns calculated from the crystal structure of $CoO_2$ (O1) with a charge depth of 1. Note that the patterns of $CoO_2$ (O1) were calculated using crystal structure data in the Inorganic Crystal Structure Database (ICSD) with Reflex Powder Diffraction, which is a module of Materials Studio (BIOVIA). The range of 2θ was from 15° to 75°, the step size was 0.01, the wavelength λ1 was 1.540562 Å, the wavelength λ2 was not set, and a single monochromator was used. The pattern of the H1-3 crystal structure was similarly made from the crystal structure data disclosed in Non-Patent Document 3. The XRD pattern of the pseudo-spinel crystal structure was made, similarly to the others, in the following manner: the crystal structure was estimated from the XRD pattern of the positive electrode active material of one embodiment of the present invention and was fitted with TOPAS Version 3 (crystal structure analysis software manufactured by Bruker Corporation).

Moreover, FIG. 40 and FIG. 41 show the XRD patterns of the positive electrodes after the battery using the positive electrode active material 100A-2 or the mixture 904 was charged with 4.65 V. For comparison, FIG. 40 and FIG. 41 also show the patterns of the pseudo-spinel crystal structure and the H1-3 crystal structure.

FIG. 40 shows the XRD patterns at lower angles, and FIG. 41 shows the XRD patterns at higher angles.

Both the mixture 904 and the positive electrode active material 100A-2 mostly had the pseudo-spinel crystal structure in a 4.6 V charged state. When the mixture 904 was charged with a charge voltage of 4.65 V, the peaks of the $CoO_2$ (O1) crystal structure were observed in addition to the peaks of the H1-3 crystal structure. Moreover, the mixture 904 charged at 4.65 V had significantly broad peaks, which suggested that the crystallinity decreased largely.

On the other hand, the positive electrode active material 100A-2 maintained the pseudo-spinel crystal structure with charge voltages of both 4.6 V and 4.65 V. The positive electrode active material 100A-2 is therefore considered to have more favorable cycling performance.

Figure 42:
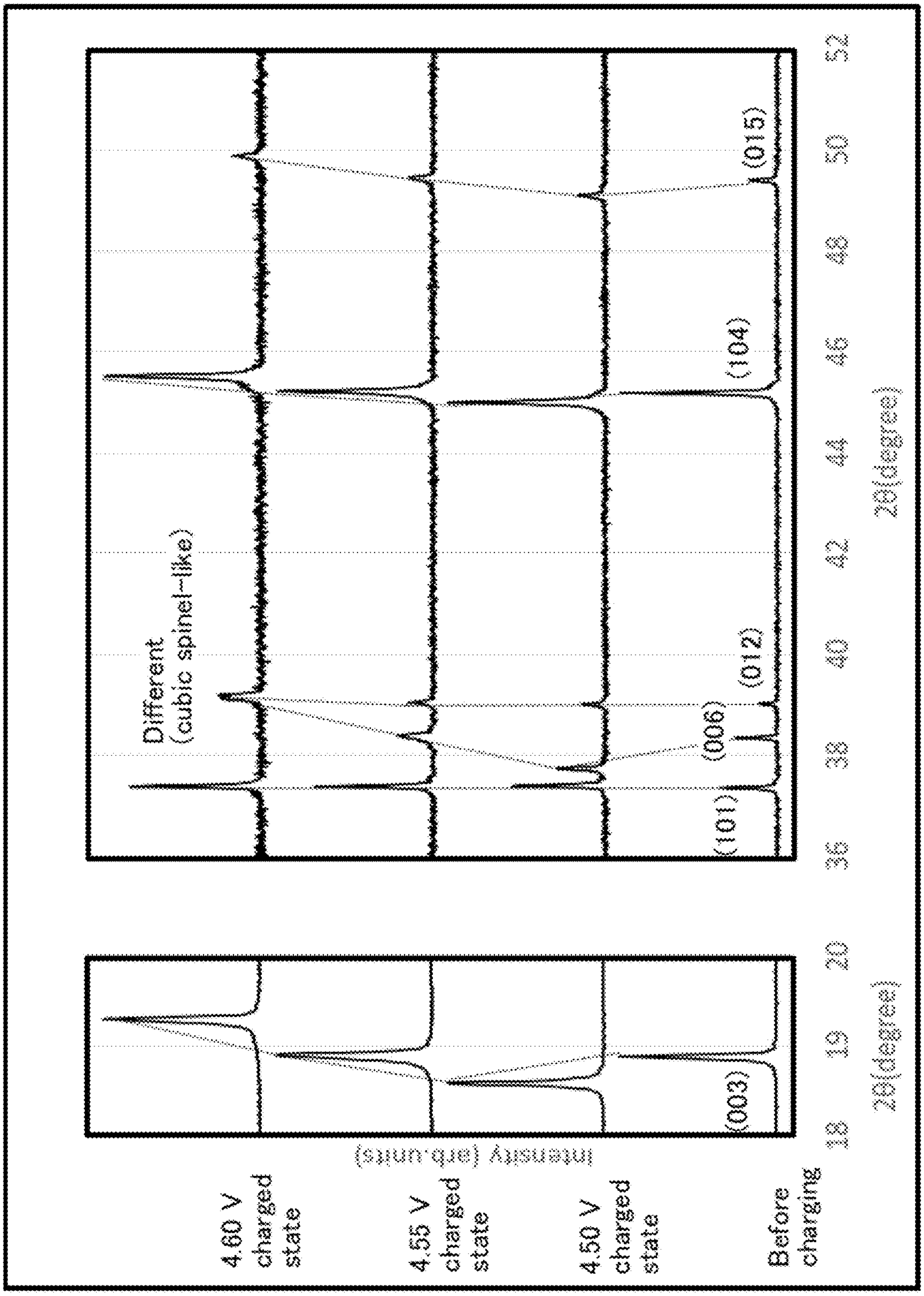
FIG. 42 shows XRD patterns (at lower angles and higher angles) of a sample in Example 5.
Figure 43:
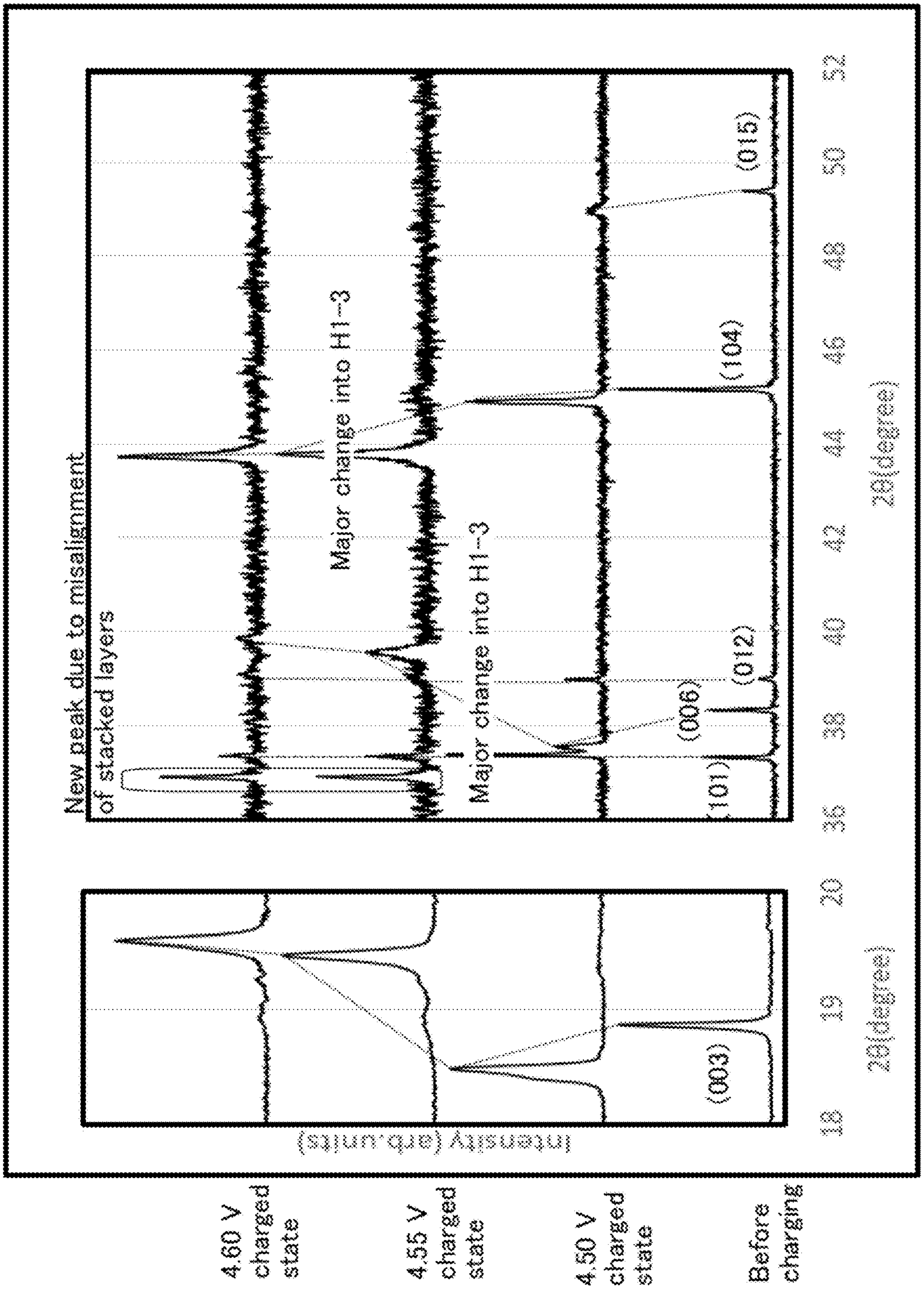
FIG. 43 shows XRD patterns (at lower angles and higher angles) of a sample of a comparative example.

A structure change from the crystal structure in the discharged state (R-3m) is described in more details with reference to FIG. 42 and FIG. 43. FIG. 42 shows XRD patterns of the positive electrode active material 100A-2 before charging and in a 4.5 V charged state, a 4.55 V charged state, and a 4.6 V charged state. FIG. 43 shows XRD patterns of the commercial LCO before charging and in a 4.5 V charged state, a 4.55 V charged state, and a 4.6 V charged state.

In FIG. 43, a major change into the H1-3 structure was observed at a plurality of sports at both lower angles and higher angles, and a new peak due to misalignment of stacked layers was observed around 37° in a 4.55 V charged state and a 4.6 V charged state. In the comparative example in FIG. 43, the crystal structure was broken by charging.

On the other hand, a significant shift in the peak was not observed in FIG. 42, meaning that misalignment of the Co—O layers was small and the crystal structure was less likely to be broken.

REFERENCE NUMERALS

100: positive electrode active material, 100A-1: positive electrode active material, 100A-2: positive electrode active material, 100A-3: positive electrode active material, 100C: positive electrode active material of comparative example, 200: active material layer, 200A: positive electrode active material, 201: graphene compound, 211*a*: positive electrode, 211*b*: negative electrode, 212*a*: lead, 212*b*: lead, 214: separator, 215*a*: bonding portion, 215*b*: bonding portion, 217: fixing member, 250: secondary battery, 251: exterior body, 261: folded portion, 262: seal portion, 263: seal portion, 271: crest line, 272: trough line, 273: space, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: secondary battery, 410: positive electrode, 411: positive electrode active material, 413: positive electrode current collector, 414: positive electrode active material layer, 420: solid electrolyte layer, 421: solid electrolyte, 430: negative electrode, 431: negative electrode active material, 433: negative electrode current collector, 434: negative electrode active material layer, 440: substrate, 441: wiring electrode, 442: wiring electrode, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 521: plate, 524: plate, 525*a*: fixation tool, 525*b*: fixation tool, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 615: module, 616: conductive wire, 617: temperature control device, 750*a*: positive electrode, 750*b*: solid electrolyte layer, 750*c*: negative electrode, 751: electrode plate, 752: insulating tube, 753: electrode plate, 761: lower component, 762: upper component, 763: pressure screw, 764: butterfly nut, 765: O ring, 766: insulator, 770*a*: package component, 770*b*: package component, 770*c*: package component, 771: external electrode, 772: external electrode, 773*a*: electrode layer, 773*b*: electrode layer, 900: circuit board, 901: mixture, 902: mixture, 903: mixture, 904: mixture, 905: mixture, 910: label, 911: terminal, 912: circuit, 913: secondary battery, 914: antenna, 915: antenna, 916: layer, 917: layer, 918: antenna, 920: display device, 921: sensor, 922: terminal, 930: housing, 930*a*: housing, 930*b*: housing, 931: negative electrode, 932: positive electrode, 933: separator, 950: wound body, 951: terminal, 952: terminal, 980: secondary battery, 981: film, 982: film, 993: wound body, 994: negative electrode, 995: positive electrode, 996: separator, 997: lead electrode, 998: lead electrode, 7100: portable display device, 7101: housing, 7102: display portion, 7103: operation button, 7104: secondary battery, 7200: portable information terminal, 7201: housing, 7202: display portion, 7203: band, 7204: buckle, 7205: operation button, 7206: input/output terminal, 7207: icon, 7300: display device, 7304: display portion, 7400: mobile phone, 7401: housing, 7402: display portion, 7403: operation button, 7404: external connection port, 7405: speaker, 7406: microphone, 7407: secondary battery, 7500: electronic cigarette, 7501: atomizer, 7502: cartridge, 7504: secondary battery, 8000: display device, 8001: housing, 8002: display portion, 8003: speaker portion, 8004: secondary battery, 8021: charging apparatus, 8022: cable, 8024: secondary battery, 8100: lighting device, 8101: housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: automobile, 8401: headlight, 8406: electric motor, 8500: automobile, 8600: motor scooter, 8601: side mirror, 8602: secondary battery, 8603: indicator, 8604: under-seat storage unit, 9600: tablet terminal, 9625: switch, 9627: switch, 9628: operation switch, 9629: fastener, 9630: housing, 9630*a*: housing, 9630*b*: housing, 9631: display portion, 9631*a*: display portion, 9631*b*: display portion, 9633: solar cell, 9634: charge/discharge control circuit, 9635: power storage unit, 9636: DC-DC converter, 9637: converter, 9640: movable portion This application is based on Japanese Patent Application Serial No. 2018-233928 filed with Japan Patent Office on Dec. 13, 2018; Japanese Patent Application Serial No. 2018-238383 filed on Dec. 20, 2018; Japanese Patent Application Serial No. 2019-019437 filed on Feb. 6, 2019; and Japanese Patent Application Serial No. 2019-031705 filed on Feb. 25, 2019, the entire contents of which are hereby incorporated by reference.

The invention claimed is:

1. A method for manufacturing a positive electrode active material, comprising:
- pulverizing each of magnesium fluoride, lithium fluoride, a nickel source, and an aluminum source;
- after the pulverizing, forming a mixture by mixing the pulverized magnesium fluoride, the pulverized lithium fluoride, the pulverized nickel source, the pulverized aluminum source, and a powder of lithium cobalt oxide; and
- forming the positive electrode active material by heating the mixture at a temperature lower than an upper temperature limit of the lithium cobalt oxide.

2. The method for manufacturing a positive electrode active material, according to claim 1, wherein the temperature is higher than or equal to 700° C. and lower than or equal to 950° C.

3. The method for manufacturing a positive electrode active material according to claim 1, wherein the aluminum source is one of aluminum hydroxide and aluminum isopropoxide.

4. The method for manufacturing a positive electrode active material according to claim 1, wherein the nickel source is nickel hydroxide.

5. The method for manufacturing a positive electrode active material according to claim 1, wherein the positive electrode active material has an average particle diameter greater than or equal to 1 μm and less than or equal to 100 μm.

6. The method for manufacturing a positive electrode active material according to claim 1, wherein in the positive electrode active material, a number of aluminum atoms is 0.05% to 4% the number of cobalt atoms.

7. The method for manufacturing a positive electrode active material according to claim 1, wherein the pulverizing comprises pulverizing magnesium fluoride and lithium fluoride together at the same time.

8. The method for manufacturing a positive electrode active material according to claim 1, wherein the pulverizing comprises pulverizing the nickel source separately from each of the lithium fluoride, the magnesium fluoride, and the aluminum source.

9. The method for manufacturing a positive electrode active material according to claim 1, wherein the pulverizing comprises pulverizing the aluminum source separately from each of the lithium fluoride, the magnesium fluoride, and the nickel source.

* * * * *